(12) United States Patent
Sano et al.

(10) Patent No.: US 8,004,777 B2
(45) Date of Patent: Aug. 23, 2011

(54) IMAGE PICKUP LENS, IMAGE PICKUP UNIT AND MOBILE TERMINAL

(75) Inventors: Eigo Sano, Hino (JP); Takashi Kawasaki, Hachioji (JP); Yuichi Ozaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 59 days.

(21) Appl. No.: 12/419,490

(22) Filed: Apr. 7, 2009

(65) Prior Publication Data
US 2009/0257133 A1 Oct. 15, 2009

(30) Foreign Application Priority Data
Apr. 15, 2008 (JP) ................. 2008-105842

(51) Int. Cl.
*G02B 9/34* (2006.01)
(52) U.S. Cl. ........................................ 359/773
(58) Field of Classification Search .............. 359/644, 359/650, 660, 773
See application file for complete search history.

(56) References Cited

U.S. PATENT DOCUMENTS
7,558,008 B2 * 7/2009 Nakagawa ............. 359/773
2007/0008625 A1 1/2007 Park et al.
2010/0172024 A1 * 7/2010 Sakagami ............. 359/570

FOREIGN PATENT DOCUMENTS
| JP | 2002-365530 | | 12/2002 |
| JP | 2002365530 | A | 12/2002 |
| JP | 2004341013 | A | 12/2004 |
| JP | 2007-264498 | | 10/2007 |

* cited by examiner

*Primary Examiner* — William C Choi
(74) *Attorney, Agent, or Firm* — Cozen O'Connor.

(57) ABSTRACT

An image pickup lens includes: an aperture stop; a first lens having a positive power and including a convex surface facing an object side; a second lens having a negative power and including a concave surface facing an image side; a third lens in a meniscus shape having a positive power and including a convex surface facing the image side; and a fourth lens in a meniscus shape having a negative power and including a convex surface facing the object side. The image pickup lens satisfies predetermined conditions relating to a composite focal length of the first through third lenses, a length of an air space between the third lens and the fourth lens along the optical axis, and a curvature radius of a surface of the second lens facing the image side.

25 Claims, 36 Drawing Sheets

MERIDIONAL COMA (mm)

FIG. 34 (a)   FIG. 34 (b)   FIG. 34 (c)
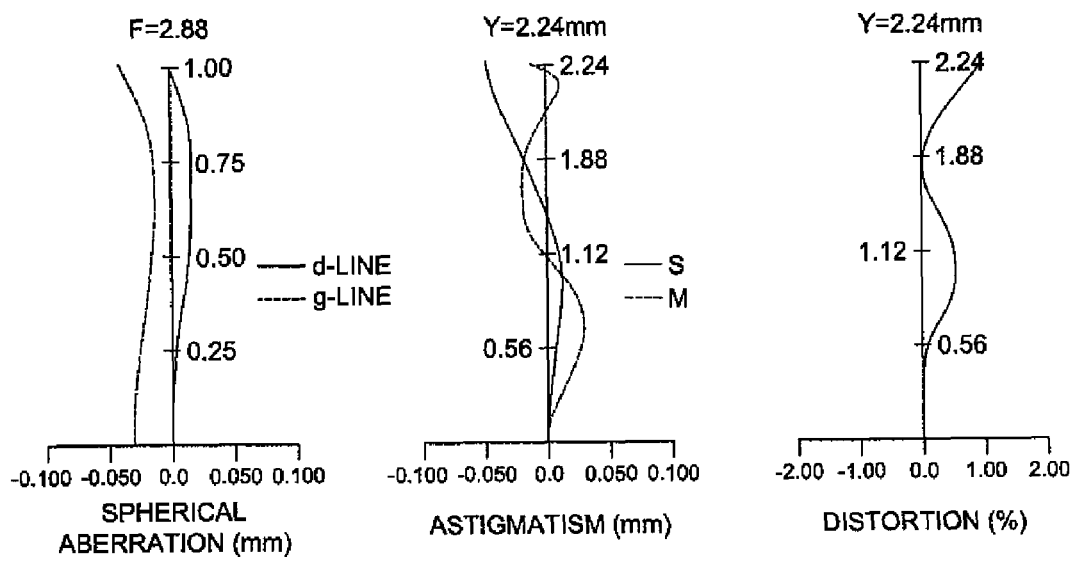
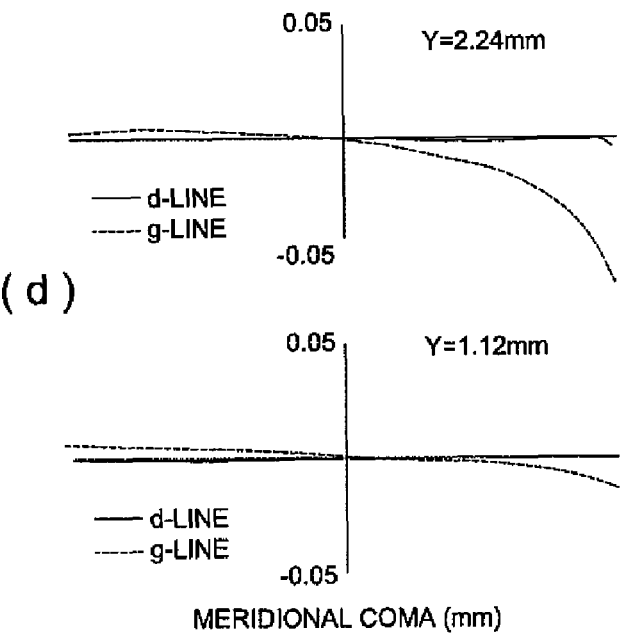
FIG. 34 (d)

IMAGE PICKUP LENS, IMAGE PICKUP UNIT AND MOBILE TERMINAL

This application is based on Japanese Patent Application No. 2008-105842 filed on Apr. 15, 2008, in Japanese Patent Office, the entire content of which is hereby incorporated by reference.

TECHNICAL FIELD

The present invention relates to a small-sized image pickup lens employing a solid-state image pickup element such as a CCD type image sensor or a CMOS type image sensor, and to an image pickup unit and a mobile terminal equipped with the image pickup lens.

BACKGROUND

A cell-phone and a mobile information terminal each being equipped with an image pickup apparatus are coming into wide use, with a trend of enhancing performance and downsizing of an image pickup apparatus using a solid-state image pickup element such as a CCD (Charged Coupled Device) type image sensor or a CMOS (Complementary Metal Oxide Semiconductor) type image sensor. Furthermore, there are increasing demands for further downsizing for the image pickup lens that is mounted on the image pickup apparatus of this kind.

As an image pickup lens to be used for this purpose, there has been proposed an image pickup lens composed of four elements, because it can provide higher property than a lens composed of two elements or three elements. As an example of the image pickup lens composed of four elements, there has been disclosed a so-called image pickup lens of an inverted Ernostar type that is made up of the first lens having positive refractive power, the second lens having negative refractive power, the third lens having positive refractive power and of the fourth lens having positive refractive power, in this order from the object side, for providing higher property, as described in, for example, Unexamined Japanese Patent Application Publication (JP-A) No. 2004-341013.

As another example of the image pickup lens composed of four elements, there has been proposed a so-called image pickup lens of a telephoto type that is made up of the first lens having positive refractive power, the second lens having negative refractive power, the third lens having positive refractive power and of the fourth lens having negative refractive power in this order from the object side, and is targeted to be short in terms of the total length of the image pickup lens, as described in, for example, JP-A No. 2002-365530.

The image pickup lens described in JP-A No. 2004-341013 is of an inverted Ernostar type in which the fourth lens is a positive lens. A principal point of the optical system is positioned on the image side and a length of its back focal length is longer, compared with a telephoto type lens in which the fourth lens is a negative lens. Therefore, this type of image pickup lens is disadvantageous to be downsized. In addition, there is one lens with a negative refractive power out of the four lenses, which makes the correction of Petzval's sum difficult, resulting in a problem that excellent performance is hardly secured on a peripheral portion of the image.

Further, in the image pickup lens described in JP-A No. 2002-365530, its angle of view is narrow and aberration correction is insufficient. It causes a problem that the image pickup lens hardly copes with a higher-pixel image pickup element due to the deterioration of its optical property when the total lens length is further shortened.

SUMMARY

In view of the aforesaid problems, there is provided an image pickup lens with four elements wherein various aberrations are properly corrected in spite of its size that is smaller than a conventional type, and further provided an image pickup apparatus and a mobile terminal equipped with the aforesaid image pickup lens.

An image pickup lens relating to the present invention is provided for forming an image of an object on a photoelectrical converter of a solid-state image pickup element. The image pickup lens comprises, in order from an object side thereof: an aperture stop; a first lens having a positive power and comprising a convex surface facing the object side; a second lens having a negative power and comprising a concave surface facing an image side of the image pickup lens; a third lens in a meniscus shape having a positive power and comprising a convex surface facing the image side; and a fourth lens in a meniscus shape having a negative power and comprising a convex surface facing the object side. The image pickup lens satisfies predetermined conditions relating to a composite focal length of the first to third lenses, a length of an air space between the third lens and the fourth lens along an optical axis of the image pickup lens, a curvature radius of the surface of the second lens facing the image side, and a focal length of a total system of the image pickup lens.

These and other objects, features and advantages according to the present invention will become more apparent upon reading of the following detailed description along with the accompanied drawings.

BRIEF DESCRIPTION OF DRAWINGS

Embodiments will now be described, by way of example only, with reference to the accompanying drawings which are meant to be exemplary, not limiting, and wherein like elements numbered alike in several Figures, in which:

FIGS. 34(a) through 34(d) show aberration diagrams in Example 15 including spherical aberration, astigmatism, distortion, and meridional coma, respectively;

DESCRIPTION OF EMBODIMENTS

Figure 1:
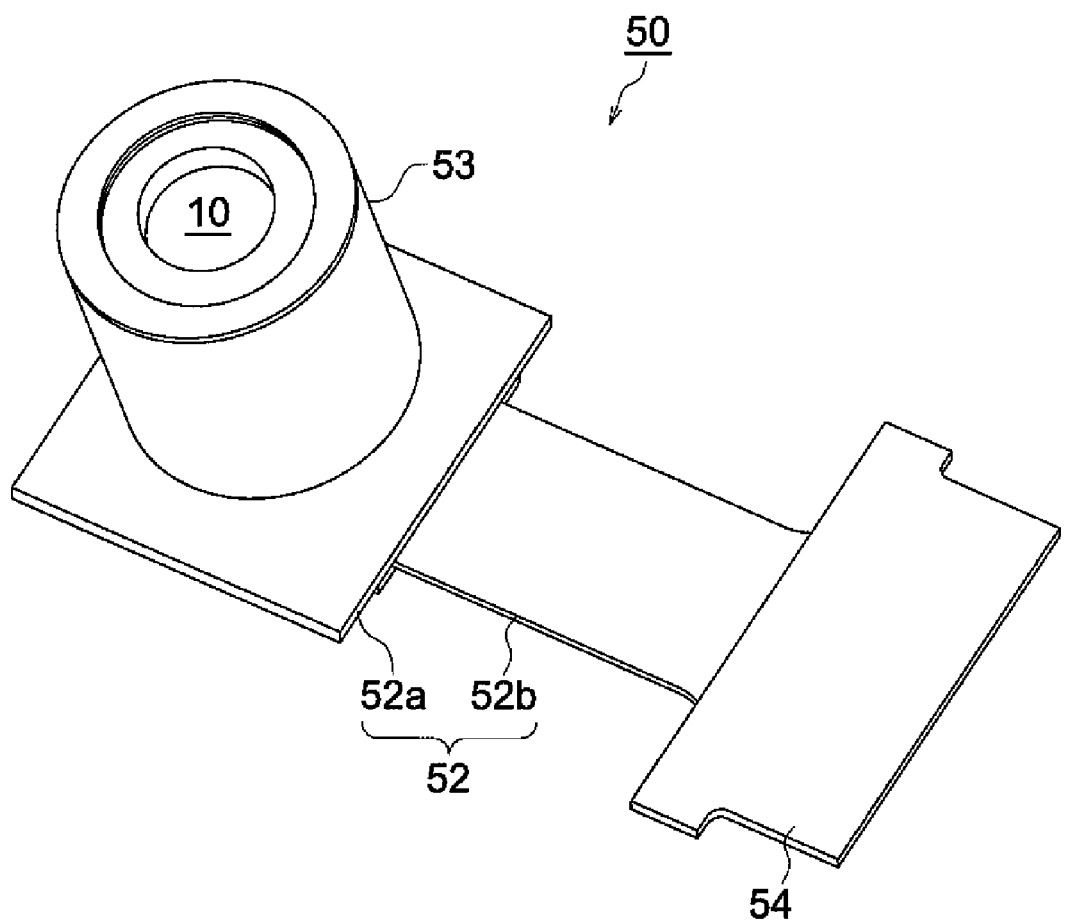
FIG. 1 is a perspective view of image pickup unit 50 relating to the embodiment of the invention.

Embodiments of the invention will be explained as follows.

One of the embodiments is an image pickup lens for forming an image of an object on a photoelectrical converter of a solid-state image pickup element. The image pickup lens comprises, in order from an object side thereof: an aperture stop; a first lens having a positive power and comprising a convex surface facing the object side; a second lens having a negative power and comprising a concave surface facing an image side of the image pickup lens; a third lens in a meniscus shape having a positive power and comprising a convex surface facing the image side; and a fourth lens in a meniscus shape having a negative power and comprising a convex surface facing the object side. The image pickup lens satisfies the following expressions (1) and (2).

$$2.0 < f123/D6 < 17.0 \tag{1}$$

$$0.2 < r4/f < 0.75 \tag{2}$$

In these expressions, f123 is a composite focal length of the first lens, the second lens, and the third lens, D6 is a length of an air space between the third lens and the fourth lens along an optical axis of the image pickup lens, r4 is a curvature radius of the surface of the second lens facing the image side, and f is a focal length of a total system of the image pickup lens.

A fundamental construction of the embodiment for obtaining a small-sized image pickup lens in which aberrations are properly corrected is composed of an aperture stop, the first lens having positive refractive power, the second lens having negative refractive power, the third lens having positive refractive power and the fourth lens having negative refractive power, in this order from the object side. This lens construction is the so-called telephoto type, in which a positive lens group composed of the first lens, the second lens and the third lens, and a negative fourth lens are arranged in this order from the object side. The construction is advantageous for downsizing in terms of a reduction of a total length of the image pickup lens.

As for a dimension of a small-sized image pickup lens, downsizing at the level satisfying the following expression is targeted. By satisfying this range, a small size and a light weight of the overall image pickup apparatus can be realized.

$$L/2Y < 1.10 \tag{7}$$

In this expression, L represents a distance along the optical axis from the lens surface closest to the object side to the focal point on the image side in the total image pickup lens system ("the focal point on the image side" means an image point formed when a parallel light beam that is in parallel with the optical axis enters the image pickup lens), and 2Y represents a length of a diagonal line of an image pickup surface of a solid-state image pickup element (a length of a diagonal line of a rectangular effective image pixel area of the solid-state image pickup element).

Meanwhile, when a parallel flat plate such as an optical lowpass filter, an infrared blocking filter or a seal glass of a solid-state image sensor package is arranged between the surface of the image pickup lens and the position of the focal point on the image side, the value of L mentioned above is required to be calculated under the condition that the space of the parallel flat plate is converted into an air distance. A range of the following expression is more preferable.

$$L/2Y < 1.10 \tag{7'}$$

Furthermore, by forming two lenses in the four-element construction into negative lenses, it is possible to increase the number of surfaces with divergent action to correcting Petzval's sum easily, and is possible to obtain an image pickup lens wherein excellent image forming performance is secured up to the peripheral portion of the formed image. Further, by forming at least one surface of the fourth lens arranged to be closest to the image side into an aspheric shape, it is possible to properly correct various aberrations on the peripheral portions of the image.

In addition, by arranging an aperture stop to be closest to the object side, it is possible to arrange a position of an exit pupil to be more farther from an image pickup surface, and to control an incident angle of the primary light beam in a light flux that forms images on a peripheral portion of an image pickup surface of a solid-state image pickup element (an angle formed by the primary light beam and the optical axis) to be small, thus, the so-called telecentricity can be secured. Further, even in the case where a mechanical shutter is needed, the mechanical shutter can be arranged at the closest position to the object side, and thereby, an image pickup lens whose total length is short can be obtained. In addition, by forming the surface facing the image side of the second lens into a concave surface, it is possible to correct Petzval's sum easily. By forming the third lens into a meniscus shape whose convex surface faces the image side, it is possible to inhibit occurrence of off-axis aberration, because a light beam to travel toward the peripheral portion of an image pickup element enters the surface facing the object side of the third lens at a small incident angle.

Herein, relationship between the total length of an image pickup lens and a focal length of the first lens is described. As is shown in FIG. 1, a lens construction of the embodiment is assumed to be a lens system including one positive thin lens and one negative thin lens with those lenses arranged with an interval of distance d, where the one positive thin lens is a complex lens composed of the first through third lenses (whose focal length is defined as f123) and the one negative thin lens is composed of the fourth lens (whose focal length is defined as f4). Then, the total length L of the lens system is given by the following expression.

$$L = fB + d \qquad (8)$$
$$= f(1 - d/f123) + d$$
$$= f - ((f/f123) - 1)d$$

As can be seen from the above expression, the total length of the image pickup lens becomes shorter as the distance d between the complex lens including the first through third lenses and the fourth lens becomes larger, under the assumption that focal length f of the total optical system and focal length f123 of the complex lens including the first through third lenses are constant. In other words, the total length of the image pickup lens can be shortened by separating the fourth lens from the complex lens including the first through third lenses.

As can be further seen from the above expression, the total length of the image pickup lens becomes shorter, as focal length f123 of the complex lens including the first through third lenses becomes shorter, under the assumption that the focal length f of the total optical system and distance d between the complex lens including the first through third lenses and the fourth lens are constant. In other words, it is possible to shorten the total length of the image pickup lens by increasing the refractive power of the complex lens including the first through third lenses.

By forming the surface facing the object side of the first lens into a convex surface, a position of a principal point of the first lens is moved to the object side. Therefore, a position of a principal point of the complex lens including the first through third lenses is moved to the object side. As a result, distance d between the complex lens including the first through third lenses and the fourth lens is increased, whereby, total length L of the lens system can be shortened. Further, by forming the fourth lens into a meniscus shape whose convex surface faces the object side, a position of a principal point of the fourth lens representing a negative lens is moved toward the image side, and distance d between the complex lens including the first through third lenses and the fourth lens is increased, therefore, total length L of the lens system can be shortened.

The expression (1) is a conditional expression for properly setting a focal length of the first lens and for properly attaining shortening the total length of the image pickup lens and correcting aberrations. When a value of the expression (1) is lower than the upper limit, it is possible to increase refractive power of the complex lens including the first through third lenses, and to separate the fourth lens sufficiently from the complex lens including the first through third lenses, thus, the total length of the image pickup lens can be shortened. Further, by separating the fourth lens from the third lens, it becomes easy to secure a space for inserting a light shielding member for preventing unwanted light such as ghost from appearing between the third lens and the fourth lens, because a surface of the third lens facing the image side and a surface of the fourth lens facing the object side do not come too close. Furthermore, when trying the positioning of a focal point through auto-focusing function and switching function to close-up photographing mode, the whole system of the lens group is moved in the direction of the optical axis, generally. In this case, space between the third lens and the fourth lens are properly secured, and it enables to adjusting the focal point by partially moving the lens group such that a part of the lens group, such as the first through third lenses, is moved in the direction of the optical axis. By employing this partial lens-movement, a part of the lens group, rather than the whole of the lens group, is needed to become a movable lens group. Therefore, a driving mechanism for the movable lens group can be simplified and downsizing and weight reduction of the overall image pickup apparatus can be achieved.

On the other hand, when a value of the expression (1) is greater than the lower limit, it is possible to control occurrence of spherical aberration and comatic aberration due to excessively strong refractive power of the complex lens including the first through third lenses, and it is simultaneously possible to prevent that the total length of the image pickup lens from being lengthened due to an excessively long distance between the third lens and the fourth lens. A range of the following expression is more preferable.

$$3.0 < f123/D6 < 17.0 \qquad (1')$$

Next, the expression (2) is a conditional expression for making a curvature radius of the surface facing the image side of the second lens to be appropriate. When a value of the conditional expression (2) is lower than the upper limit, the surface facing the image side of the second lens becomes a strong diverging surface, thus, spherical aberration caused on the first lens can be corrected properly, and at the same time, Petzval's sum can be kept to be small. On the other hand, when a value of the expression (2) is higher than the lower limit, spherical aberration is not corrected excessively, and it does not cause deterioration of workability of the second lens due to its excessively small curvature radius. A range of the following expression is more preferable.

$$0.25 < r4/f < 0.75 \quad (2')$$

In the above image pickup lens, it is preferable that the surface of the second lens facing the image side is in an aspheric shape on which a center portion has a negative refractive power and the negative refractive power becomes smaller at a position being farther from the center portion to a periphery.

By forming the surface of the second lens facing the image side into an aspheric shape such that negative refractive power becomes weaker from a position on the optical axis toward the periphery as stated above, it is possible to prevent occurrence of large comatic aberration due to the excessively large incident angle of a light beam entering the surface of the second lens facing the image side.

The above image pickup lens preferably satisfies the following expression (3).

$$10 < v2 < 31 \quad (3)$$

In the expression, v2 is an Abbe number of the second lens.

The expression (3) is a conditional expression for setting properly Abbe number of the second lens, and for correcting chromatic aberration favorably. By using a material having relatively large dispersion for the negative second lens, chromatic aberration can be corrected properly, but an incident angle of a light beam on the lens circumference grows greater, and magnification chromatic aberration causes, because the surface facing the image side of the second lens is a strong diverging surface.

In this case, if a value of the expression (3) is not higher than the lower limit, off-axis aberration can be corrected sufficiently, but magnification chromatic aberration caused with a light flux on the circumference grows greater. On the other hand, if a value of the expression (3) is made to be equal or higher than the upper limit, magnification chromatic aberration of the light flux on the circumference can be controlled to be small, but off-axis chromatic aberration is difficult to be corrected completely. A range of the expression (3) is preferable as a purpose to handle the above matters. Further, a range of the following expression is more preferable.

$$15 < v2 < 27 \quad (3')$$

The above image pickup lens preferably satisfies the following expression.

$$1.0 < Pair12/P < 3.0 \quad (4)$$

In the expression, P is a refractive power of a total system of the image pickup lens, and Pair 12 is a refractive power of an air lens formed from a surface of the first lens facing an image side and a surface of the second lens facing the object side, and is defined by the following expression:

$$Pair12 = \frac{1-n_1}{R_2} + \frac{n_2-1}{R_3} - D_2 \cdot \frac{(1-n_1) \cdot (n_2-1)}{R_2 \cdot R_3}, \quad (9)$$

where n1 is a refractive index of the first lens for d line, n2 is a refractive index of the second lens for d line, R2 is a curvature radius of the surface of the first lens facing the image side, R3 is a curvature radius of the surface of the second lens facing the object side, and D2 is a length of an air space between the first lens and the second lens along the optical axis.

The expression (4) is a conditional expression that provides appropriate refractive power of the air lens positioned between the first lens and the second lens, and provides appropriate aberration correction. When a refractive index of the air lens between the first lens and the second lens becomes stronger, the surface facing the image side of the first lens and the surface facing the object side of the second lens have smaller curvature radiuses. As its result, an incident angle of a light beam entering each of the surfaces becomes large and it causes higher-order commatic aberration and spherical aberration. On the other hand, when a value of the expression (4) is lower than the upper limit, the curvature radiuses of the surface facing the image side of the first lens and the surface facing the object side of the second lens do not become excessively small and the occurrence of the higher-order commatic aberration and spherical aberration can be prevented. Further, it is possible to prevent Petzval's sum from being excessively great because of refractive power of the air lens, and to keep the image plane to be flat. On the other hand, when a value of the expression (4) is higher than the lower limit, refractive power of the air lens can be secured properly and spherical aberration can be corrected properly. Further, a range of the following expression is more preferable.

$$1.0 < Pair12/P < 2.5 \quad (4')$$

Further, a range of the following expression is further more preferable.

$$1.0 < Pair12/P < 2.2 \quad (4'')$$

The above image pickup lens preferably satisfies the following expression.

$$-4.5 < Pair23/P < -2.0 \quad (5)$$

In the expression, P is a refractive power of a total system of the image pickup lens, and Pair23 is a refractive power of an air lens formed from the surface of the second lens facing an image side and a surface of the third lens facing the object side, and is defined by the following expression:

$$Pair23 = \frac{1-n_2}{R_4} + \frac{n_3-1}{R_5} - D_4 \cdot \frac{(1-n_2) \cdot (n_3-1)}{R_4 \cdot R_5} \quad (10)$$

where n2 is a refractive index of the second lens for d line, n3 is a refractive index of the third lens for d line, R4 is a curvature radius of the surface of the second lens facing the image side, R5 is a curvature radius of the surface of the third lens facing the object side, and D4 is a length of an air space between the second lens and the third lens along the optical axis.

The expression (5) is a conditional expression that provides appropriate refractive power of the air lens positioned between the second lens and the third lens, and provides appropriate aberration correction. When the refractive power of the air lens becomes strong, a curvature radius of the surface facing the image side of the second lens and a curvature radius of the surface facing the object side of the third lens become small, because both surfaces of the air lens positioned between the second lens and the third lens are convex. Due to this, a peripheral portion of the second lens and a peripheral portion of the third lens come close to each other. In contrast to this, when a value of the expression (5) is higher than the lower limit, refractive power of the air lens does not become too strong, and it is possible to avoid excessive approach between peripheral portions of the second lens and the third lens. Thereby, it becomes easy to secure a space for inserting a light shielding member for preventing unwanted light such as ghost from appearing between the second lens and the third lens. Further, when a value of the expression (5) is lower than the upper limit, it is possible to keep the image plane to be flat, because the air lens provides negative Petzval's value that cancels a large positive Petzval's value of the air lens between the first lens and the second lens. Further, a range of the following expression is more preferable.

$$-4.0 < Pair23/P < -2.5 \tag{5'}$$

In the above image pickup lens, a surface of the fourth lens facing the image side is in an aspheric shape on which a center portion has a negative refractive power, and the negative refractive power becomes smaller at a position being farther from the center portion to a periphery. The surface of the fourth lens facing the image side includes an inflection point.

By forming the surface facing the image side of the fourth lens into an aspheric shape on which the negative refractive power becomes smaller at a position being farther from the optical axis to the periphery, and an inflection point is included, telecentricity of a light flux at the image side can be secured easily. Further, it does not require the surface facing the image side of the second lens to have negative refractive power that is excessively weak on the lens periphery portion, which makes it possible to correct off-axis aberration properly. In this case, "the inflection point" means a point on an aspheric surface such that a tangential plane on a peak of the aspheric surface becomes perpendicular to the optical axis, on a curved line of the cross-sectional shape of the lens within its effective radius.

The above image pickup lens preferably satisfies the following expression.

$$1.58 < n2 < 2.10 \tag{6}$$

In the expression, n2 is a refractive index of the second lens for d line.

The expression (6) is a conditional expression for correcting chromatic aberration of the total system of the image pickup lens system and curvature of field properly. When a value of the expression (6) is higher than the lower limit, it is possible to properly maintain refractive power of the second lens having relatively large dispersion, whereby, chromatic aberration and curvature of field can be corrected favorably. On the other hand, when a value of the expression (6) is lower than the upper limit, the second lens can be constructed with glass materials which can be available easily. Further, a range of the following expression is more preferable.

$$1.60 < n2 < 2.00 \tag{6'}$$

In the above image pickup lens, the first lens and the second lens can be formed of a glass material.

In the image pickup lens in which the first and the second lenses having relatively strong refractive power are formed of glass material, fluctuation of an image point position in the case of temperature changes in the total image pickup lens system can be decreased. At the same time, by employing plastic lenses for the third lens and the fourth lens, it is possible to control cast to be low for the total image pickup lens. Further, when the first lens is formed of a glass material, the image pickup lens can be constructed without a plastic lens exposed in the outside, which makes it possible to avoid a problem that the first lens is damaged.

In the above image pickup lens, each of the first to fourth lenses can be formed of a plastic material.

In recent years, under the purpose of downsizing of an overall solid-state image pickup apparatus, there has been developed a solid-state image pickup element with a smaller pixel pitch, resulting in a smaller size of an image pickup surface, compared with a solid-state image pickup element having the same number of pixels. In the image pickup lens for the solid-state image pickup element having a small size of the image pickup surface of this kind, a focal length of the total optical system is requested to be relatively short, which makes a curvature radius and the outside diameter of each lens to be small considerably. Therefore, when compared with a glass lens manufactured through time-consuming grinding processing, image pickup lenses in which all lenses are plastic lenses manufactured by injection molding can be mass-produced at low cost even if each lens has a small curvature radius and a small outside diameter. In addition, it is possible to control wear and tear of a molding die because press temperature can be made low in the case of a plastic lens, resulting in reduction of the number of times for replacement of molding dies and of the number f times for maintenance, which realizes cost reduction.

In the above image pickup lens, the first lens is preferably a bi-convex lens in which a curvature radius of a surface facing the image side is smaller than that of a surface facing the object side, and the second lens is preferably in a meniscus shape comprising a convex surface facing the object side.

By forming the first lens into a bi-convex lens in which the surface facing the image side has a smaller curvature radius than the other, it prevents occurrence of higher order spherical aberration and comatic aberration caused when the curvature radius of the surface facing the object side of the first lens becomes small. Simultaneously, by making the surface facing the image side smaller, it strengthen the refractive power of the first lens. When the refractive power of the first lens in which axial light beam height is high is strengthened, a principal point at the image side of the complex lens including the first through third lenses approaches the object side, whereby, distance d between the complex lens including the first through third lenses and the fourth lens is broadened, which makes it possible to shorten the total length L. When the second lens is formed into a meniscus shape with a convex surface facing the object side, a position of the principal point of the complex lens including the first through third lenses moves toward the object side, whereby, distance d between the complex lens including the first through third lenses and the fourth lens is broadened, which makes it possible to shorten the total length L.

Another embodiment of the present invention is an image pickup apparatus comprising: the above image pickup lens.

The aforesaid image pickup lens is used in an image pickup apparatus representing an embodiment of the invention. An image pickup apparatus that is smaller in size and has higher property can be obtained by employing the image pickup lens representing the embodiment of the invention therein, Another embodiment of the present invention is a mobile terminal comprising the above image pickup apparatus. A mobile terminal that is smaller in size and has higher property can be obtained by employing the image pickup using representing the embodiment of the invention therein.

The aforesaid image pickup apparatus is used for the mobile terminal representing an embodiment of the invention. By using the image pickup apparatus representing the embodiment of the invention, the mobile terminal that is smaller in size and is more sophisticated can be obtained.

The aforesaid embodiment of the invention makes it possible to provide an image pickup lens with four elements in which various aberrations are properly corrected in spite of its size that is smaller than a conventional type, and to provide an image pickup apparatus and a mobile terminal which are equipped with the aforesaid image pickup lens.

Embodiments of the invention will be explained in detail as follows, referring to the drawings. FIG. 1 is a perspective view of image pickup unit 50 relating to the present embodiment, and FIG. 2 is a diagram schematically showing a cross-section of an image pickup optical system of the image pickup unit 50 along the optical axis.

As shown in FIG. 1, the image pickup unit 50 is equipped with CMOS type image sensor 51 representing a solid-state image pickup element having photoelectric conversion section 51a, image pickup lens 10 that forms an image of a photographic object on photoelectric conversion section 51a of the image sensor 51, substrate 52 that holds the image sensor 51 and has terminal for external connection 54 (that is also called external connection terminal) that transmits and receives electric signals, and casing 53 representing a lens barrel that has an aperture section for incidence of light from the photographic object side and is composed of a light shielding member, which are formed integrally.

Figure 2:
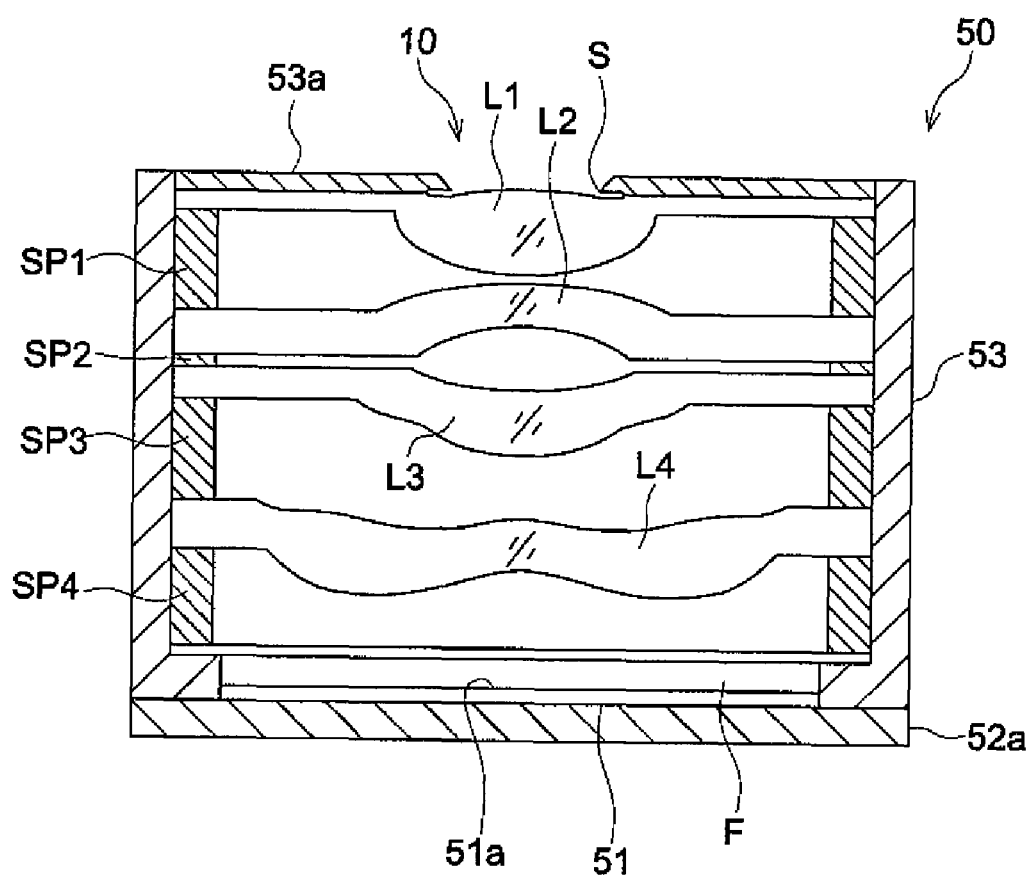
FIG. 2 is a diagram schematically showing a cross-section of image pickup unit 50 taken on a line of an optical axis of an image pickup optical system.

As is shown in FIG. 2, the photoelectric conversion section 51a serving as a light receiving section on which pixels (photoelectric conversion elements) are arranged on a two-dimensional basis, is formed at the central portion on a plane on the light receiving side of the image sensor 51, and signal processing circuits (unillustrated) are formed on the surroundings of the photoelectric conversion section 51a. The signal processing circuit of this kind is composed of a drive circuit section that drives each pixel in succession to obtain signal electric charges, A/D conversion section that converts each signal electric charge into a digital signal, and a signal processing section that forms image signal output by using this digital signal. Further, in the vicinity of the outer edge of the plane on the light receiving side of the image sensor 51, there are arranged many pads (not illustrated) which are connected to substrate 52 through wires W. The image sensor 51 converts signal electric charges coming from the photoelectric conversion section 51a into image signal such as digital Yuv signal, and outputs it to prescribed circuits on substrate 52 through wires W. In this case, Y represents luminance signals, U(=R−Y) represents color difference signals between red and luminance signals and V(=B−Y) represents color difference signals between blue and luminance signals. In the mean time, the image sensor is not limited to the aforesaid CMOS type image sensor, and other ones such as CCD may also be used.

The substrate 52 is equipped with supporting flat plate 52a that supports thereon image sensor 51 and casing 53 and with flexible substrate 52b whose one end portion is connected to the bottom surface (surface on the opposite side of image sensor 51) of the supporting flat plate 52a.

The supporting flat plate 52a has thereon many pads for signal transmission, and is connected to image sensor 51 through unillustrated wires, which is not illustrated.

In FIG. 1, the flexible substrate 52b has one end portion which is connected to supporting flat plate 52a and the flexible substrate 52b connects the supporting flat plate 52a to an outer circuit (for example, a control circuit owned by an upper level apparatus equipped with an image pickup unit) through external connection terminal 54 that is provided on the other end portion. It enables the flexible substrate 52b to be applied a voltage and receive clock signals for driving image sensor 51 from outer circuits, and to output digital YUV signals to the outer circuits. Further, the flexible substrate 52b has flexibility or deformation property on its intermediate section in its longitudinal direction. The deformation gives the supporting flat plate 52a a degree of freedom in terms of a direction and arrangement of external connection terminal 54.

In FIG. 2, image sensor 51 is provided on the supporting flat plate 52a of the substrate 52, and casing 53 is fixed on the surface where image sensor 51 is provided so as to cover the image sensor 51. Namely, the casing 53 has a large opening on the image sensor 51 side, and the casing 53 extends so as to surround the image sensor 51. Further, flange portion 53a having a small aperture is formed on the other end portion of the casing 53 (end portion on the object side), and the end portion on the image sensor 51 side (end portion on the image side) is in contact with the supporting flat plate 52a to be fixed. The end portion of casing 53 on the image sensor 51 side may also be in contact with an area surrounding the photoelectric conversion section 51a on the image sensor 51 to be fixed.

In casing 53, flange section 53a on which a small opening (aperture section for light incidence) is arranged to face the object side. In the inside of the casing 53, IR (infrared rays) blocking filter F is arranged to be fixed between image pickup lens 10 and image sensor 51.

In order from the object side, the image pickup lens 10 includes therein aperture stop S composed of a small aperture of flange section 53a, a first lens L1 with positive power whose convex surface faces the object side, a second lens L2 with a negative power whose concave surface faces the image side, a third lens L3 in a meniscus shape with a positive power whose convex surface faces the image side, and fourth lens L4 in a meniscus shape with a negative power whose convex surface faces the object side. The image pickup lens has a function to form an image of a photographic object on an image sensor. It is preferable that the first lens L1 is a bi-convex lens in which the surface facing the image side has a smaller curvature radius than that of the surface facing the object side. It is also preferable that the second lens L2 is in a meniscus shape whose convex surface faces the object side, and the surface of the second lens L2 facing the image side is in an aspheric shape on which the center has negative refractive power and the negative refractive power becomes gradually weaker toward the periphery. Further, it is preferable that the surface of the fourth lens L4 facing the image side is in an aspheric shape on which the center has negative refractive power, the negative refractive power becomes gradually weaker toward the periphery, and the surface has an inflection point. In the sheets of FIGS. 1 and 2, an upper side is assumed to be the object side, and a lower side is assumed to be the image side.

An external light shielding mask may also be arranged at a position closer to the object side than the first lens L1 for minimizing incidence of unwanted light coming from the outside. Further, aperture stop S is a member to determine an f-number of the total system of an image pickup lens.

Lenses L1 through L4 and IR blocking filter F are arranged at prescribed intervals with spacers SP1 through SP4 arranged between flanges of adjacent lenses. The IR blocking filter F is a member formed, for example, to be in a rectangular form or a circular form.

Figure 3:
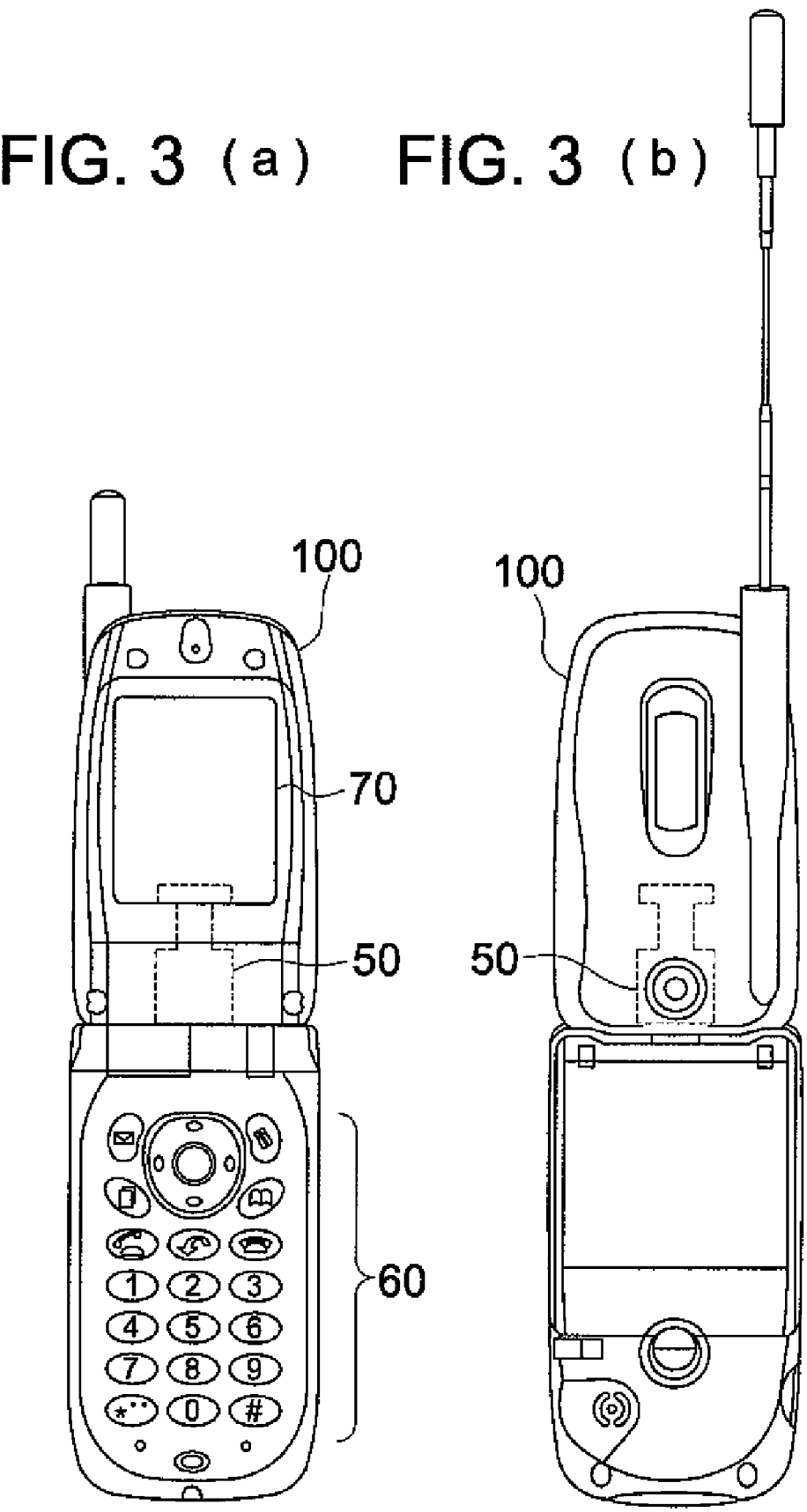
FIG. 3($a$) is a front view of a cell-phone to which an image pickup unit is applied, and FIG. 3($b$) is a rear view of a cell-phone on which an image pickup unit is applied.

Operations of the aforesaid image pickup unit 50 will be explained. Each of FIGS. 3(a) and 3(b) shows how the image pickup unit 50 is installed in cellphone 100 as a mobile terminal or an image pickup apparatus. Further, FIG. 4 is a block diagram of the cellphone 100.

The image pickup unit 50 is arranged at a position corresponding to the lower portion of a liquid crystal display section in the cellphone 100, so that the end surface of casing 53 on the object side faces the rear of the cellphone 100 (see FIG. 3(b)).

External connecting terminal 54 (represented as an arrow mark in FIG. 4) of the image pickup apparatus 50 is connected to the control section 101 of the mobile phone 100, and the image signal such as the brightness signal or the color difference signal is outputted to the control section 101.

Figure 4:
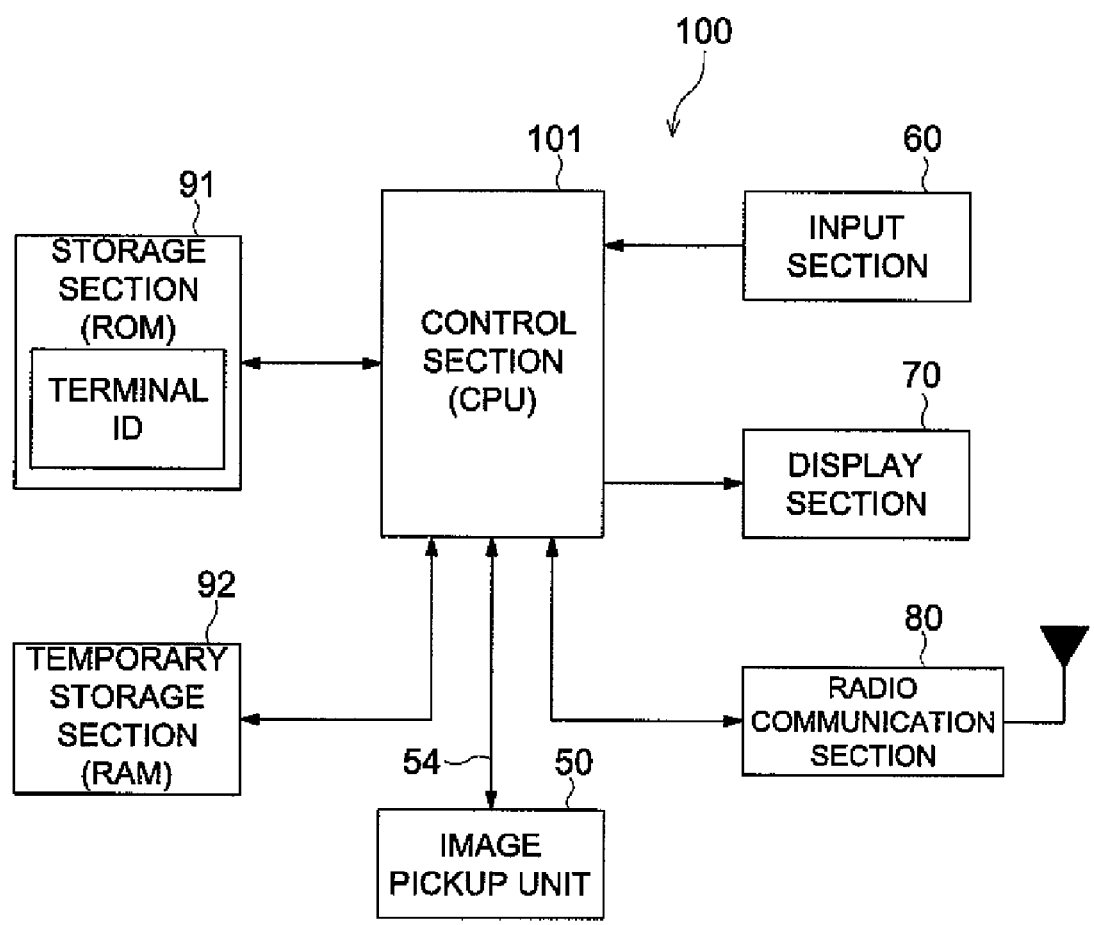
FIG. 4 is a control block diagram of a cell-phone shown in FIG. 3($a$) and FIG. 3($b$)

On the one hand, as shown in FIG. 4, the mobile phone 100 is provided with: a control section (CPU) 101 which generally controls each section and executes the program corresponding to each processing, input section 60 which is an input section for indicating and inputting the number, liquid crystal display section 70 that displays images taken in addition to prescribed data, a wireless communication section 80 for realizing an each kind of information communication to the external server, a storage section (ROM) 91 which stores the data necessary for the system program of the mobile phone 100 or each kind of processing program or terminal ID, and a temporary storage section (RAM) 92 which temporarily stores each kind of processing program or data or processing data processed by the control section 101, the image data by the image pickup apparatus 50, or is used as a working area.

Further, the image signal inputted from the image pickup apparatus 50 is stored in the storage section 91 by the control section 101 of the mobile phone 100, is displayed on the display section 70, and further is transmitted to the outside as the image information through the wireless communication section 80.

EXAMPLES

Examples of image pickup lenses applied to the aforesaid embodiments will be shown below. The following symbols are used in the respective examples.

f: Focal length of the total system of the image pickup lens
fB: Back focus
F: F-number
2Y: Diagonal length of image pickup surface of solid-state image pickup element (Diagonal length on rectangular effective pixel area of solid-state image pickup element)
ENTP: Entrance pupil position (Distance from the first surface to entrance pupil position)
EXTP: Emergence pupil position (Distance from image plane to the emergence pupil position)
H1: Front side principal point position (Distance from the first surface to front side principal point position)
H2: Rear side principal point position (Distance from the last surface to rear side principal point position)
R: Curvature radius of refractive surface
D: Surface distance of the optical axis
Nd: Refractive index of lens material at normal temperature for d-line
vd: Abbe number of lens material In each Example, the asterisk (*) following each surface number means an aspheric surface and the shape of the aspheric surface is expressed by the following expression (11), where X-axis extends along the optical axis direction, the top of the surface is on the origin, and the height perpendicular to the optical axis is h.

$$X = \frac{h^2/R}{1+\sqrt{1-(1+K)h^2/R^2}} + \sum A_i h^i \quad (11)$$

In the aforesaid expression, $A_i$ represents $i^{th}$ order aspheric surface coefficient, R represents a curvature radius and K represents a conic constant.

In the following description (including lens data in Tables), an exponent for 10 is assumed to be expressed by using E (for example, 2.5×10−02 is expressed by 2.5E−02). Further, surface numbers in lens data are numbered by assuming the surface of the first lens facing the object as the first surface.

Incidentally, each of all units of numerical values indicating lengths described in the Examples is mm.

EXAMPLE 1

Lens data of an image pickup lens in Example 1 is shown in the following Table 1.

TABLE 1

Example 1
f = 3.36 mm  fB = 0.35 mm  F = 2.88  2Y = 4.48 mm
ENTP = 0 mm  EXTP = −2.38 mm  H1 = −0.76 mm  H2 = −3 mm

| Surface No. | R (mm) | D (mm) | Nd | vd | Effective radius (mm) |
|---|---|---|---|---|---|
| 1 (stop) | ∞ | 0.000 | | | 0.58 |
| 2* | 2.805 | 0.680 | 1.53050 | 55.7 | 0.59 |
| 3* | −2.019 | 0.050 | | | 0.75 |
| 4* | 2.882 | 0.350 | 1.63200 | 23.4 | 0.84 |
| 5* | 1.275 | 0.530 | | | 0.85 |
| 6* | −1.852 | 0.530 | 1.53050 | 55.7 | 0.92 |
| 7* | −1.139 | 0.510 | | | 1.13 |
| 8* | 2.071 | 0.400 | 1.53050 | 55.7 | 1.83 |
| 9* | 1.002 | 0.600 | | | 2.01 |
| 10 | ∞ | 0.100 | 1.51630 | 64.1 | 2.26 |
| 11 | ∞ | | | | 2.28 |

Aspheric surface coefficient $2^{nd}$ surface

K = −6.03807E+00
A4 = −5.82097E−02
A6 = −1.18093E−01
A8 = 7.10023E−02
A10 = −1.85938E−01

$3^{rd}$ surface

K = −7.10503E−01
A4 = −6.50080E−02
A6 = −7.42217E−04
A8 = −2.79882E−02
A10 = −7.63598E−02

$4^{th}$ surface

K = −1.57297E+01
A4 = −4.94495E−03
A6 = 7.01805E−02
A8 = −4.40270E−03
A10 = −9.01443E−03

$5^{th}$ surface

K = −2.44108E+00
A4 = 1.73207E−02
A6 = 4.99967E−02
A8 = −9.92916E−03
A10 = 1.76977E−02

$6^{th}$ surface

K = 2.61751E−01
A4 = 9.46831E−02
A6 = −3.31336E−02
A8 = 1.93833E−01
A10 = −1.43780E−01

$7^{th}$ surface

K = −2.06596E+00
A4 = −1.55855E−02
A6 = 1.06512E−02
A8 = 7.13158E−02
A10 = 1.83143E−02
A12 = −3.07741E−02

$8^{th}$ surface

K = −1.99661E+01
A4 = −1.67012E−01
A6 = 8.87124E−02
A8 = −2.79256E−02

TABLE 1-continued

Example 1
f = 3.36 mm fB = 0.35 mm F = 2.88 2Y = 4.48 mm
ENTP = 0 mm EXTP = −2.38 mm H1 = −0.76 mm H2 = −3 mm

A10 = 5.59196E−03
A12 = −4.97995E−04

9th surface

K = −5.82389E+00
A4 = −1.16364E−01
A6 = 4.54251E−02
A8 = −1.45905E−02
A10 = 2.36724E−03
A12 = −1.42476E−04

Data of each single lens

| Lens No. | Front surface No. | Focal length (mm) |
|---|---|---|
| 1 | 2 | 2.327 |
| 2 | 4 | −3.953 |
| 3 | 6 | 4.436 |
| 4 | 8 | −4.208 |

Figure 5:
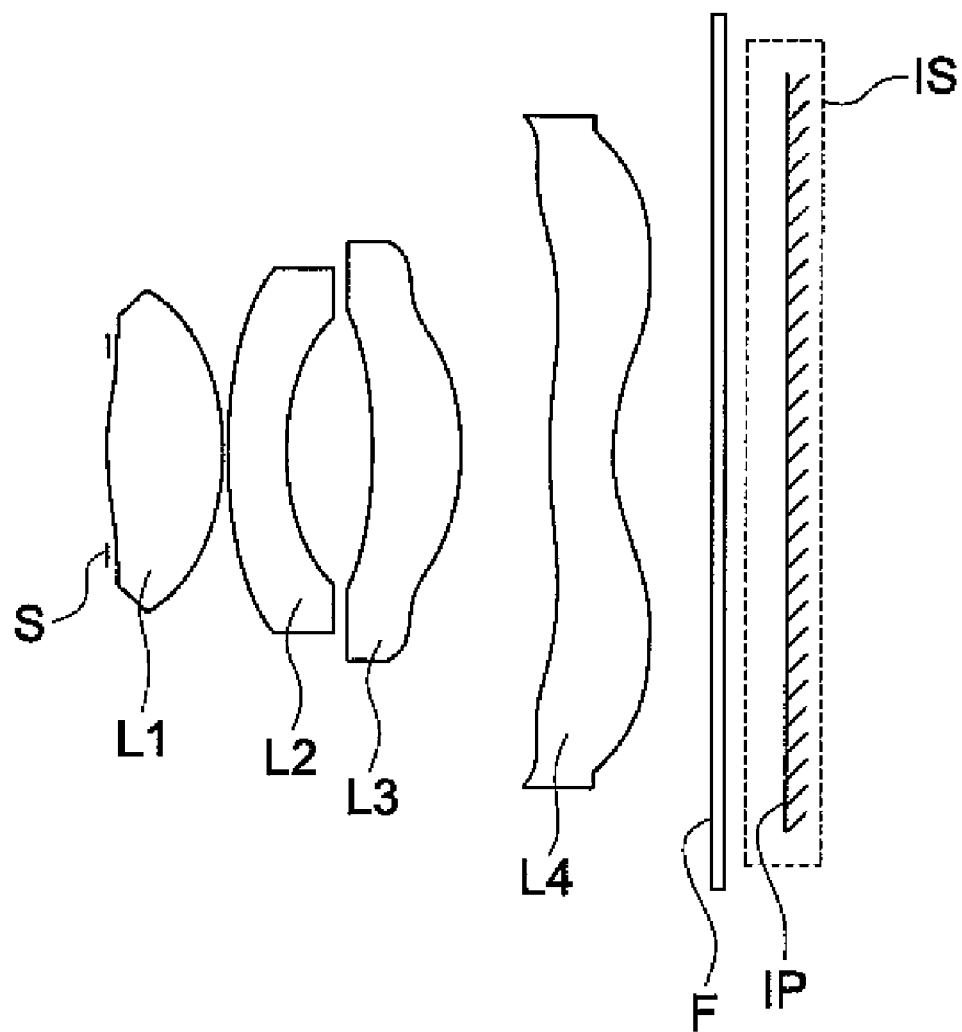
FIG. 5 is a sectional view in the direction of optical axis of the image pickup lens in Example 1.
Figure 6:
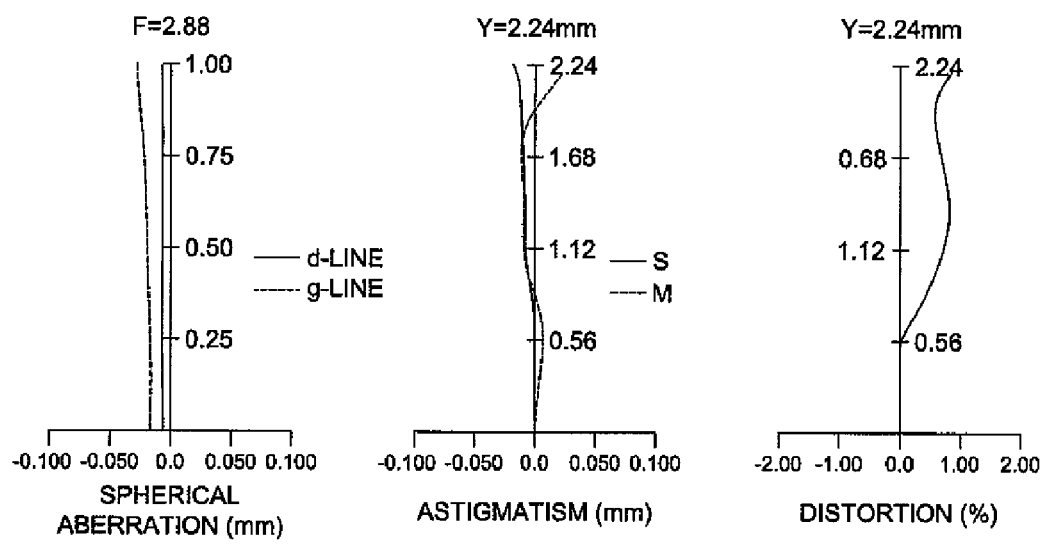
FIGS. 6($a$) through 6($d$) show aberration diagrams in Example 1 including spherical aberration, astigmatism, distortion, and meridional coma, respectively.
Figure 6:
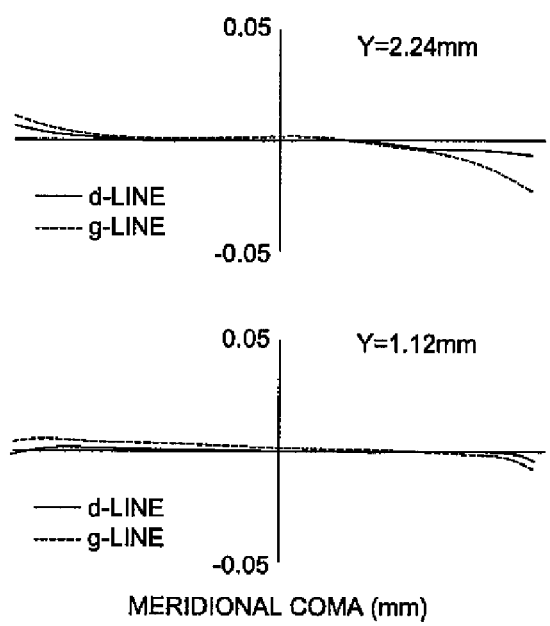

FIG. 5 is a cross-sectional view of the image pickup lens shown in Example 1. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS, In the Example 1, all lenses are formed with plastic materials.

FIGS. 6(a)-6(d) are diagrams of aberrations (spherical aberration, astigmatism, distortion and meridional coma, respectively) of the image pickup lens shown in Example 1. In the following diagrams of aberrations, solid lines correspond to d-line and dotted lines correspond to g-line in the diagram of spherical aberration, while, solid lines correspond to a suggital image surface and dotted lines correspond to a meridional image surface in the diagram of astigmatism.

EXAMPLE 2

Lens data of an image pickup lens in Example 2 is shown in the following Table 2.

TABLE 2

Example 2
f = 3.35 mm fB = 0.38 mm F = 2.47 2Y = 4.48 mm
ENTP = 0 mm EXTP = −2.36 mm H1 = −0.74 mm H2 = −2.96 mm

| Surface No. | R (mm) | D (mm) | Nd | νd | Effective radius (mm) |
|---|---|---|---|---|---|
| 1 (stop) | ∞ | 0.000 | | | 0.67 |
| 2* | 2.441 | 0.700 | 1.53050 | 55.7 | 0.69 |
| 3* | −2.339 | 0.050 | | | 0.84 |
| 4* | 3.452 | 0.350 | 1.63200 | 23.4 | 0.91 |
| 5* | 1.413 | 0.550 | | | 0.89 |
| 6* | −2.010 | 0.550 | 1.53050 | 55.7 | 0.95 |
| 7* | −1.102 | 0.420 | | | 1.13 |
| 8* | 2.182 | 0.400 | 1.53050 | 55.7 | 1.66 |
| 9* | 0.960 | 0.600 | | | 1.88 |
| 10 | ∞ | 0.100 | 1.51630 | 64.1 | 2.09 |
| 11 | ∞ | | | | 2.11 |

Aspheric surface coefficient

2nd surface

K = −3.66163E+00
A4 = −4.45759E−02

TABLE 2-continued

Example 2
f = 3.35 mm fB = 0.38 mm F = 2.47 2Y = 4.48 mm
ENTP = 0 mm EXTP = −2.36 mm H1 = −0.74 mm H2 = −2.96 mm

A6 = −9.45740E−02
A8 = 5.92487E−02
A10 = −1.30051E−01

3rd surface

K = −4.68797E−01
A4 = −6.18169E−02
A6 = 1.45143E−03
A8 = −6.49489E−03
A10 = −6.14341E−02

4th surface

K = −2.18627E+01
A4 = −7.96184E−03
A6 = 7.36841E−02
A8 = −6.76132E−03
A10 = −5.65109E−03

5th surface

K = −2.33834E+00
A4 = 1.70087E−02
A6 = 4.88623E−02
A8 = −1.26793E−02
A10 = 1.92575E−02

6th surface

K = 6.97353E−01
A4 = 8.13660E−02
A6 = −6.28110E−02
A8 = 2.02501E−01
A10 = −1.28577E−01

7th surface

K = −2.14913E+00
A4 = −2.10421E−02
A6 = −1.00754E−03
A8 = 6.42007E−02
A10 = 2.00287E−02
A12 = −2.48510E−02

8th surface

K = −2.98524E+01
A4 = −1.67775E−01
A6 = 9.01956E−02
A8 = −2.80439E−02
A10 = 5.60653E−03
A12 = −5.04000E−04

9th surface

K = −6.02174E+00
A4 = −1.19923E−01
A6 = 4.80063E−02
A8 = −1.51867E−02
A10 = 2.34861E−03
A12 = −1.28991E−04

Data of each single lens

| Lens No. | Front surface NO. | Focal length (mm) |
|---|---|---|
| 1 | 2 | 2.327 |
| 2 | 4 | −4.057 |
| 3 | 6 | 3.801 |
| 4 | 8 | −3.646 |

Figure 7:
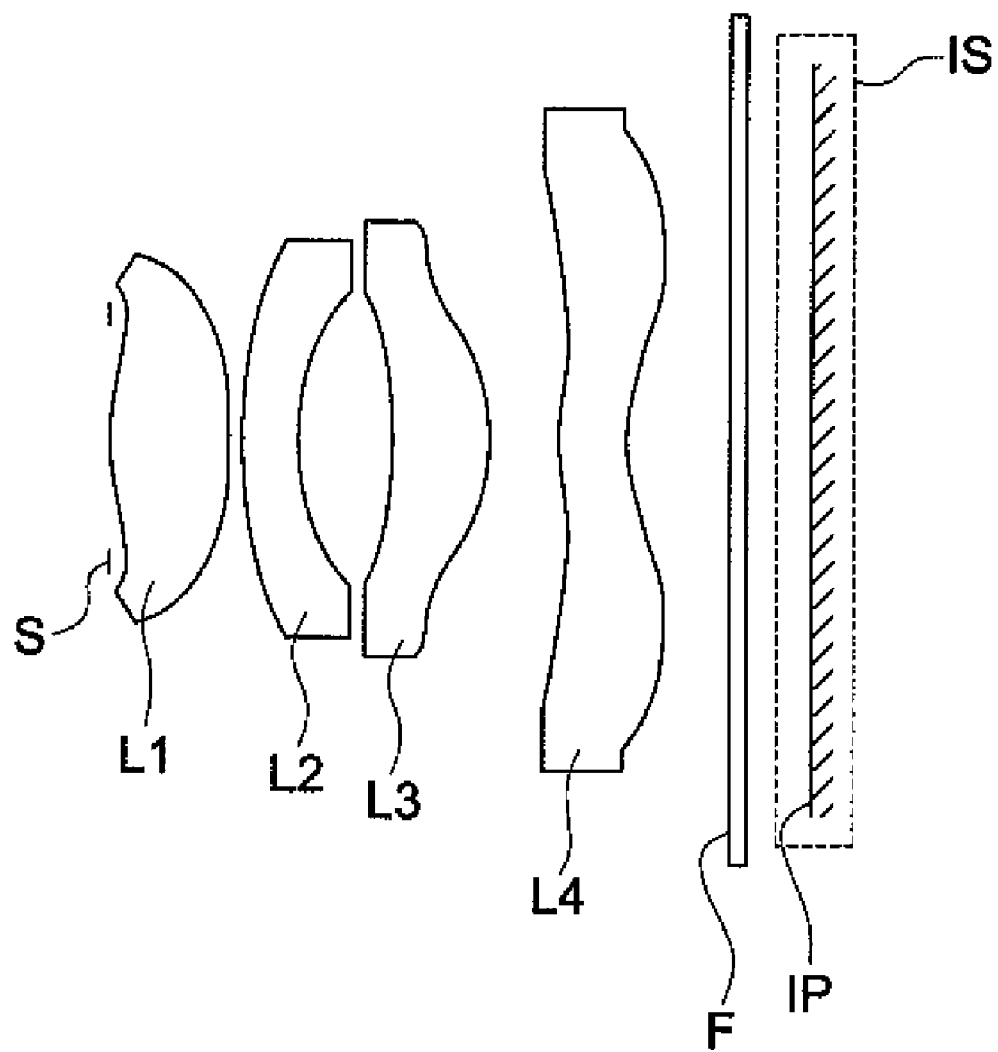
FIG. 7 is a sectional view in the direction of optical axis of the image pickup lens in Example 2.

FIG. 7 is a cross-sectional view of the image pickup lens shown in Example 2. The image pickup lens includes, in order from the object side along the optical axis, aperture stop S; first lens L1; second lens L2; third lens L3; fourth lens L4, parallel flat plate F assuming an optical lowpass filter, an IR blocking filter and a seal glass of solid state image sensor IS; and image pickup surface IP of solid-state image sensor IS. In the Example 2, all lenses are formed with plastic materials.

Figure 8:
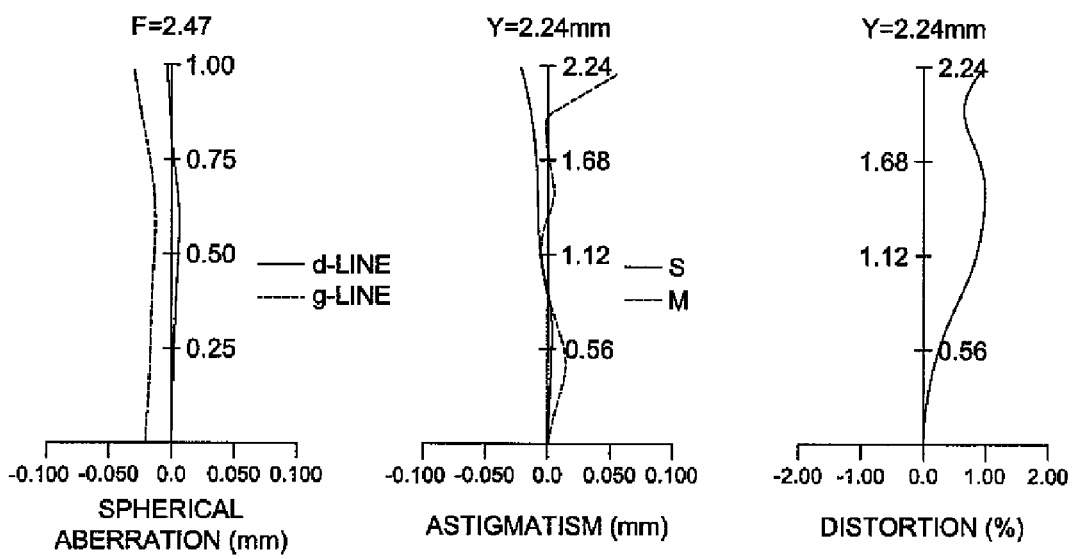
FIGS. 8($a$) through FIG. 8($d$) show aberration diagrams in Example 2 including spherical aberration, astigmatism, distortion, and meridional coma, respectively.
Figure 8:
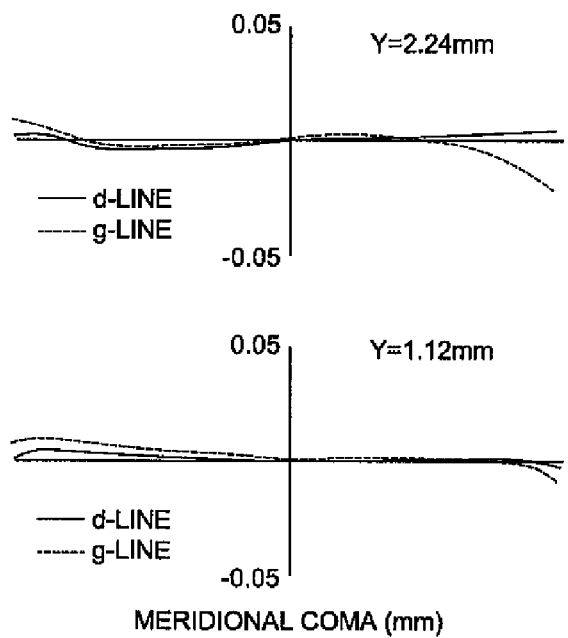

FIGS. 8(*a*)-8(*d*) are diagrams of aberrations (spherical aberration, astigmatism, distortion and meridional coma, respectively) of the image pickup lens shown in Example 2.

EXAMPLE 3

Lens data of an image pickup lens in Example 3 is shown in the following Table 3.

TABLE 3

Example 3
f = 3.01 mm fB = 0.34 mm F = 2.88 2Y = 4.48 mm
ENTP = 0 mm EXTP = −2.53 mm H1 = −0.12 mm H2 = −2.65 mm

| Surface No. | R (mm) | D (mm) | Nd | vd | Effective radius (mm) |
|---|---|---|---|---|---|
| 1 (stop) | ∞ | 0.050 | | | 0.52 |
| 2* | 3.799 | 0.710 | 1.54470 | 56.2 | 0.55 |
| 3* | −1.589 | 0.050 | | | 0.74 |
| 4* | 3.665 | 0.350 | 1.63200 | 23.4 | 0.83 |
| 5* | 1.351 | 0.490 | | | 0.87 |
| 6* | −1.743 | 0.630 | 1.53050 | 55.7 | 0.94 |
| 7* | −0.938 | 0.330 | | | 1.12 |
| 8* | 2.026 | 0.400 | 1.53050 | 55.7 | 1.66 |
| 9* | 0.885 | 0.600 | | | 1.90 |
| 10 | ∞ | 0.145 | 1.51630 | 64.1 | 2.08 |
| 11 | ∞ | | | | 2.11 |

Aspheric surface coefficient

2$^{nd}$ surface

K = −1.44014E+01
A4 = −8.06062E−02
A6 = −1.51067E−01
A8 = 1.53522E−01
A10 = −4.96452E−01

3$^{rd}$ surface

K = −9.08839E−01
A4 = −5.89476E−02
A6 = −3.28873E−02
A8 = −4.82579E−02
A10 = −7.56139E−02

4$^{th}$ surface

K = −2.62224E+01
A4 = −3.29615E−02
A6 = 4.05266E−02
A8 = −1.33949E−02
A10 = 9.21156E−03

5$^{th}$ surface

K = −2.85061E+00
A4 = 4.09648E−03
A6 = 3.76766E−02
A8 = −2.51991E−02
A10 = 9.71403E−03

6$^{th}$ surface

K = −4.09185E−01
A4 = 1.15903E−01
A6 = −1.70578E−02
A8 = 1.57693E−01
A10 = −1.07106E−01

7$^{th}$ surface

K = −2.36442E+00
A4 = −3.63042E−02
A6 = −1.59142E−02
A8 = 7.18833E−02
A10 = 3.03117E−02
A12 = −2.79957E−02

8$^{th}$ surface

K = −6.96042E+00
A4 = −1.81514E−01
A6 = 9.10655E−02

TABLE 3-continued

Example 3
f = 3.01 mm fB = 0.34 mm F = 2.88 2Y = 4.48 mm
ENTP = 0 mm EXTP = −2.53 mm H1 = −0.12 mm H2 = −2.65 mm

A8 = −2.78756E−02
A10 = 5.41679E−03
A12 = −4.62363E−04

9$^{th}$ surface

K = −4.24442E+00
A4 = −1.23177E−01
A6 = 4.99904E−02
A8 = −1.53410E−02
A10 = 2.40544E−03
A12 = −1.45366E−04

Data of each single lens

| Lens No. | Front surface No. | Focal length (mm) |
|---|---|---|
| 1 | 2 | 2.157 |
| 2 | 4 | −3.594 |
| 3 | 6 | 3.010 |
| 4 | 8 | −3.375 |

Figure 9:
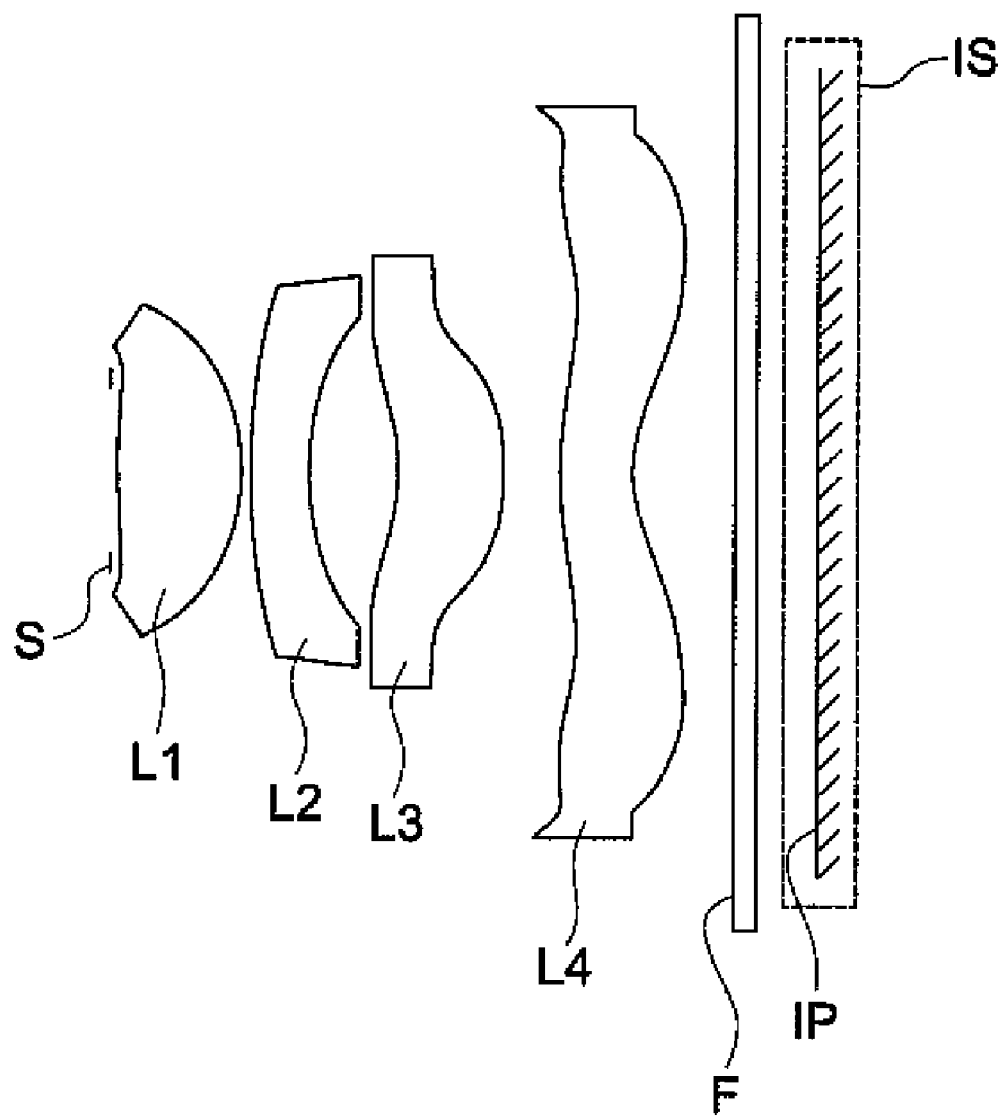
FIG. 9 is a sectional view in the direction of optical axis of the image pickup lens in Example 3.

FIG. 9 is a cross-sectional view of the image pickup lens shown in Example 3. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS, In the Example 3, all lenses are formed with plastic materials.

Figure 10:
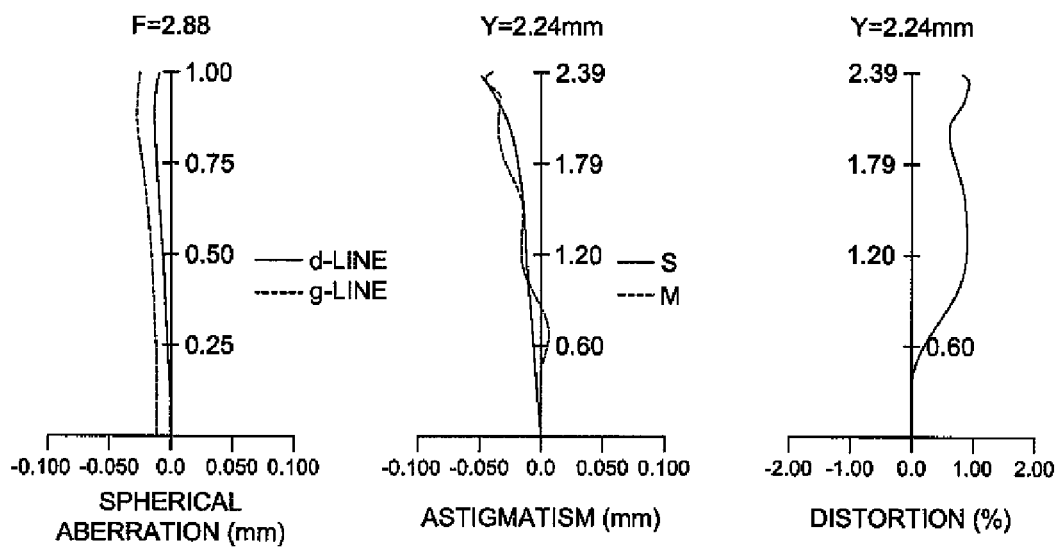
FIG. 10($a$) through FIG. 10($d$) show aberration diagrams in Example 3 including spherical aberration, astigmatism, distortion, and meridional coma, respectively.
Figure 10:
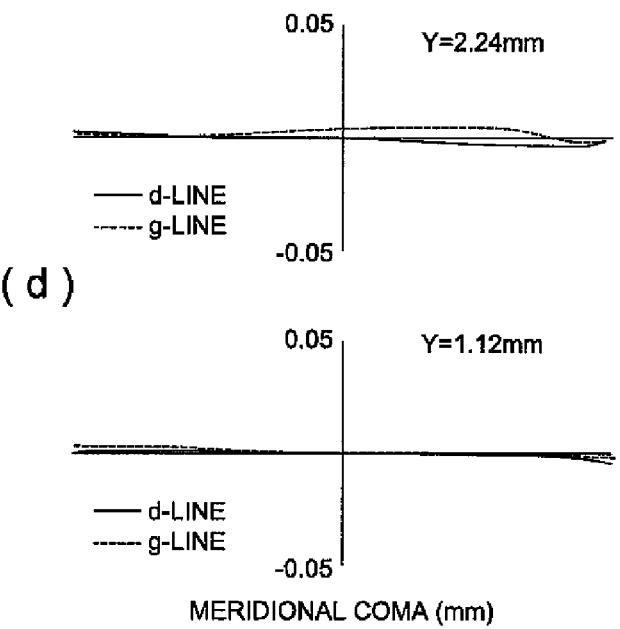

FIGS. 10(*a*)-10(*d*) are diagrams of aberrations (spherical aberration, astigmatism, distortion and meridional coma, respectively) of the image pickup lens shown in Example 3.

EXAMPLE 4

Lens data of an image pickup lens in Example 4 is shown in the following Table 4.

TABLE 4

Example 4
f = 4.32 mm fB = 0.38 mm F = 2.88 2Y = 5.67 mm
ENTP = 0 mm EXTP = −2.66 mm H1 = −1.82 mm H2 = −3.94 mm

| Surface No. | R (mm) | D (mm) | Nd | vd | Effective radius (mm) |
|---|---|---|---|---|---|
| 1 (stop) | ∞ | 0.000 | | | 0.75 |
| 2* | 2.478 | 0.620 | 1.53050 | 55.7 | 0.89 |
| 3* | −5.648 | 0.050 | | | 0.99 |
| 4* | 2.196 | 0.350 | 1.63200 | 23.4 | 1.08 |
| 5* | 1.285 | 0.500 | | | 1.05 |
| 6* | −3.847 | 0.530 | 1.53050 | 55.7 | 1.11 |
| 7* | −2.023 | 1.290 | | | 1.23 |
| 8* | 2.379 | 0.450 | 1.53050 | 55.7 | 2.14 |
| 9* | 1.298 | 0.550 | | | 2.39 |
| 10 | ∞ | 0.145 | 1.51630 | 64.1 | 2.66 |
| 11 | ∞ | | | | 2.70 |

Aspheric surface coefficient

2$^{nd}$ surface

K = −5.19345E−01
A4 = −9.95441E−03
A6 = −3.70079E−02
A8 = 3.18913E−02
A10 = −2.41371E−02

TABLE 4-continued

Example 4
f = 4.32 mm fB = 0.38 mm F = 2.88 2Y = 5.67 mm
ENTP = 0 mm EXTP = −2.66 mm H1 = −1.82 mm H2 = −3.94 mm $3^{rd}$ surface K = −1.49820E+01
A4 = −2.50549E−02
A6 = 2.18010E−02
A8 = −1.73279E−02
A10 = −5.35663E−03

$4^{th}$ surface

K = −7.43881E+00
A4 = −7.11490E−03
A6 = 2.54373E−02
A8 = 8.08177E−03
A10 = −6.87053E−03

$5^{th}$ surface

K = −2.51309E+00
A4 = 5.60764E−03
A6 = 2.43503E−02
A8 = 1.39954E−02
A10 = −8.39252E−03

$6^{th}$ surface

K = −3.83212E−01
A4 = 3.71992E−02
A6 = 4.50174E−02
A8 = 3.12756E−02
A10 = −2.43267E−02

$7^{th}$ surface

K = −1.97948E+00
A4 = 1.13576E−02
A6 = 2.44582E−02
A8 = 2.73189E−02
A10 = 5.77074E−03
A12 = −8.90552E−03

$8^{th}$ surface

K = −2.21858E+01
A4 = −1.07862E−01
A6 = 3.37516E−02
A8 = −5.90660E−03
A10 = 6.70129E−04
A12 = −3.54350E−05

$9^{th}$ surface

K = −6.65018E+00
A4 = −6.78815E−02
A6 = 1.60488E−02
A8 = −3.05089E−03
A10 = 3.11376E−04
A12 = −1.19920E−05

Data of each single lens

| Lens No. | Front surface No. | Focal length (mm) |
|---|---|---|
| 1 | 2 | 3.335 |
| 2 | 4 | −5.760 |
| 3 | 6 | 7.304 |
| 4 | 8 | −6.297 |

Figure 11:
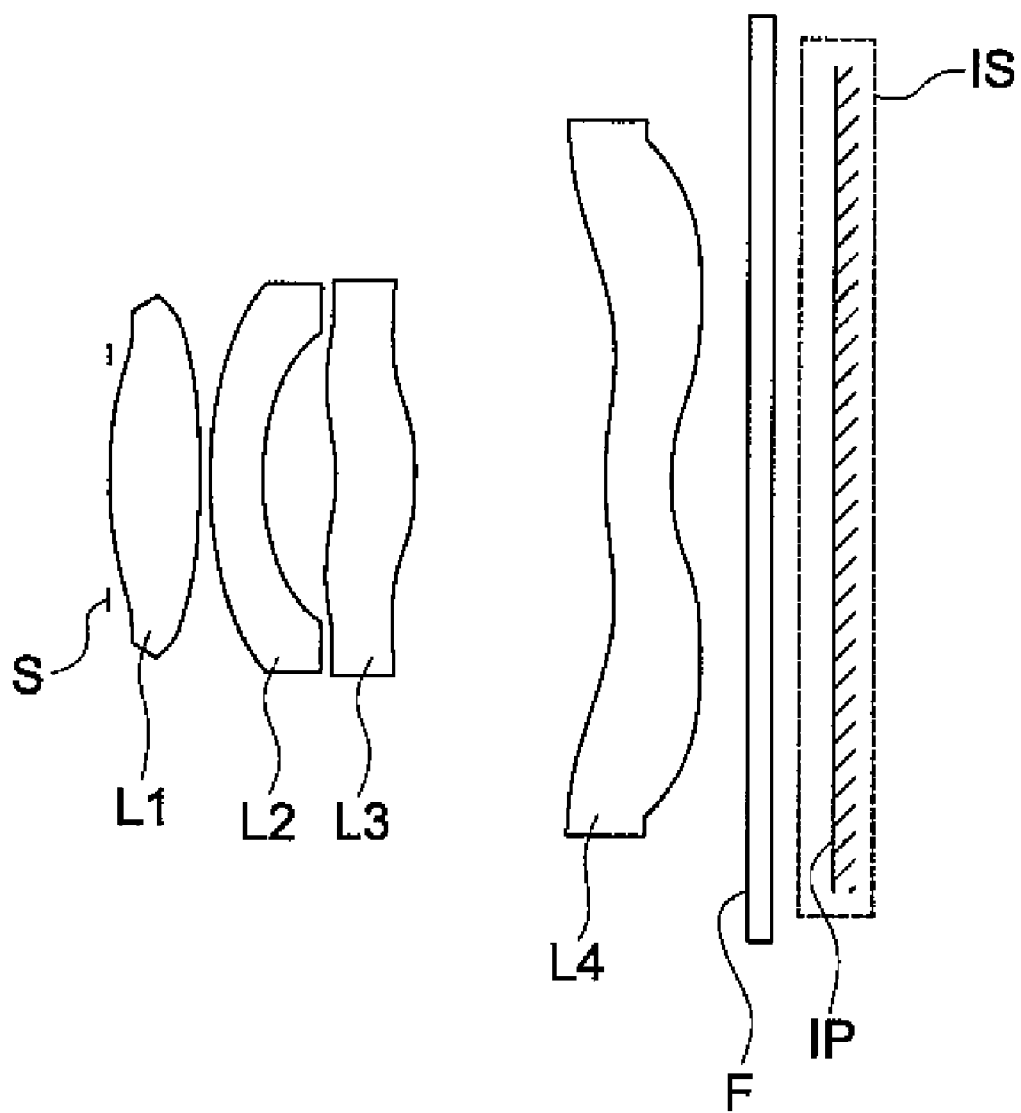
FIG. 11 is a sectional view in the direction of optical axis of the image pickup lens in Example 4.
Figure 12:
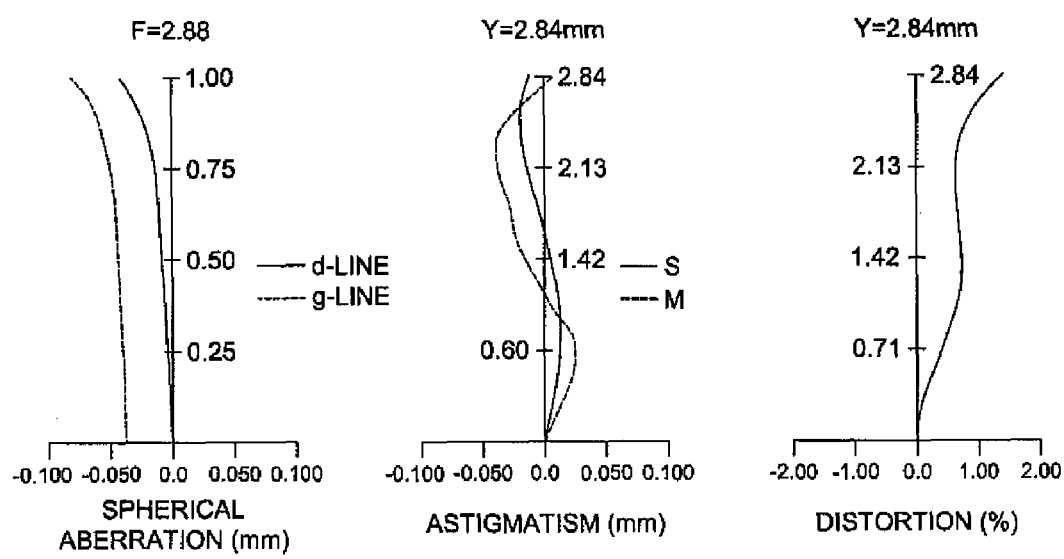
FIG. 12(a) through FIG. 12(d) show aberration diagrams in Example 4 including spherical aberration, astigmatism, distortion, and meridional coma, respectively.

FIG. 11 is a cross-sectional view of the image pickup lens shown in Example 4. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 4, all lenses are formed with plastic materials.

FIGS. 12(a)-12(d) are diagrams of aberrations (spherical aberration, astigmatism, distortion and meridional coma, respectively) of the image pickup lens shown in Example 4.

EXAMPLE 5

Lens data of an image pickup lens in Example 5 is shown in the following Table 5.

TABLE 5

Example 5
f = 3.43 mm fB = 0.34 mm F = 2.88 2Y = 4.48 mm
ENTP = 0 mm EXTP = −2.34 mm H1 = −0.92 mm H2 = −3.06 mm

| Surface No. | R (mm) | D (mm) | Nd | νd | Effective radius (mm) |
|---|---|---|---|---|---|
| 1 (stop) | ∞ | 0.000 | | | 0.60 |
| 2* | 2.621 | 0.692 | 1.53050 | 55.7 | 0.64 |
| 3* | −1.534 | 0.050 | | | 0.79 |
| 4* | 6.671 | 0.350 | 1.58300 | 30.0 | 0.82 |
| 5* | 1.211 | 0.434 | | | 0.87 |
| 6* | −2.264 | 0.511 | 1.53050 | 55.7 | 0.96 |
| 7* | −1.263 | 0.574 | | | 1.07 |
| 8* | 2.516 | 0.450 | 1.53050 | 55.7 | 1.61 |
| 9* | 1.141 | 0.600 | | | 1.87 |
| 10 | ∞ | 0.100 | 1.51630 | 64.1 | 2.10 |
| 11 | ∞ | | | | 2.13 |

Aspheric surface coefficient $2^{nd}$ surface

K = −4.73854E+00
A4 = −6.14384E−02
A6 = −1.83718E−01
A8 = 8.74882E−02
A10 = −3.30081E−01

$3^{rd}$ surface

K = −1.28564E+00
A4 = −5.57798E−02
A6 = −1.22253E−01
A8 = 1.39269E−01
A10 = −2.50745E−01

$4^{th}$ surface

K = −3.00000E+01
A4 = −1.73070E−01
A6 = 1.74567E−01
A8 = 3.27540E−02
A10 = −9.23073E−02

$5^{th}$ surface

K = −3.77785E+00
A4 = −2.57529E−03
A6 = 7.37811E−02
A8 = 2.70536E−02
A10 = −5.38468E−02

$6^{th}$ surface

K = −1.87908E+00
A4 = 1.34081E−01
A6 = −2.00746E−02
A8 = 1.63495E−01
A10 = −1.09844E−01

$7^{th}$ surface

K = −2.23950E+00
A4 = 1.89876E−02
A6 = 3.08565E−02
A8 = 7.82397E−02
A10 = 1.93529E−02
A12 = −3.54131E−02

$8^{th}$ surface

K = −1.94518E+01
A4 = −1.71381E−01
A6 = 8.93863E−02

TABLE 5-continued

Example 5
f = 3.43 mm fB = 0.34 mm F = 2.88 2Y = 4.48 mm
ENTP = 0 mm EXTP = −2.34 mm H1 = −0.92 mm H2 = −3.06 mm A8 = −2.80425E−02
A10 = 5.75653E−03
A12 = −5.33312E−04
$9^{th}$ surface K = −5.63542E+00
A4 = −1.20793E−01
A6 = 4.90809E−02
A8 = −1.44781E−02
A10 = 2.09023E−03
A12 = −1.18199E−04

Data of each single lens

| Lens No. | Front surface No. | Focal length (mm) |
|---|---|---|
| 1 | 2 | 1.936 |
| 2 | 4 | −2.599 |
| 3 | 6 | 4.578 |
| 4 | 8 | −4.442 |

Figure 13:
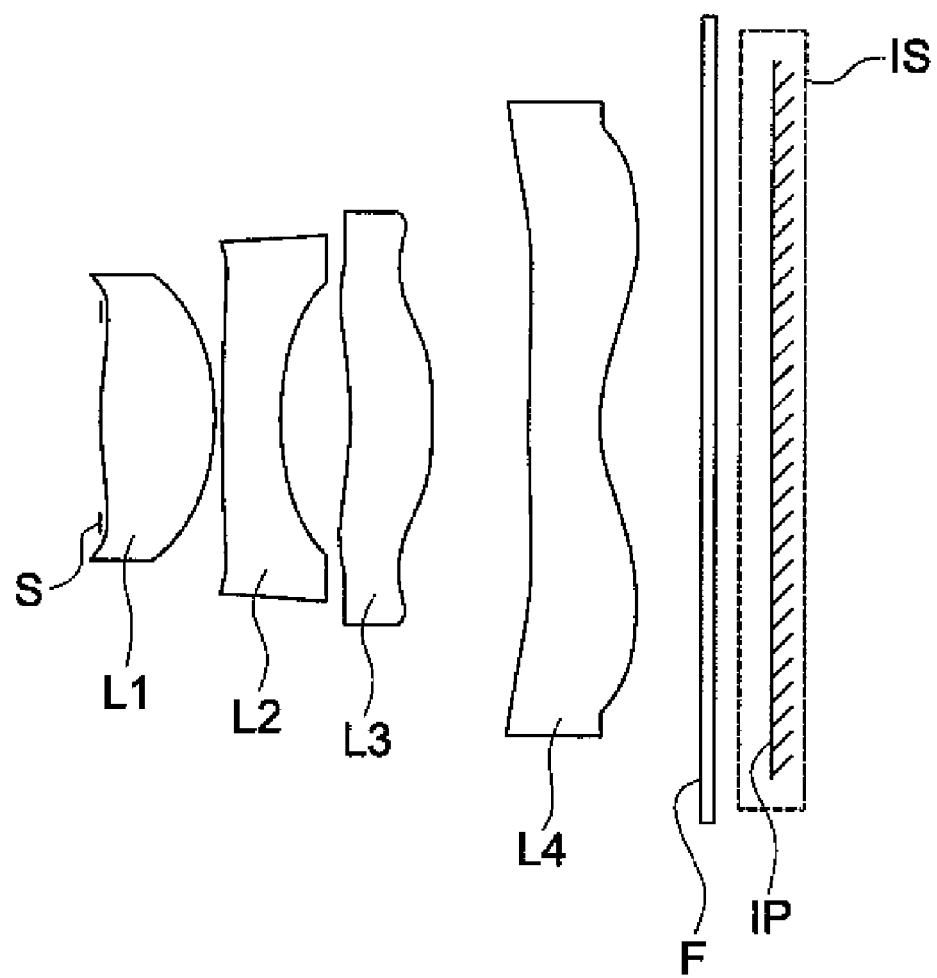
FIG. 13 is a sectional view in the direction of optical axis of the image pickup lens in Example 5.
Figure 14:
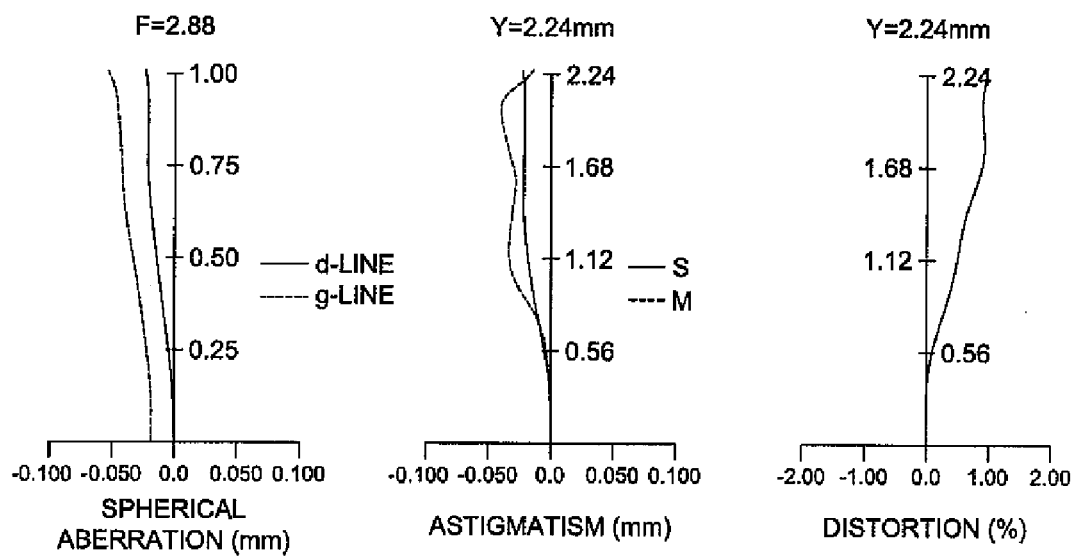
FIGS. 14(a) through 14(d) show aberration diagrams in Example 5 including spherical aberration, astigmatism, distortion, and meridional coma, respectively.
Figure 14:
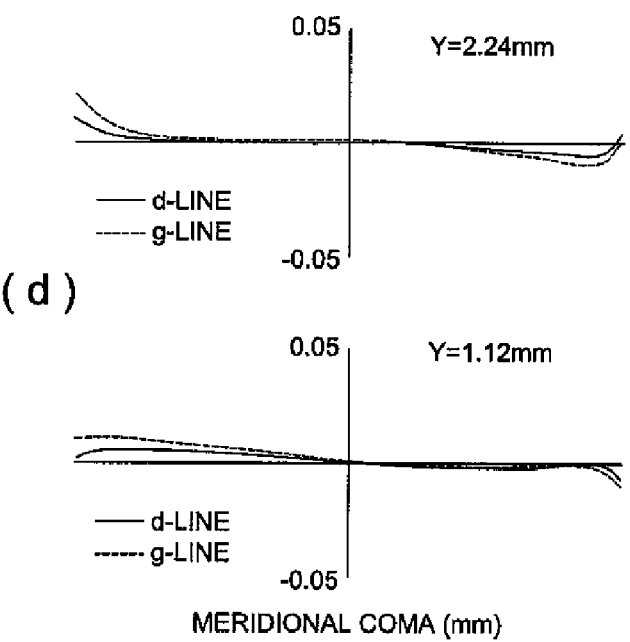

FIG. 13 is a cross-sectional view of the image pickup lens shown in Example 5. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 4, all lenses are formed with plastic materials.

FIGS. 14(a)-14(d) are diagrams of aberrations (spherical aberration, astigmatism, distortion and meridional coma, respectively) of the image pickup lens shown in Example 5.

EXAMPLE 6

Lens data of an image pickup lens in Example 6 is shown in the following Table 6.

TABLE 6

Example 6
f = 3.43 mm fB = 0.32 mm F = 2.88 2Y = 4.48 mm
ENTP = 0 mm EXTP = −2.34 mm H1 = −0.96 mm H2 = −3.09 mm

| Surface No. | R (mm) | D (mm) | Nd | vd | Effective radius (mm) |
|---|---|---|---|---|---|
| 1 (stop) | ∞ | 0.000 | | | 0.60 |
| 2* | 2.845 | 0.760 | 1.59200 | 67.0 | 0.63 |
| 3* | −1.408 | 0.050 | | | 0.80 |
| 4* | 4.078 | 0.350 | 1.81470 | 37.0 | 0.82 |
| 5* | 1.159 | 0.440 | | | 0.83 |
| 6* | −1.791 | 0.530 | 1.53050 | 55.7 | 0.90 |
| 7* | −1.134 | 0.500 | | | 1.07 |
| 8* | 3.013 | 0.450 | 1.53050 | 55.7 | 1.65 |
| 9* | 1.225 | 0.600 | | | 1.88 |
| 10 | ∞ | 0.100 | 1.51630 | 64.1 | 2.11 |
| 11 | ∞ | | | | 2.14 |

Aspheric surface coefficient $2^{nd}$ surface

K = −5.87227E+00
A4 = −7.13907E−02
A6 = −2.24523E−01
A8 = 1.93092E−01
A10 = −5.22070E−01

TABLE 6-continued

Example 6
f = 3.43 mm fB = 0.32 mm F = 2.88 2Y = 4.48 mm
ENTP = 0 mm EXTP = −2.34 mm H1 = −0.96 mm H2 = −3.09 mm $3^{rd}$ surface K = −1.34914E+00
A4 = −5.20260E−02
A6 = −1.52781E−01
A8 = 1.83740E−01
A10 = −2.61547E−01
$4^{th}$ surface K = −2.99984E+01
A4 = −1.34130E−01
A6 = 1.50407E−01
A8 = 2.09913E−02
A10 = −8.69219E−02
$5^{th}$ surface K = −3.82476E+00
A4 = 5.91242E−03
A6 = 9.58701E−02
A8 = 2.79859E−02
A10 = −7.93594E−02
$6^{th}$ surface K = −1.44366E+00
A4 = 1.28210E−01
A6 = 1.26354E−02
A8 = 1.55110E−01
A10 = −1.22625E−01
$7^{th}$ surface K = −1.93965E+00
A4 = 2.08326E−02
A6 = 3.95803E−02
A8 = 7.05336E−02
A10 = 1.71742E−03
A12 = −2.81230E−02
$8^{th}$ surface K = −3.00000E+01
A4 = −1.49172E−01
A6 = 8.65360E−02
A8 = −2.85720E−02
A10 = 5.63628E−03
A12 = −4.85553E−04
$9^{th}$ surface K = −6.41147E+00
A4 = −1.16228E−01
A6 = 4.78742E−02
A8 = −1.38823E−02
A10 = 1.87857E−03
A12 = −9.27530E−05

Data of each single lens

| Lens No. | Front surface No. | Focal length (mm) |
|---|---|---|
| 1 | 2 | 1.704 |
| 2 | 4 | −2.100 |
| 3 | 6 | 4.552 |
| 4 | 8 | −4.264 |

Figure 15:
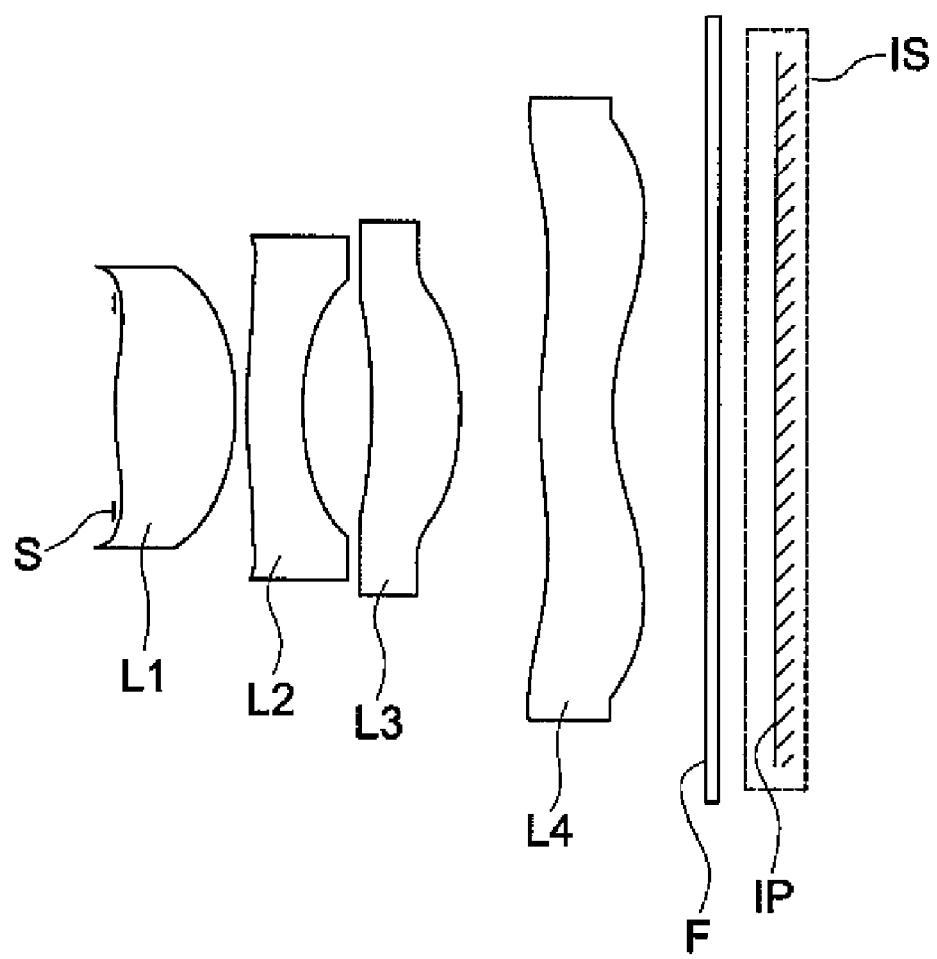
FIG. 15 is a sectional view in the direction of optical axis of the image pickup lens in Example 6.
Figure 16:
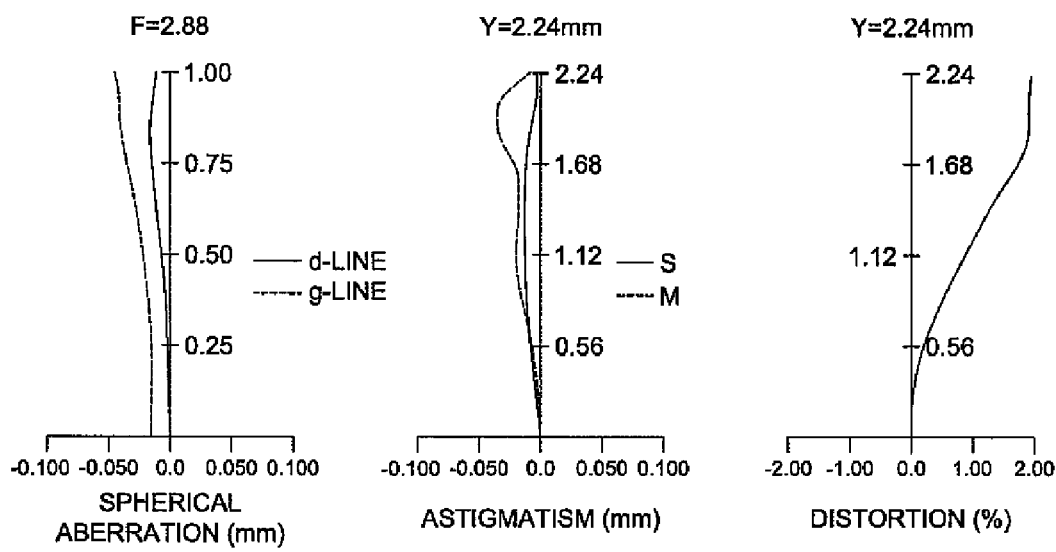
FIGS. 16(a) through 16(d) show aberration diagrams in Example 6 including spherical aberration, astigmatism, distortion, and meridional coma, respectively.
Figure 16:
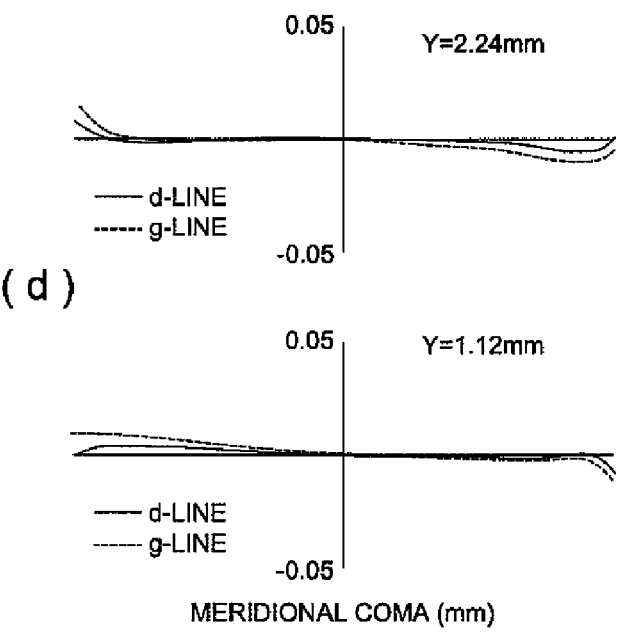

FIG. 15 is a cross-sectional view of the image pickup lens shown in Example 6. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 6, each of the first lens and the second lens is a glass mold lens, and the third lens and the fourth lens are formed by a plastic material.

FIGS. 16(a)-16(d) are diagrams of aberrations (spherical aberration, astigmatism, distortion and meridional coma, respectively) of an image pickup lens shown in Example 6.

EXAMPLE 7

Lens data of an image pickup lens in Example 7 is shown in the following Table 7.

TABLE 7

Example 7
f = 3.43 mm fB = 0.29 mm F = 2.88 2Y = 4.48 mm
ENTP = 0 mm EXTP = −2.39 mm H1 = −0.96 mm H2 = −3.14 mm

| Surface No. | R (mm) | D (mm) | Nd | vd | Effective radius (mm) |
|---|---|---|---|---|---|
| 1 (stop) | ∞ | 0.000 | | | 0.60 |
| 2* | 2.846 | 0.540 | 1.54470 | 56.2 | 0.64 |
| 3* | −2.707 | 0.050 | | | 0.76 |
| 4* | 2.040 | 0.350 | 1.63200 | 23.4 | 0.83 |
| 5* | 1.105 | 0.431 | | | 0.84 |
| 6* | −2.790 | 0.485 | 1.54470 | 56.2 | 0.93 |
| 7* | −1.515 | 0.812 | | | 1.03 |
| 8* | 2.119 | 0.400 | 1.53050 | 55.7 | 1.67 |
| 9* | 1.160 | 0.600 | | | 1.88 |
| 10 | ∞ | 0.100 | 1.51630 | 64.1 | 2.12 |
| 11 | ∞ | | | | 2.14 |

Aspheric surface coefficient $2^{nd}$ surface

K = −5.25611E+00
A4 = −5.26585E−02
A6 = −1.13497E−01
A8 = 1.00133E−01
A10 = −2.27626E−01

$3^{rd}$ surface

K = −4.68074E−02
A4 = −7.92344E−02
A6 = −1.08143E−03
A8 = 3.54004E−02
A10 = −1.68299E−01

$4^{th}$ surface

K = −7.86763E+00
A4 = −2.21273E−02
A6 = 4.35334E−02
A8 = 5.65259E−02
A10 = −7.34349E−02

$5^{th}$ surface

K = −2.04449E+00
A4 = −4.75591E−03
A6 = 3.81257E−02
A8 = 6.31017E−02
A10 = −7.02867E−02

$6^{th}$ surface

K = −1.44366E+00
A4 = 1.28210E−01
A6 = 1.26354E−02
A8 = 1.55110E−01
A10 = −1.22625E−01

$7^{th}$ surface

K = −1.93965E+00
A4 = 2.08326E−02
A6 = 3.95803E−02
A8 = 7.05336E−02
A10 = 1.71742E−03
A12 = −2.81230E−02

$8^{th}$ surface

K = −3.00000E+01
A4 = −1.49172E−01
A6 = 8.65360E−02

TABLE 7-continued

Example 7
f = 3.43 mm fB = 0.29 mm F = 2.88 2Y = 4.48 mm
ENTP = 0 mm EXTP = −2.39 mm H1 = −0.96 mm H2 = −3.14 mm

A8 = −2.85720E−02
A10 = 5.63628E−03
A12 = −4.85553E−04

$9^{th}$ surface

K = −6.41147E+00
A4 = −1.16228E−01
A6 = 4.78742E−02
A8 = −1.38823E−02
A10 = 1.87857E−03
A12 = −9.27530E−05

Data of each single lens

| Lens No. | Front surface No. | Focal length (mm) |
|---|---|---|
| 1 | 2 | 2.638 |
| 2 | 4 | −4.464 |
| 3 | 6 | 5.368 |
| 4 | 8 | −5.653 |

Figure 17:
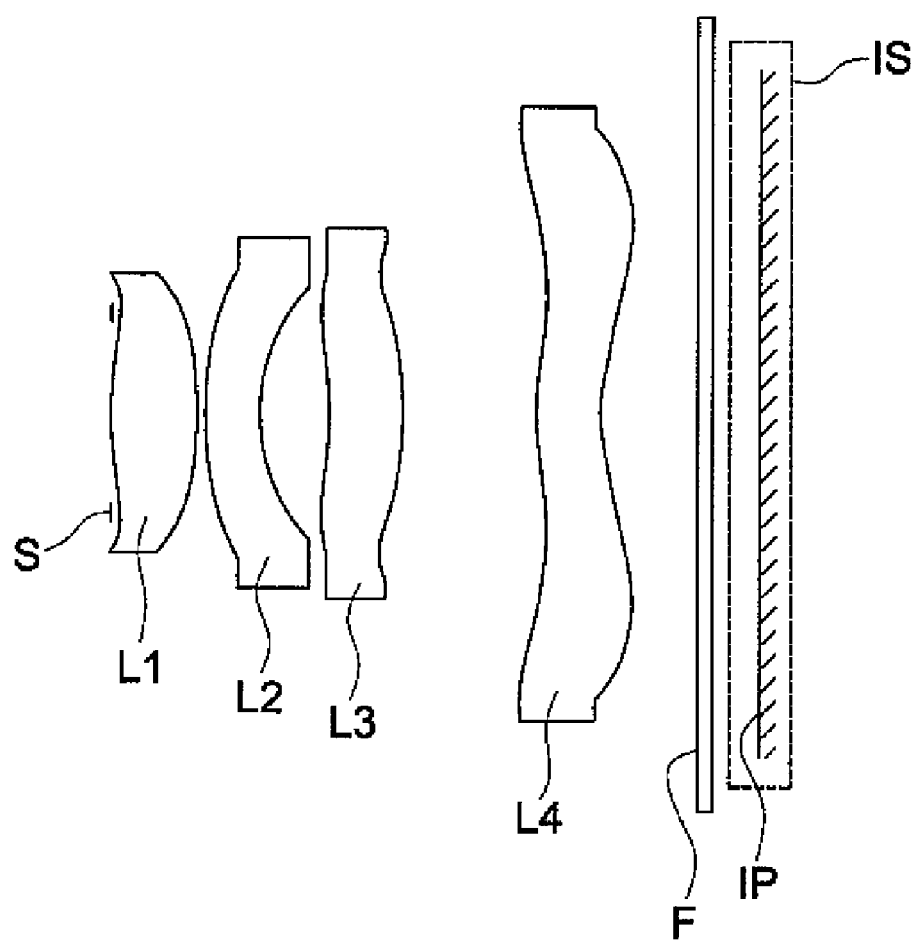
FIG. 17 is a sectional view in the direction of optical axis of the image pickup lens in Example 7.
Figure 18:
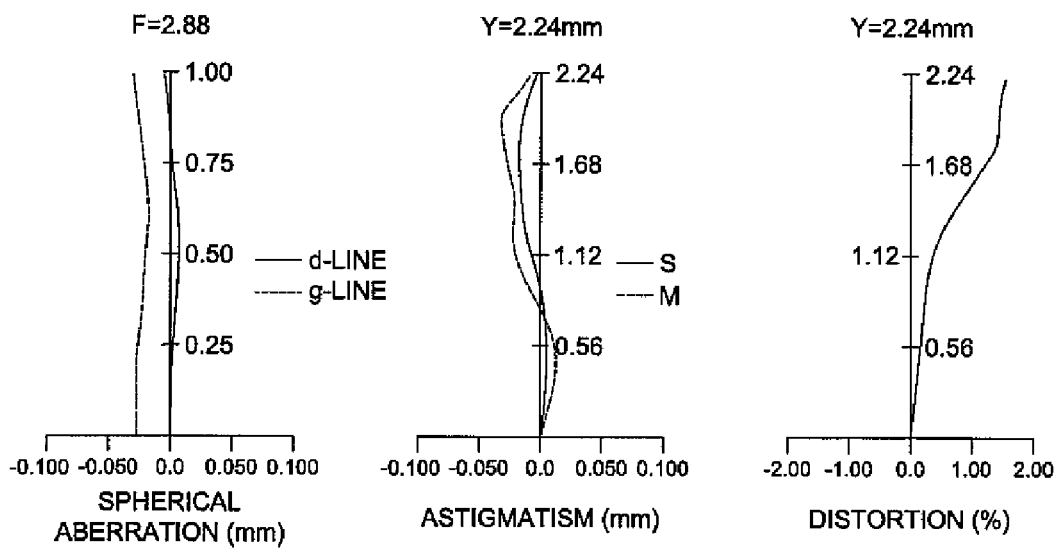
FIGS. 18(a) through 18(d) show aberration diagrams in Example 7 including spherical aberration, astigmatism, distortion, and meridional coma, respectively.
Figure 18:
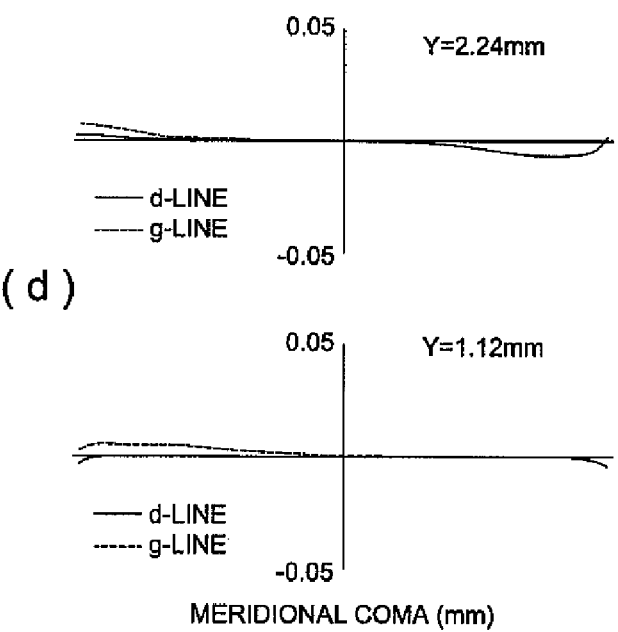

FIG. 17 is a cross-sectional view of the image pickup lens shown in Example 7. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 7, all lenses are formed with plastic materials.

FIGS. 18(a)-18(d) are diagrams of aberrations (spherical aberration, astigmatism, distortion and meridional coma, respectively) of an image pickup lens shown in Example 7.

EXAMPLE 8

Lens data of an image pickup lenses in Example 8 is shown in the following Table 8.

TABLE 8

Example 8
f = 2.80 mm fB = 0.39 mm F = 2.88 2Y = 4.48 mm
ENTP = 0 mm EXTP = −2.16 mm H1 = −0.27 mm H2 = −2.41 mm

| Surface No. | R (mm) | D (mm) | Nd | vd | Effective radius (mm) |
|---|---|---|---|---|---|
| 1 (stop) | ∞ | 0.000 | | | 0.49 |
| 2* | 3.618 | 0.581 | 1.53050 | 55.7 | 0.51 |
| 3* | −1.297 | 0.050 | | | 0.67 |
| 4* | 148.369 | 0.350 | 1.63200 | 23.4 | 0.73 |
| 5* | 2.034 | 0.351 | | | 0.82 |
| 6* | −1.327 | 0.489 | 1.53050 | 55.7 | 0.86 |
| 7* | −0.895 | 0.390 | | | 0.96 |
| 8* | 1.540 | 0.400 | 1.53050 | 55.7 | 1.49 |
| 9* | 0.803 | 0.600 | | | 1.80 |
| 10 | ∞ | 0.100 | 1.51630 | 64.1 | 2.03 |
| 11 | ∞ | | | | 2.06 |

Aspheric surface coefficient $2^{nd}$ surface

K = −1.71126E+01
A4 = −1.61449E−01
A6 = −2.75515E−02
A8 = −1.17995E+00
A10 = 9.40235E−01

TABLE 8-continued

Example 8
f = 2.80 mm fB = 0.39 mm F = 2.88 2Y = 4.48 mm
ENTP = 0 mm EXTP = −2.16 mm H1 = −0.27 mm H2 = −2.41 mm $3^{rd}$ surface K = −8.15810E−01
A4 = −1.33769E−01
A6 = −2.49984E−02
A8 = −1.41487E−02
A10 = −5.83369E−01

$4^{th}$ surface

K = −3.00000E+01
A4 = −1.52548E−01
A6 = 1.66100E−01
A8 = −2.69768E−02
A10 = −5.12867E−02

$5^{th}$ surface

K = −3.09446E+00
A4 = −8.14151E−02
A6 = −3.91576E−02
A8 = 9.42249E−02
A10 = −1.55909E−01

$6^{th}$ surface

K = −1.26418E+00
A4 = 1.67816E−01
A6 = 1.39863E−01
A8 = 1.45164E−01
A10 = −2.99909E−01

$7^{th}$ surface

K = −2.15444E+00
A4 = −5.75078E−02
A6 = 1.20401E−01
A8 = 2.13831E−01
A10 = 5.70788E−02
A12 = −1.35362E−01

$8^{th}$ surface

K = −1.20660E+01
A4 = −1.72490E−01
A6 = 8.57251E−02
A8 = −2.76648E−02
A10 = 6.00163E−03
A12 = −5.73111E−04

$9^{th}$ surface

K = −4.69239E+00
A4 = −1.24754E−01
A6 = 5.10163E−02
A8 = −1.44935E−02
A10 = 2.05777E−03
A12 = −1.35338E−04

Data of each single lens

| Lens No. | Front surface No. | Focal length (mm) |
|---|---|---|
| 1 | 2 | 1.877 |
| 2 | 4 | −3.266 |
| 3 | 6 | 3.721 |
| 4 | 8 | −3.897 |

Figure 19:
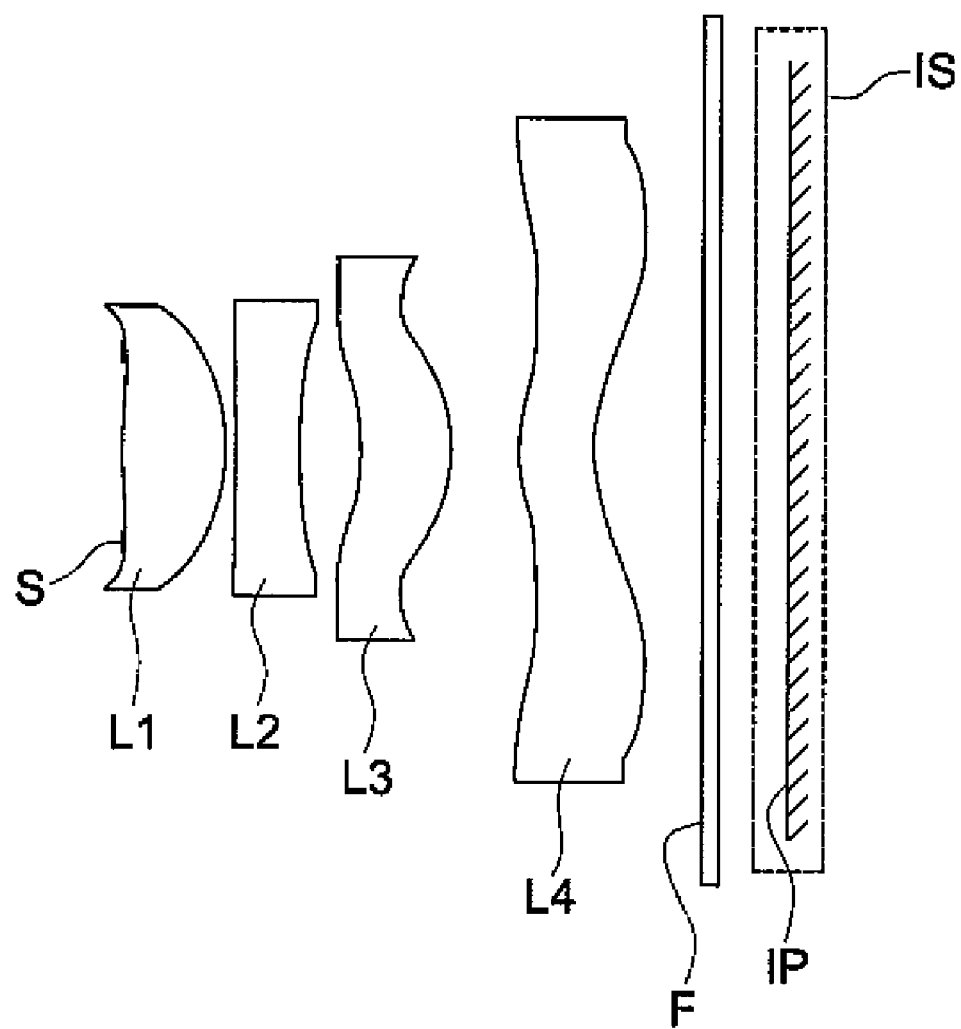
FIG. 19 is a sectional view in the direction of optical axis of the image pickup lens in Example 8.

FIG. 19 is a cross-sectional view of the image pickup lens shown in Example 8. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 8, all lenses are formed with plastic materials.

Figure 20:
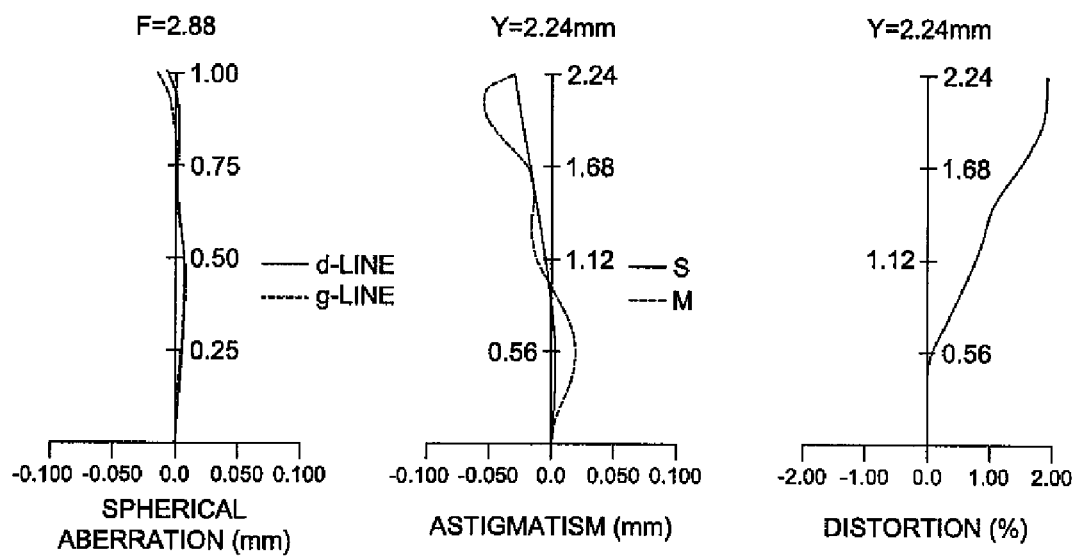
FIGS. 20(a) through 20(d) show aberration diagrams in Example 8 including spherical aberration, astigmatism, distortion, and meridional coma, respectively.
Figure 20:
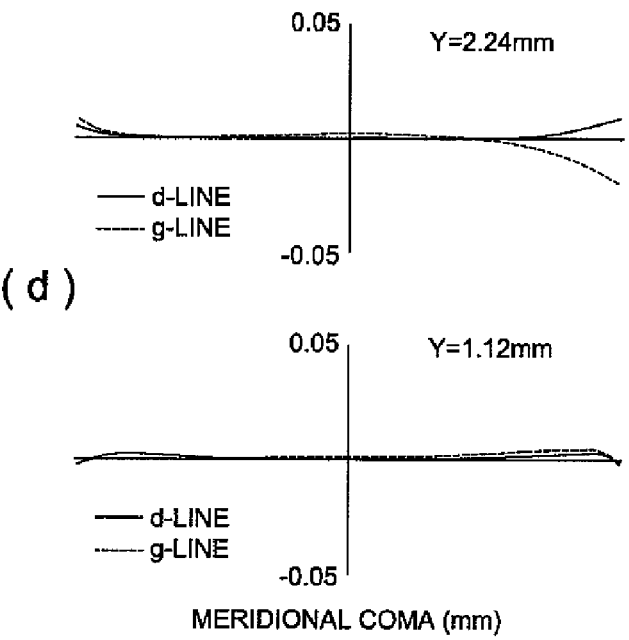

FIGS. 20(*a*)-20(*d*) are diagrams of aberrations (spherical aberration, astigmatism, distortion and meridional coma, respectively) of the image pickup lens shown in Example 8.

EXAMPLE 9

Lens data of an image pickup lens in Example 9 is shown in the following Table 9.

TABLE 9

Example 9
f = 3.37 mm fB = 0.39 mm F = 2.06 2Y = 4.48 mm
ENTP = 0 mm EXTP = −2.57 mm H1 = −0.47 mm H2 = −2.98 mm

| Surface No. | R (mm) | D (mm) | Nd | νd | Effective radius (mm) |
|---|---|---|---|---|---|
| 1 (stop) | ∞ | 0.000 | | | 0.82 |
| 2* | 2.294 | 0.880 | 1.53050 | 55.7 | 0.87 |
| 3* | −2.630 | 0.050 | | | 1.02 |
| 4* | 5.205 | 0.350 | 1.63200 | 23.4 | 1.06 |
| 5* | 1.591 | 0.570 | | | 1.04 |
| 6* | −3.902 | 0.790 | 1.53050 | 55.7 | 1.09 |
| 7* | −1.123 | 0.240 | | | 1.30 |
| 8* | 2.205 | 0.400 | 1.53050 | 55.7 | 1.70 |
| 9* | 0.843 | 0.600 | | | 1.95 |
| 10 | ∞ | 0.145 | 1.51630 | 64.1 | 2.11 |
| 11 | ∞ | | | | 2.14 |

Aspheric surface coefficient $2^{nd}$ surface

K = −4.26143E−01
A4 = −2.60659E−02
A6 = −5.10879E−02
A8 = 4.20774E−02
A10 = −4.83854E−02

$3^{rd}$ surface

K = −5.50299E+00
A4 = −3.53091E−02
A6 = −3.52180E−02
A8 = 2.86581E−02
A10 = −2.69244E−02

$4^{th}$ surface

K = −2.67865E+01
A4 = −6.01801E−02
A6 = 5.92285E−02
A8 = −8.36401E−03
A10 = −1.80025E−04

$5^{th}$ surface

K = −4.25797E+00
A4 = 5.58734E−03
A6 = 4.35007E−02
A8 = −2.49291E−02
A10 = 1.13946E−02

$6^{th}$ surface

K = 3.13377E+00
A4 = 3.79419E−02
A6 = −1.03506E−01
A8 = 1.24056E−01
A10 = −5.01954E−02

$7^{th}$ surface

K = −2.04853E+00
A4 = 1.66745E−02
A6 = −4.62444E−02
A8 = 1.91155E−02
A10 = 1.82070E−02
A12 = −6.53722E−03

$8^{th}$ surface

K = −2.99811E+01
A4 = −1.84072E−01
A6 = 9.44057E−02

TABLE 9-continued

Example 9
f = 3.37 mm fB = 0.39 mm F = 2.06 2Y = 4.48 mm
ENTP = 0 mm EXTP = −2.57 mm H1 = −0.47 mm H2 = −2.98 mm

A8 = −2.75788E−02
A10 = 5.20127E−03
A12 = −4.43099E−04

9th surface

K = −5.06574E+00
A4 = −1.20413E−01
A6 = 5.02273E−02
A8 = −1.59657E−02
A10 = 2.49403E−03
A12 = −1.43545E−04

Data of each single lens

| Lens No. | Front surface No. | Focal length (mm) |
|---|---|---|
| 1 | 2 | 2.462 |
| 2 | 4 | −3.767 |
| 3 | 6 | 2.207 |
| 4 | 8 | −2.862 |

Figure 21:
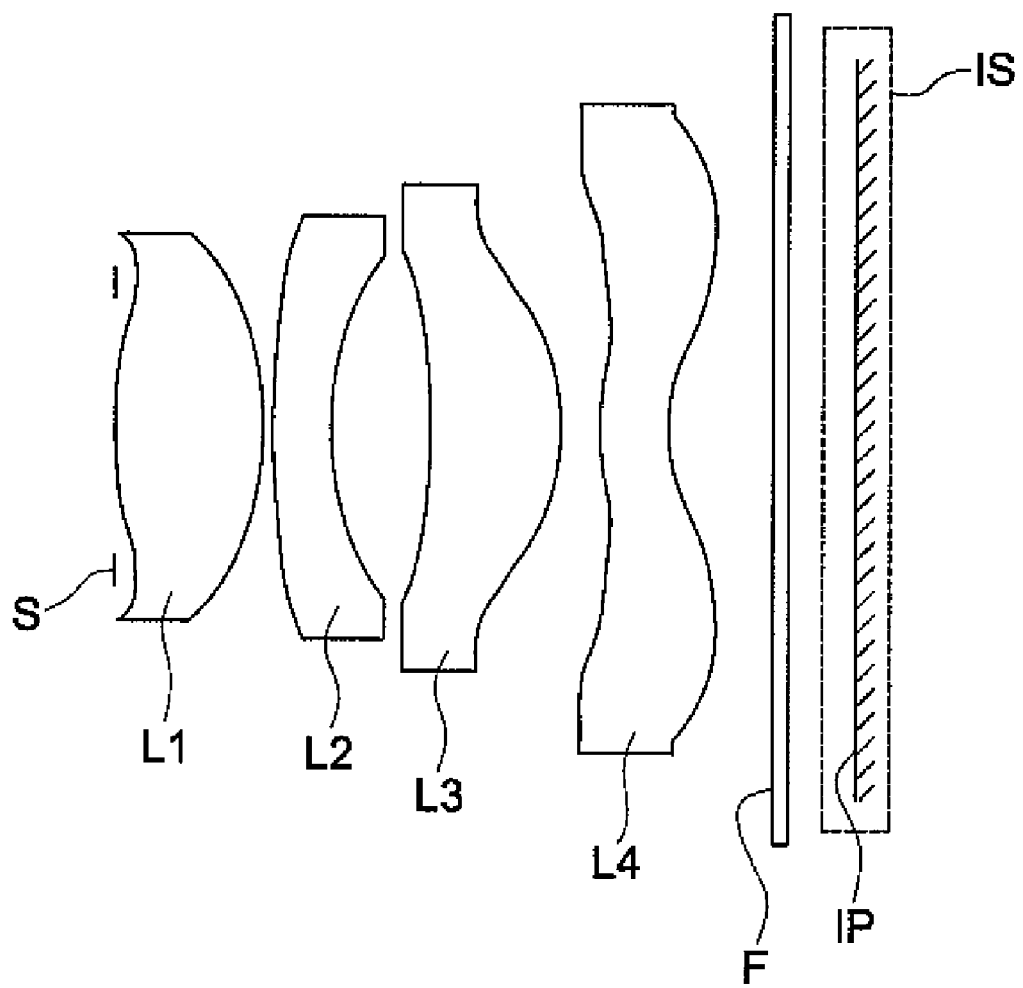
FIG. 21 is a sectional view in the direction of optical axis of the image pickup lens in Example 9.
Figure 22:
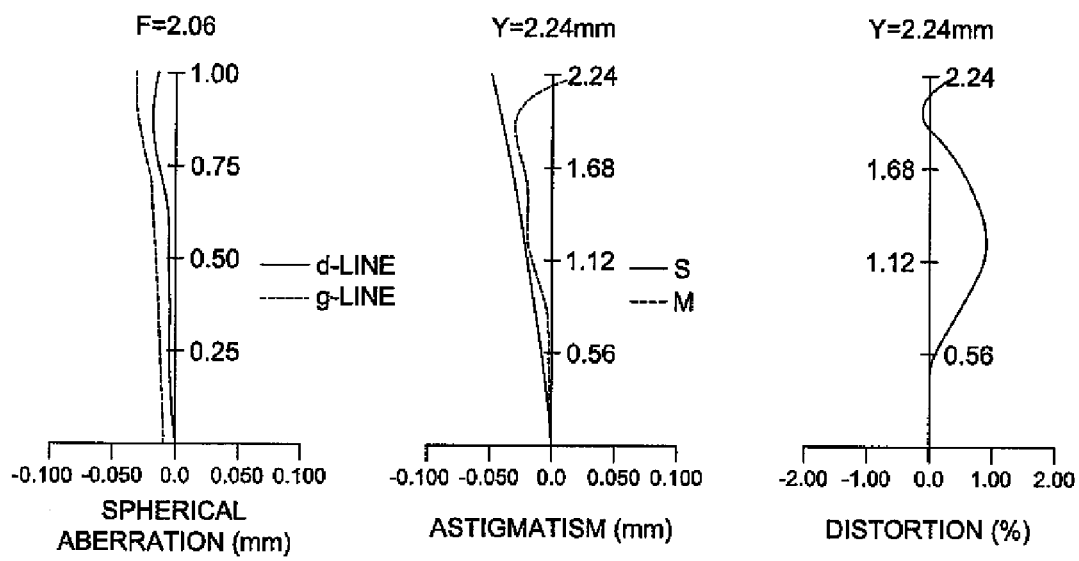
FIGS. 22(a) through 22(d) show aberration diagrams in Example 9 including spherical aberration, astigmatism, distortion, and meridional coma, respectively.
Figure 22:
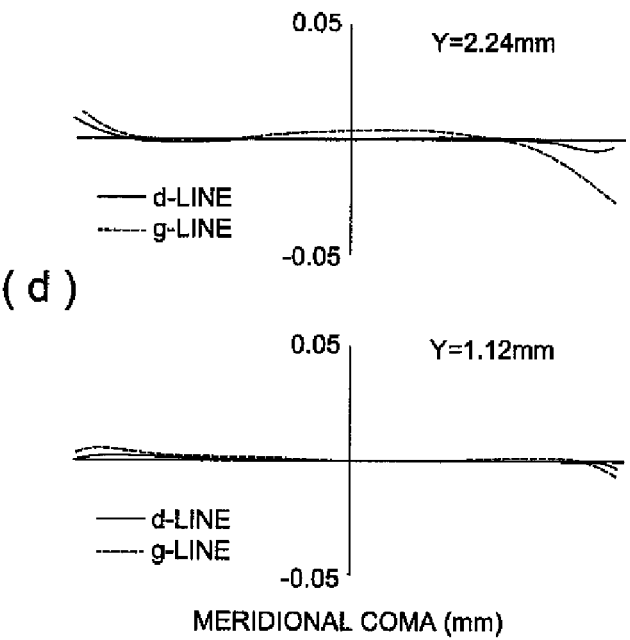

FIG. 21 is a cross-sectional view of the image pickup lens shown in Example 9. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 5, all lenses are formed with plastic materials.

FIGS. 22(a)-22(d) are diagrams of aberrations (spherical aberration, astigmatism, distortion and meridional coma, respectively) of the image pickup lens shown in Example 9.

EXAMPLE 10

Lens data of an image pickup lens in Example 9 is shown in the following Table 10.

TABLE 10

Example 10
f = 3.37 mm fB = 0.49 mm F = 2.47 2Y = 4.48 mm
ENTP = 0 mm EXTP = −2.39 mm H1 = −0.57 mm H2 = −2.88 mm

| Surface No. | R (mm) | D (mm) | Nd | vd | Effective radius (mm) |
|---|---|---|---|---|---|
| 1 (stop) | ∞ | 0.000 | | | 0.68 |
| 2* | 2.245 | 0.670 | 1.53050 | 55.7 | 0.74 |
| 3* | −2.235 | 0.050 | | | 0.87 |
| 4* | 3.759 | 0.300 | 1.63200 | 23.4 | 0.95 |
| 5* | 1.363 | 0.664 | | | 0.91 |
| 6* | −2.458 | 0.632 | 1.53050 | 55.7 | 1.00 |
| 7* | −0.994 | 0.148 | | | 1.23 |
| 8* | 2.432 | 0.429 | 1.53050 | 55.7 | 1.62 |
| 9* | 0.846 | 0.600 | | | 1.83 |
| 10 | ∞ | 0.145 | 1.51630 | 64.1 | 2.05 |
| 11 | ∞ | | | | 2.07 |

Aspheric surface coefficient

2nd surface

K = −3.04055E+00
A4 = −5.08259E−02
A6 = −9.12282E−02
A8 = 1.78359E−02
A10 = −1.35118E−01

TABLE 10-continued

Example 10
f = 3.37 mm fB = 0.49 mm F = 2.47 2Y = 4.48 mm
ENTP = 0 mm EXTP = −2.39 mm H1 = −0.57 mm H2 = −2.88 mm 3rd surface K = −2.57676E+00
A4 = −5.57768E−02
A6 = −6.21506E−02
A8 = 8.23211E−03
A10 = −5.85198E−02

4th surface

K = −2.32710E+00
A4 = −4.71611E−02
A6 = 7.94509E−02
A8 = 6.59530E−03
A10 = −1.61603E−03

5th surface

K = −2.85598E+00
A4 = 3.15459E−02
A6 = 5.35909E−02
A8 = −2.13070E−02
A10 = 3.00176E−02

6th surface

K = 4.54281E+00
A4 = 1.59892E−01
A6 = −1.33420E−01
A8 = 1.08199E−01
A10 = −2.72226E−02

7th surface

K = −2.81298E+00
A4 = 2.10335E−02
A6 = −3.60641E−02
A8 = 2.03228E−02
A10 = 1.40642E−02
A12 = −9.30634E−03

8th surface

K = −3.00000E+01
A4 = −1.88138E−01
A6 = 9.71991E−02
A8 = −2.72593E−02
A10 = 5.12675E−03
A12 = −4.78194E−04

9th surface

K = −5.89123E+00
A4 = −1.49216E−01
A6 = 5.66733E−02
A8 = −1.63489E−02
A10 = 2.35813E−03
A12 = −1.17743E−04

Data of each single lens

| Lens No. | Front surface No. | Focal length (mm) |
|---|---|---|
| 1 | 2 | 2.226 |
| 2 | 4 | −3.557 |
| 3 | 6 | 2.738 |
| 4 | 8 | −2.698 |

Figure 23:
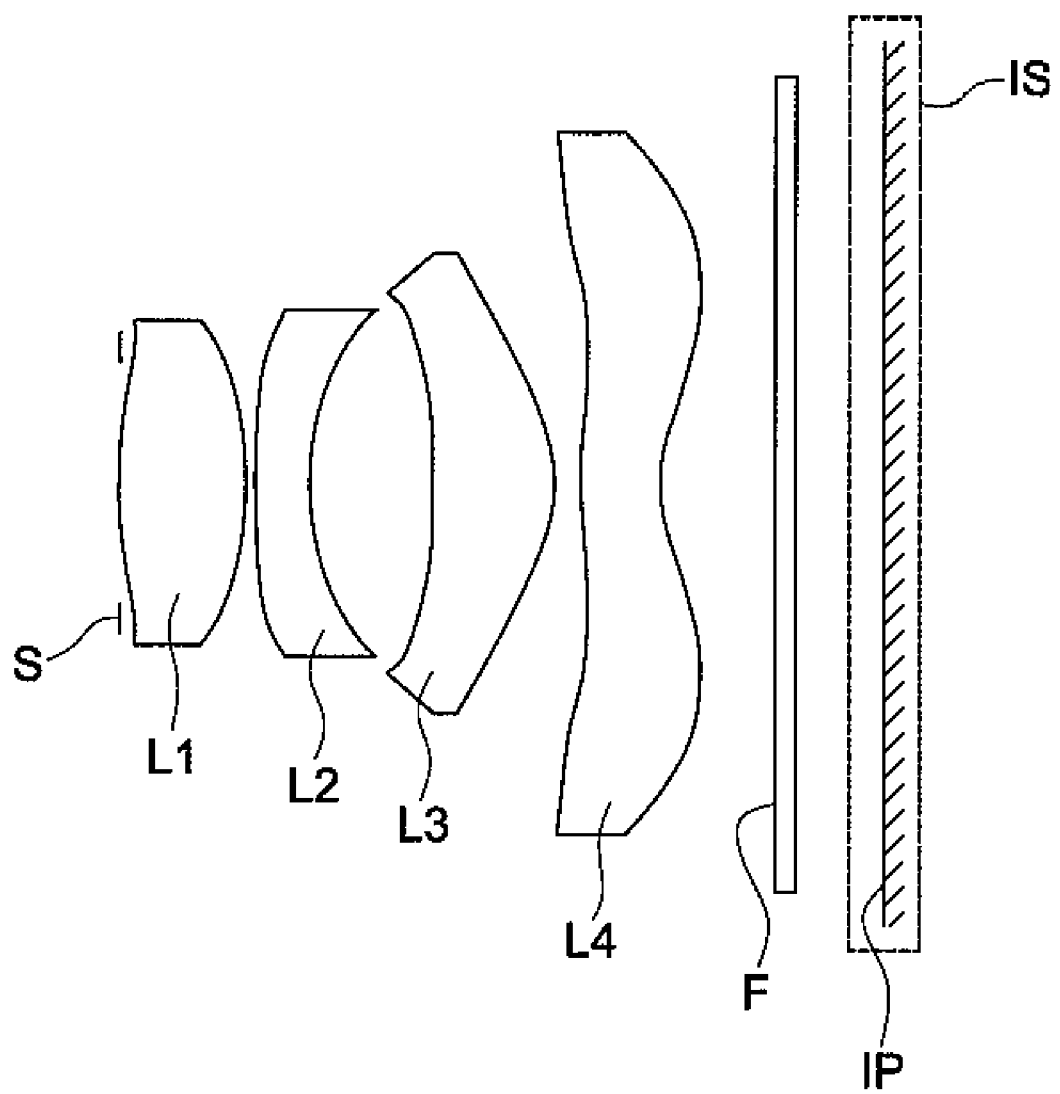
FIG. 23 is a sectional view in the direction of optical axis of the image pickup lens in Example 10.
Figure 24:
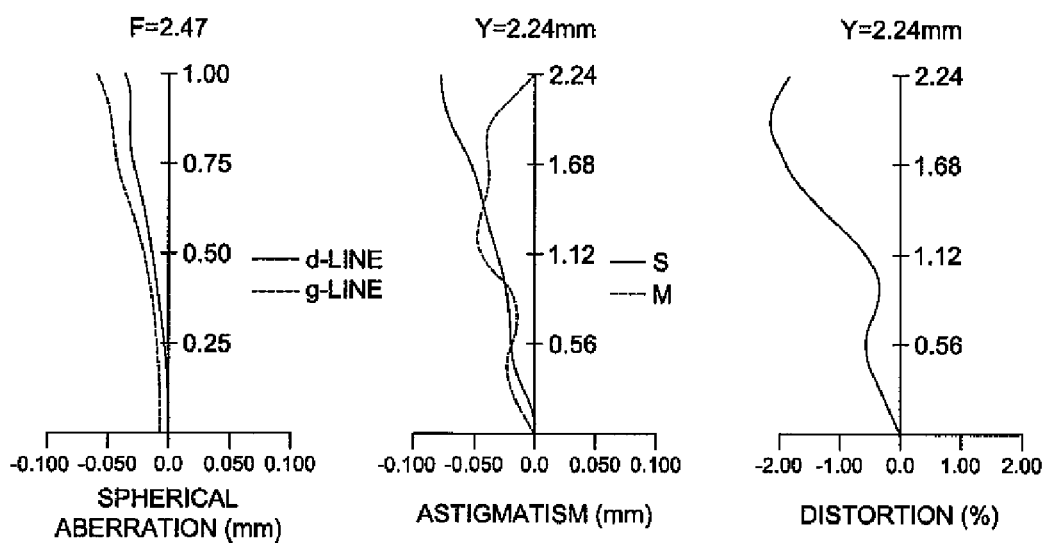
FIGS. 24(a) through 24(d) show aberration diagrams in Example 10 including spherical aberration, astigmatism, distortion, and meridional coma, respectively.
Figure 24:
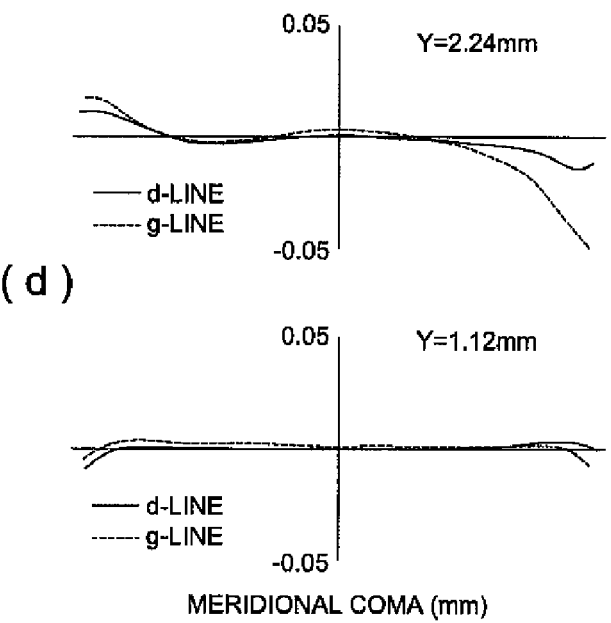

FIG. 23 is a cross-sectional view of the image pickup lens shown in Example 10. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 10, all lenses are formed with plastic materials.

FIGS. 24(a)-24(d) are diagrams of aberrations (spherical aberration, astigmatism, distortion and meridional coma, respectively) of the image pickup lens shown in Example 10.

EXAMPLE 11

Lens data of an image pickup lens in Example 11 is shown in the following Table 11.

TABLE 11

Example 11
f = 4.92 mm fB = 0.5 mm F = 2.88 2Y = 6.48 mm
ENTP = 0 mm EXTP = −3.7 mm H1 = −0.84 mm H2 = −4.41 mm

| Surface No. | R (mm) | D (mm) | Nd | νd | Effective radius (mm) |
|---|---|---|---|---|---|
| 1 (stop) | ∞ | 0.050 | | | 0.85 |
| 2* | 2.160 | 0.761 | 1.53050 | 55.7 | 0.99 |
| 3* | −3.667 | 0.050 | | | 1.08 |
| 4* | −17.871 | 0.450 | 1.58340 | 30.0 | 1.09 |
| 5* | 2.138 | 0.966 | | | 1.14 |
| 6* | −6.743 | 1.033 | 1.53050 | 55.7 | 1.53 |
| 7* | −1.197 | 0.314 | | | 1.79 |
| 8* | 13.472 | 0.450 | 1.53050 | 55.7 | 2.34 |
| 9* | 1.227 | 1.119 | | | 2.68 |
| 10 | ∞ | 0.210 | 1.51680 | 64.2 | 3.06 |
| 11 | ∞ | | | | 3.10 |

Aspheric surface coefficient

2$^{nd}$ surface

K = −1.11954E+00
A4 = −1.11625E−03
A6 = 5.02299E−03
A8 = −2.65336E−02

3$^{rd}$ surface

K = −3.03775E+00
A4 = 2.13455E−03
A6 = −3.02837E−02
A8 = −4.10446E−03

4$^{th}$ surface

K = 3.00000E+01
A4 = −2.37404E−02
A6 = 9.00680E−05
A8 = 7.64890E−03
A10 = 3.48435E−03

5$^{th}$ surface

K = −6.97034E−01
A4 = −2.64108E−02
A6 = 2.86265E−02
A8 = −1.37433E−03

6$^{th}$ surface

K = 2.91724E+00
A4 = 1.79637E−03
A6 = 1.14553E−03
A8 = −2.28329E−03

7$^{th}$ surface

K = −4.23647E+00
A4 = −4.75761E−02
A6 = 1.75039E−02
A8 = −1.93795E−03
A10 = −1.10696E−04
A12 = −6.04020E−05

8$^{th}$ surface

K = −1.53274E+01
A4 = −6.48729E−02
A6 = 1.73748E−02
A8 = −1.11303E−03
A10 = −2.29777E−04
A12 = 2.75750E−05

TABLE 11-continued

Example 11
f = 4.92 mm fB = 0.5 mm F = 2.88 2Y = 6.48 mm
ENTP = 0 mm EXTP = −3.7 mm H1 = −0.84 mm H2 = −4.41 mm 9$^{th}$ surface K = −6.67032E+00
A4 = −4.74896E−02
A6 = 9.73065E−03
A8 = −1.19692E−03
A10 = 6.55930E−05
A12 = −1.34100E−06

Data of each single lens

| Lens No. | Front surface No. | Focal length (mm) |
|---|---|---|
| 1 | 2 | 2.684 |
| 2 | 4 | −3.246 |
| 3 | 6 | 2.577 |
| 4 | 8 | −2.578 |

Figure 25:
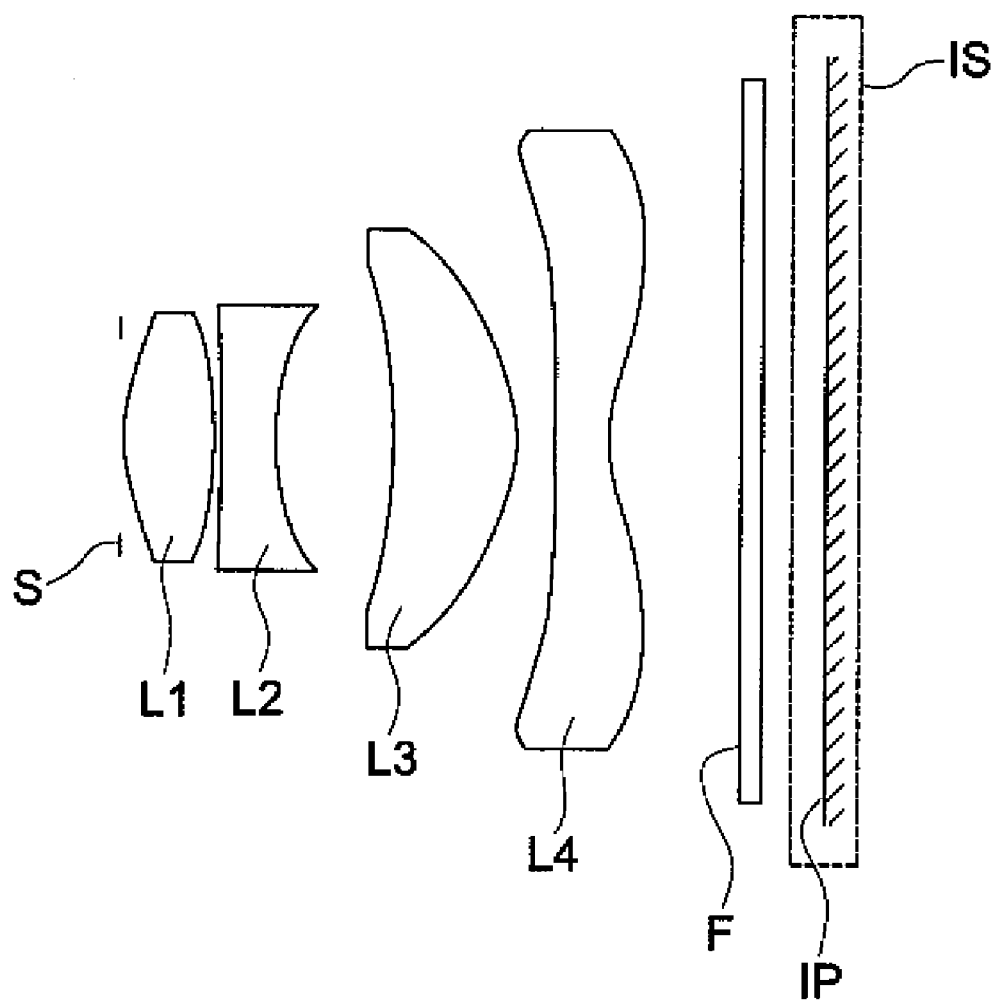
FIG. 25 is a sectional view in the direction of optical axis of the image pickup lens in Example 11.
Figure 26:
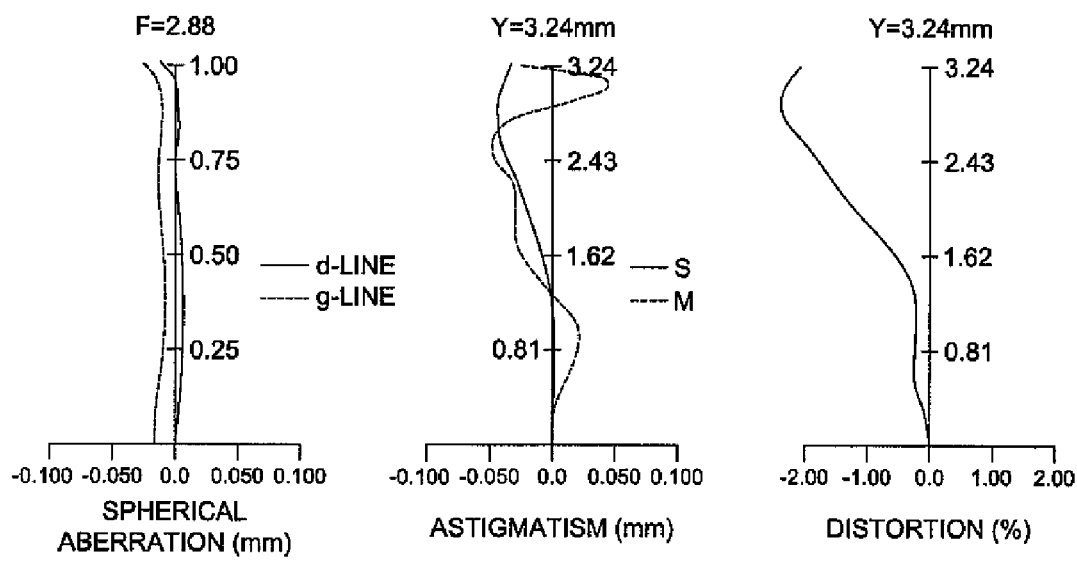
FIGS. 26(a) through 26(d) show aberration diagrams in Example 11 including spherical aberration, astigmatism, distortion, and meridional coma, respectively.
Figure 26:
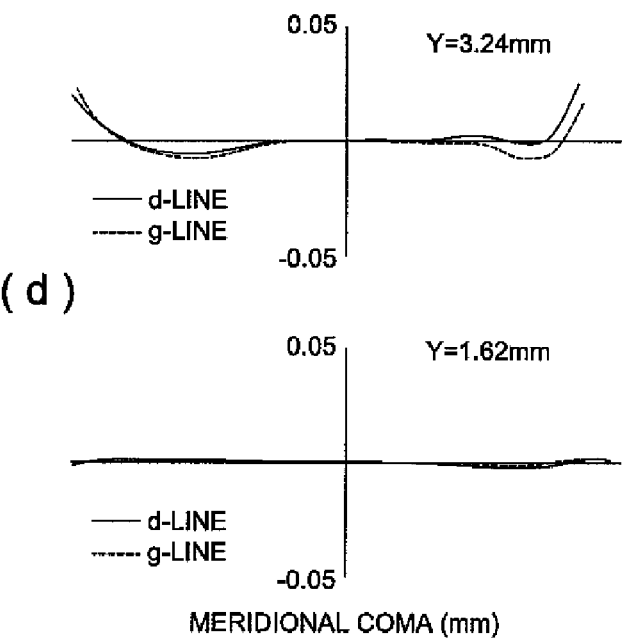

FIG. 25 is a cross-sectional view of the image pickup lens shown in Example 11. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 11, all lenses are formed with plastic materials.

FIGS. 26(a)-26(d) are diagrams of aberrations (spherical aberration, astigmatism, distortion and meridional coma, respectively) of the image pickup lens shown in Example 11.

EXAMPLE 12

Lens data of an image pickup lens in Example 12 is shown in the following Table 12.

TABLE 12

Example 12
f = 4.18 mm fB = 0.37 mm F = 2.88 2Y = 5.68 mm
ENTP = 0 mm EXTP = −2.55 mm H1 = −1.77 mm H2 = −3.79 mm

| Surface No. | R (mm) | D (mm) | Nd | νd | Effective radius (mm) |
|---|---|---|---|---|---|
| 1 (stop) | ∞ | 0.000 | | | 0.73 |
| 2* | 1.848 | 0.641 | 1.53050 | 55.7 | 0.86 |
| 3* | −19.120 | 0.050 | | | 0.91 |
| 4* | 3.403 | 0.351 | 1.63200 | 23.4 | 0.96 |
| 5* | 1.566 | 0.696 | | | 0.99 |
| 6* | −12.073 | 0.750 | 1.53050 | 55.7 | 1.32 |
| 7* | −2.329 | 0.847 | | | 1.55 |
| 8* | 1.835 | 0.449 | 1.53050 | 55.7 | 2.37 |
| 9* | 0.993 | 0.550 | | | 2.60 |
| 10 | ∞ | 0.145 | 1.51630 | 64.1 | 2.84 |
| 11 | ∞ | | | | 2.87 |

Aspheric surface coefficient

2$^{nd}$ surface

K = 1.96284E−01
A4 = 6.44738E−03
A6 = −1.59375E−02
A8 = 3.90158E−02
A10 = −1.51877E−02

3$^{rd}$ surface

K = −2.98094E+01
A4 = 4.60587E−02
A6 = 5.92686E−02

TABLE 12-continued

Example 12
f = 4.18 mm fB = 0.37 mm F = 2.88 2Y = 5.68 mm
ENTP = 0 mm EXTP = −2.55 mm H1 = −1.77 mm H2 = −3.79 mm A8 = −5.35591E−02
A10 = 4.82628E−02
A12 = −8.05352E−03
4$^{th}$ surface K = −4.14336E+00
A4 = −1.59438E−02
A6 = 3.29302E−02
A8 = 2.99780E−02
A10 = −2.48270E−02
5$^{th}$ surface K = −2.05154E+00
A4 = −7.83404E−03
A6 = 2.87761E−02
A8 = −2.11890E−03
A10 = 2.91803E−02
A12 = −2.10673E−02
6$^{th}$ surface K = 8.84530E+00
A4 = −9.26319E−03
A6 = 3.27941E−02
A8 = −2.53349E−02
A10 = 1.06312E−02
A12 = −1.93491E−03
7$^{th}$ surface K = −4.15321E−01
A4 = −1.38417E−02
A6 = 2.68852E−02
A8 = −2.41706E−03
A10 = 1.15097E−03
A12 = −4.92863E−04
8$^{th}$ surface K = −2.05723E+01
A4 = −1.47424E−01
A6 = 4.66246E−02
A8 = −6.20332E−03
A10 = 3.83718E−04
A12 = −8.85122E−06
9$^{th}$ surface K = −6.59801E+00
A4 = −6.67869E−02
A6 = 1.47323E−02
A8 = −2.66601E−03
A10 = 3.10294E−04
A12 = −1.48868E−05

Data of each single lens

| Lens No. | Front surface No. | Focal length (mm) |
|---|---|---|
| 1 | 2 | 3.211 |
| 2 | 4 | −4.958 |
| 3 | 6 | 5.300 |
| 4 | 8 | −5.008 |

Figure 27:
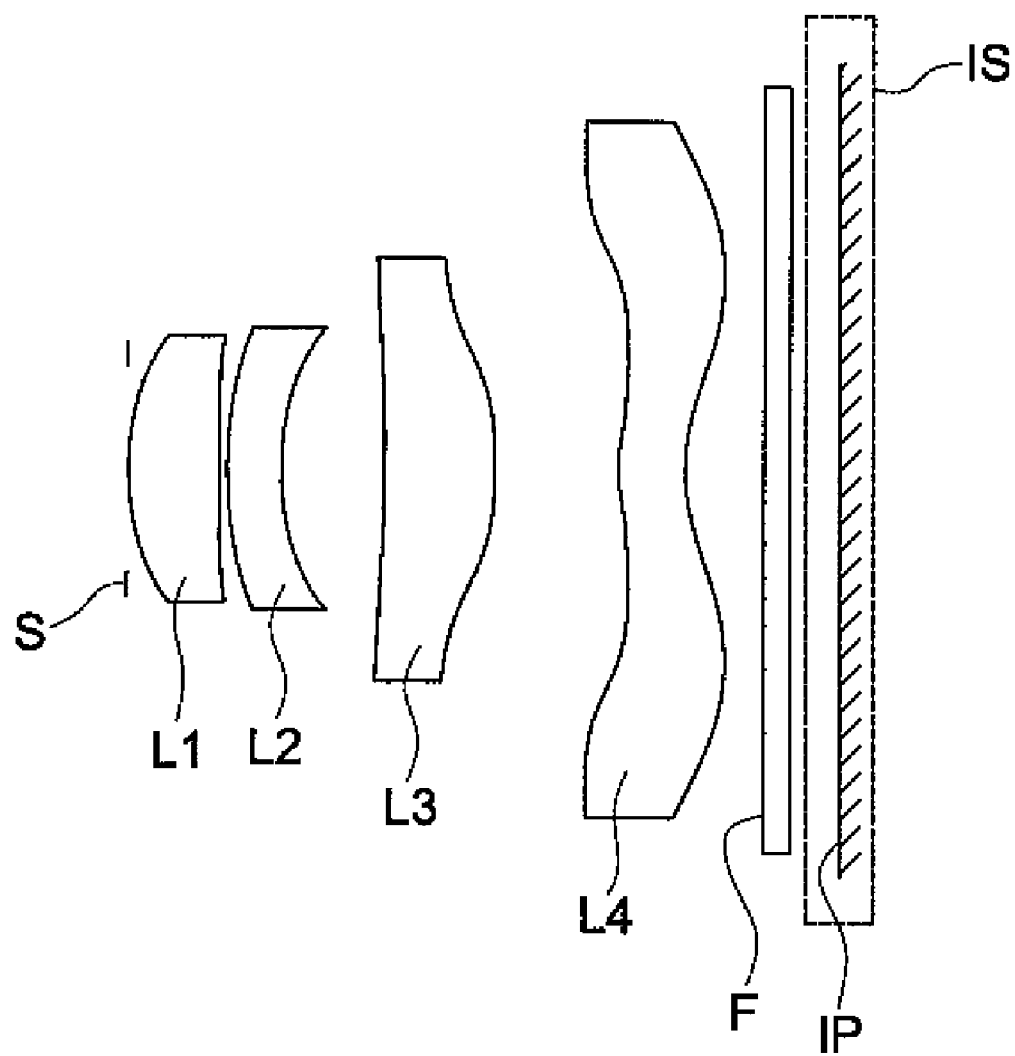
FIG. 27 is a sectional view in the direction of optical axis of the image pickup lens in Example 12.
Figure 28:
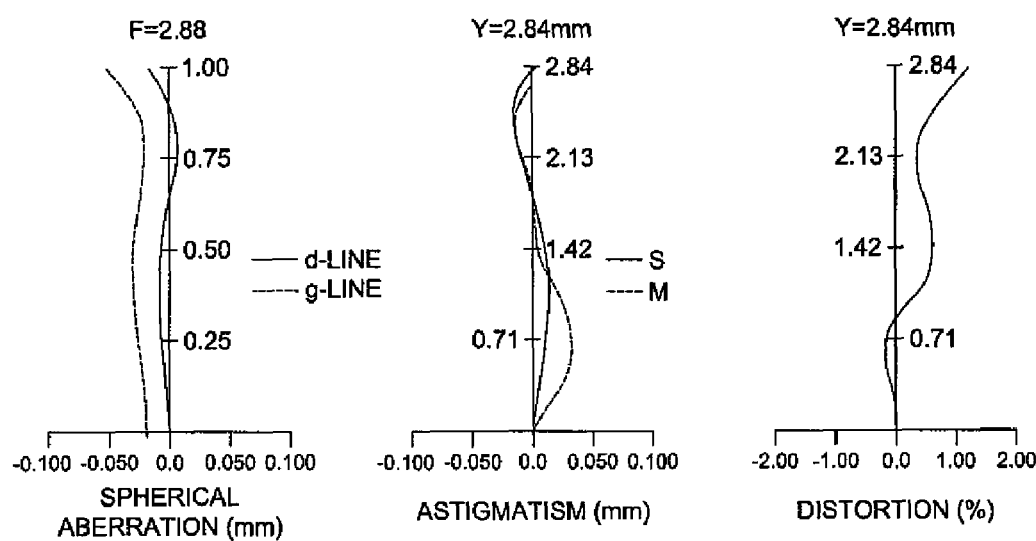
FIGS. 28(a) through 28(d) show aberration diagrams in Example 12 including spherical aberration, astigmatism, distortion, and meridional coma, respectively.
Figure 28:
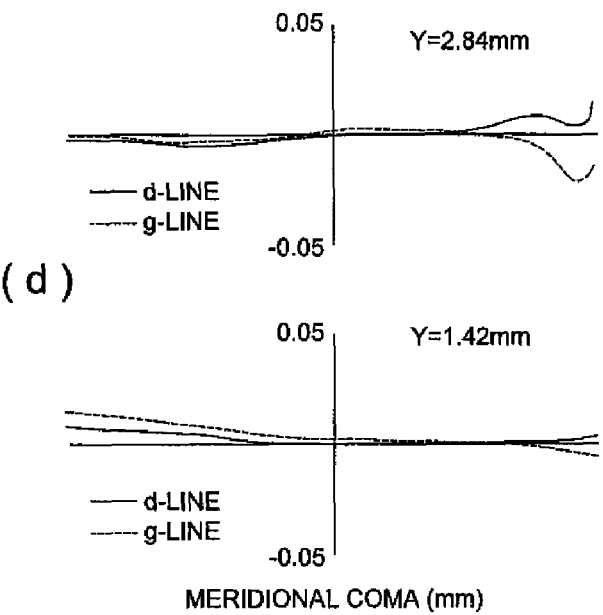

FIG. 27 is a cross-sectional view of the image pickup lens shown in Example 12. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 12, all lenses are formed with plastic materials.

FIGS. 28(a)-28(d) are diagrams of aberrations (spherical aberration, astigmatism, distortion and meridional coma, respectively) of the image pickup lens shown in Example 12.

EXAMPLE 13

Lens data of an image pickup lens in Example 13 is shown in the following Table 13.

TABLE 13

Example 13
f = 4.18 mm fB = 0.4 mm F = 2.88 2Y = 5.68 mm
ENTP = 0 mm EXTP = −2.48 mm H1 = −1.88 mm H2 = −3.78 mm

| Surface No. | R (mm) | D (mm) | Nd | νd | Effective radius (mm) |
|---|---|---|---|---|---|
| 1 (stop) | ∞ | 0.000 | | | 0.73 |
| 2* | 1.814 | 0.811 | 1.53050 | 55.7 | 0.87 |
| 3* | −4.731 | 0.051 | | | 0.94 |
| 4* | −65.433 | 0.350 | 1.58300 | 30.0 | 0.95 |
| 5* | 1.957 | 0.528 | | | 1.01 |
| 6* | −12.634 | 0.721 | 1.53050 | 55.7 | 1.23 |
| 7* | −2.273 | 0.889 | | | 1.47 |
| 8* | 1.649 | 0.413 | 1.53050 | 55.7 | 2.32 |
| 9* | 0.917 | 0.550 | | | 2.57 |
| 10 | ∞ | 0.145 | 1.51630 | 64.1 | 2.83 |
| 11 | ∞ | | | | 2.86 |

Aspheric surface coefficient

2$^{nd}$ surface

K = 4.16787E−01
A4 = −4.20004E−03
A6 = −1.04883E−02
A8 = 3.49395E−03
A10 = 5.07477E−03
3$^{rd}$ surface K = −9.68075E+00
A4 = 5.38302E−02
A6 = 3.28875E−02
A8 = −3.64332E−02
A10 = 3.05443E−02
4$^{th}$ surface K = 3.00000E+01
A4 = −2.01285E−02
A6 = 5.33428E−02
A8 = 1.94122E−02
A10 = −1.76511E−02
5$^{th}$ surface K = −3.90917E+00
A4 = −3.16653E−03
A6 = 2.55808E−02
A8 = 2.25365E−02
A10 = −9.17007E−03
6$^{th}$ surface K = 1.55470E+01
A4 = 8.19750E−03
A6 = −4.21175E−03
A8 = 1.05535E−02
A10 = −8.42634E−03
A12 = 2.07340E−03
7$^{th}$ surface K = 6.58354E−02
A4 = 1.12040E−02
A6 = 1.41856E−02
A8 = 3.03431E−03
A10 = 1.22480E−03
A12 = −8.78643E−04
8$^{th}$ surface K = −1.64869E+01
A4 = −1.52970E−01
A6 = 4.81927E−02
A8 = −6.40047E−03
A10 = 3.88379E−04
A12 = −8.60826E−06

TABLE 13-continued

Example 13
f = 4.18 mm fB = 0.4 mm F = 2.88 2Y = 5.68 mm
ENTP = 0 mm EXTP = −2.48 mm H1 = −1.88 mm H2 = −3.78 mm 9th surface K = −5.84554E+00
A4 = −7.41570E−02
A6 = 1.80952E−02
A8 = −3.35140E−03
A10 = 3.78695E−04
A12 = −1.79940E−05

Data of each single lens

| Lens No. | Front surface No. | Focal length (mm) |
|---|---|---|
| 1 | 2 | 2.583 |
| 2 | 4 | −3.253 |
| 3 | 6 | 5.100 |
| 4 | 8 | −4.838 |

Figure 29:
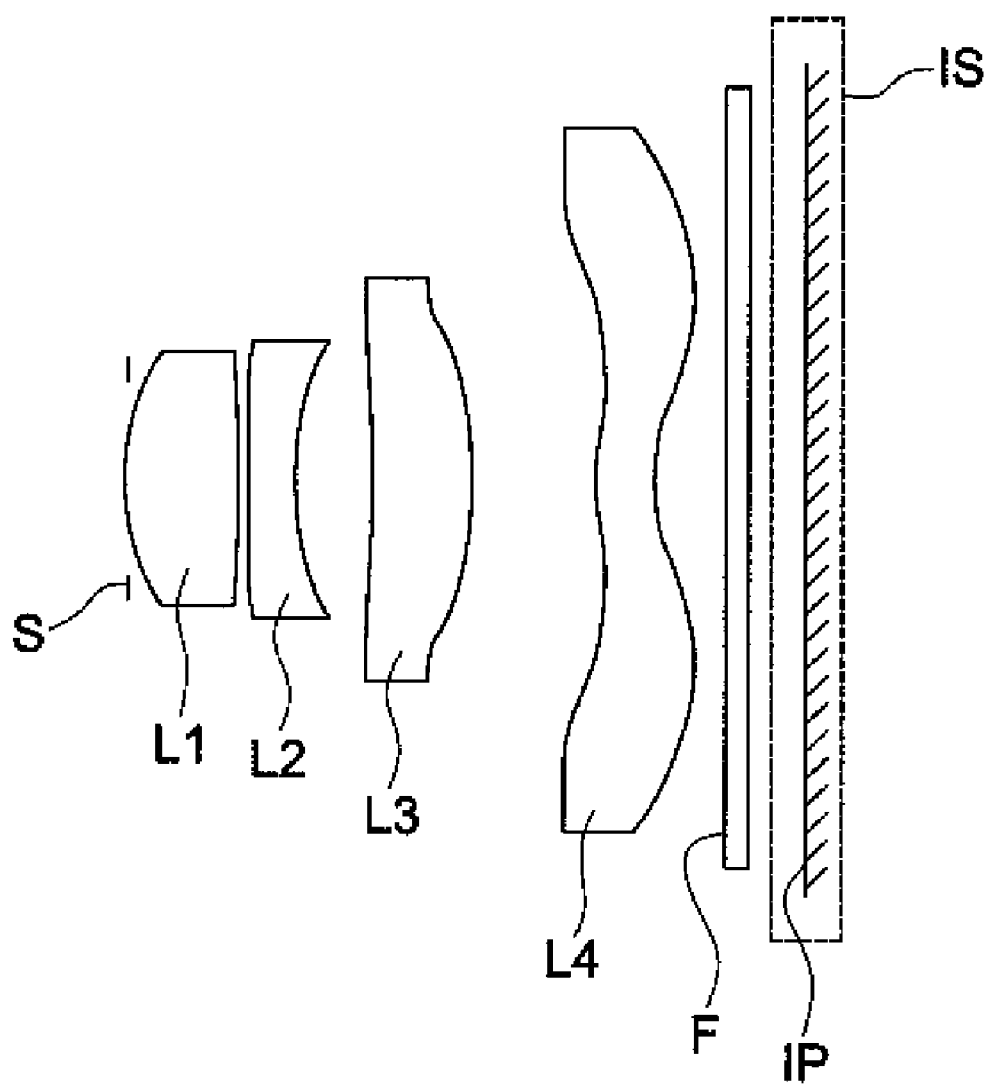
FIG. 29 is a sectional view in the direction of optical axis of the image pickup lens in Example 13.
Figure 30:
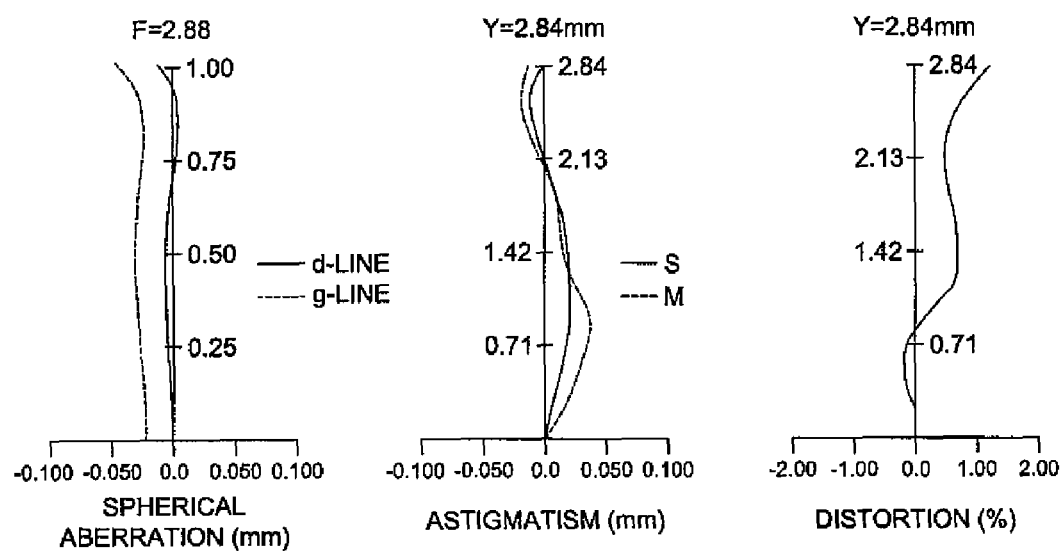
FIGS. 30(a) through 30(d) show aberration diagrams in Example 13 including spherical aberration, astigmatism, distortion, and meridional coma, respectively.
Figure 30:
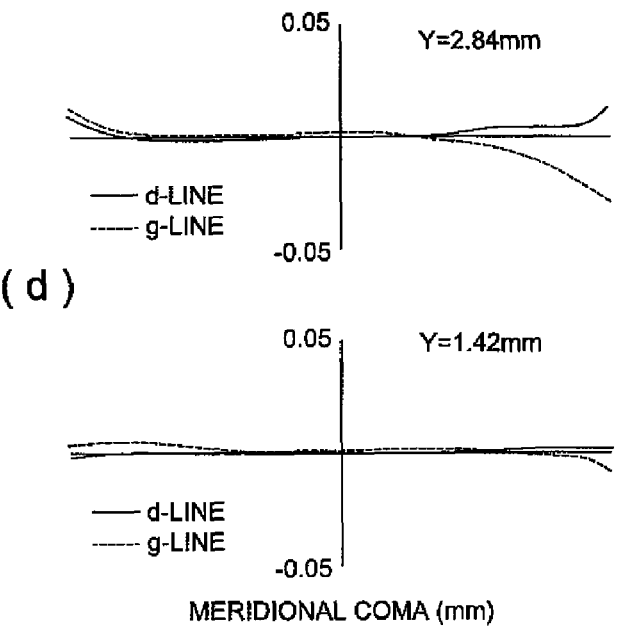

FIG. 29 is a cross-sectional view of the image pickup lens shown in Example 13. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 13, all lenses are formed with plastic materials.

FIGS. 30(a)-30(d) are diagrams of aberrations (spherical aberration, astigmatism, distortion and meridional coma, respectively) of the image pickup lens shown in Example 13.

EXAMPLE 14

Lens data of an image pickup lenses in Example 14 is shown in the following Table 14.

TABLE 14

Example 14
f = 4.22 mm fB = 0.36 mm F = 2.88 2Y = 5.67 mm
ENTP = 0 mm EXTP = −2.51 mm H1 = −1.98 mm H2 = −3.86 mm

| Surface No. | R (mm) | D (mm) | Nd | νd | Effective radius (mm) |
|---|---|---|---|---|---|
| 1 (stop) | ∞ | 0.000 | | | 0.73 |
| 2* | 1.721 | 0.716 | 1.5305 | 55.7 | 0.81 |
| 3* | 112.701 | 0.050 | | | 0.87 |
| 4* | 4.093 | 0.350 | 1.6320 | 23.4 | 0.91 |
| 5* | 1.784 | 0.635 | | | 0.95 |
| 6* | −6.829 | 0.680 | 1.5305 | 55.7 | 1.22 |
| 7* | −2.113 | 0.912 | | | 1.45 |
| 8* | 1.966 | 0.450 | 1.5305 | 55.7 | 2.36 |
| 9* | 1.029 | 0.550 | | | 2.59 |
| 10 | ∞ | 0.145 | 1.5163 | 64.1 | 2.83 |
| 11 | ∞ | | | | 2.86 |

Aspheric surface coefficient

2nd surface

K = 5.57287E−01
A4 = −3.87529E−03
A6 = 2.76089E−03
A8 = 9.80518E−03
A10 = −6.68125E−03

3rd surface

K = −2.99419E+01
A4 = 5.99754E−02
A6 = 5.19168E−02
A8 = −2.02221E−02
A10 = 2.52517E−02

4th surface

K = −3.34278E+00
A4 = −1.11534E−02
A6 = 3.63835E−02
A8 = 1.10419E−02
A10 = −9.23944E−03

5th surface

K = −1.76835E+00
A4 = −1.87127E−03
A6 = 8.51496E−03
A8 = 2.47023E−02
A10 = −5.83535E−03

6th surface

K = 2.34611E+01
A4 = 5.74265E−03
A6 = 6.78494E−03
A8 = 1.33950E−02
A10 = −1.26263E−02
A12 = 3.82786E−03

7th surface

K = 1.16809E−01
A4 = 2.10331E−03
A6 = 1.44314E−02
A8 = 5.71873E−03
A10 = 1.12536E−03
A12 = −1.03548E−03

8th surface

K = −2.35706E+01
A4 = −1.46672E−01
A6 = 4.75667E−02
A8 = −6.43218E−03
A10 = 3.99116E−04
A12 = −9.01110E−06

9th surface

K = −6.83341E+00
A4 = −6.85342E−02
A6 = 1.66888E−02
A8 = −3.19195E−03
A10 = 3.80593E−04
A12 = −1.85925E−05

Data of each single lens

| Lens No. | Front surface No. | Focal length (mm) |
|---|---|---|
| 1 | 2 | 3.287 |
| 2 | 4 | −5.317 |
| 3 | 6 | 5.495 |
| 4 | 8 | −4.885 |

Figure 31:
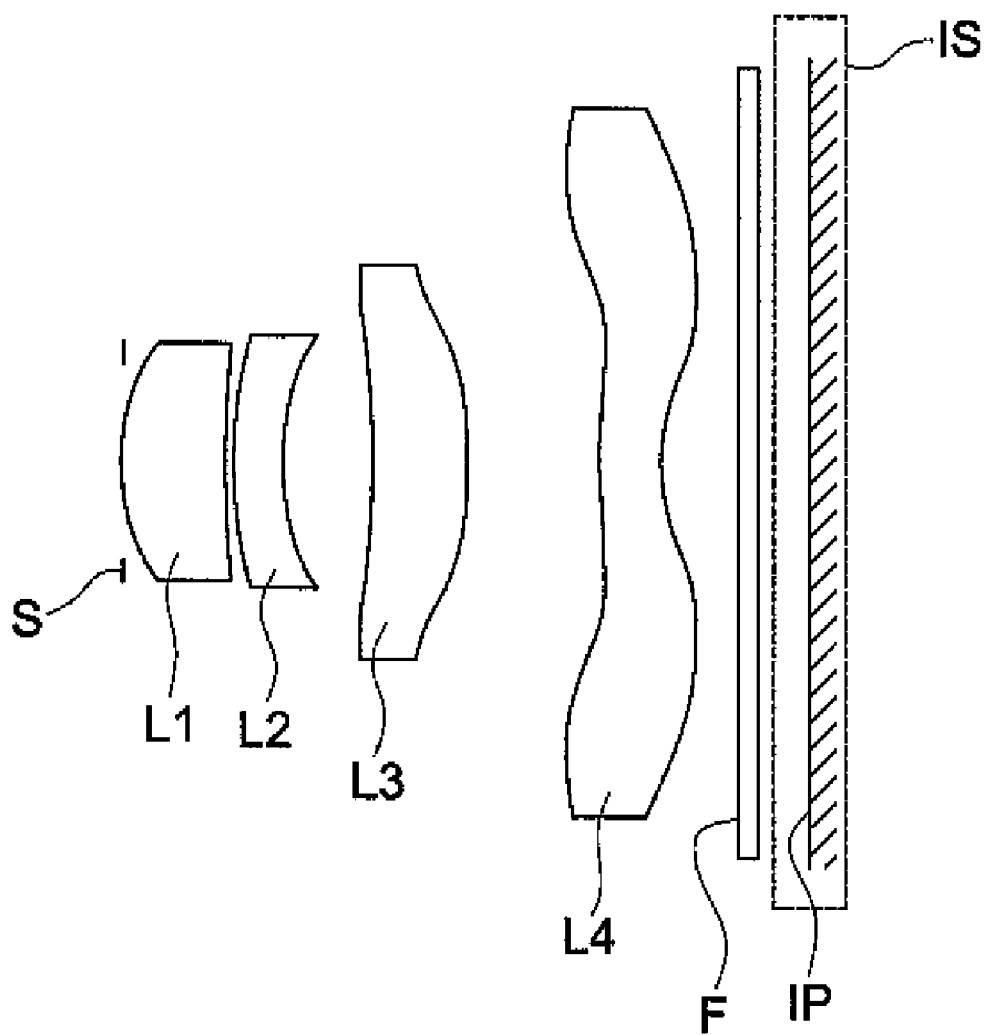
FIG. 31 is a sectional view in the direction of optical axis of the image pickup lens in Example 14.
Figure 32:
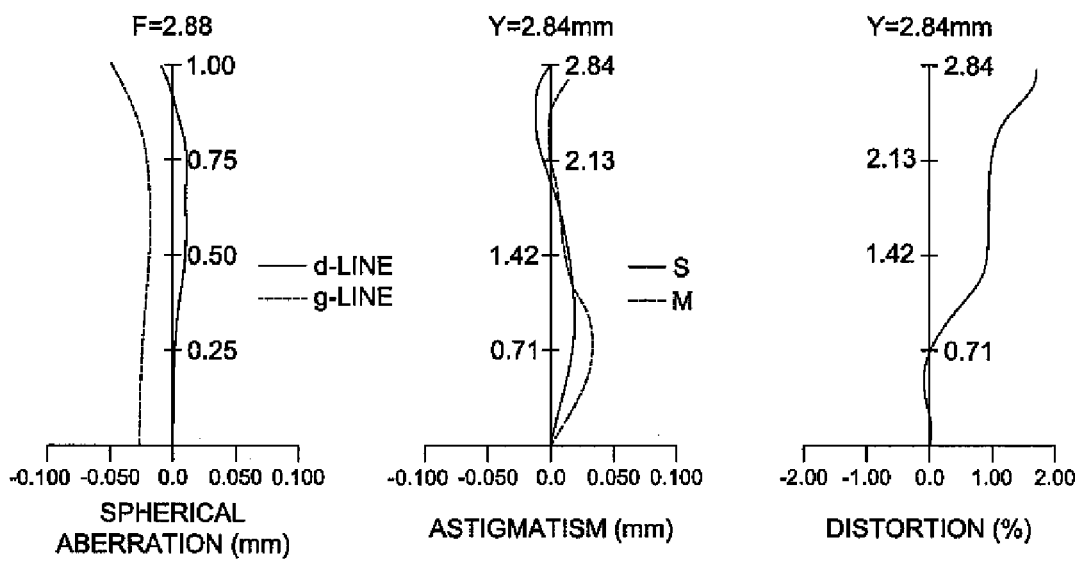
FIGS. 32(a) through 32(d) show aberration diagrams in Example 14 including spherical aberration, astigmatism, distortion, and meridional coma, respectively.
Figure 32:
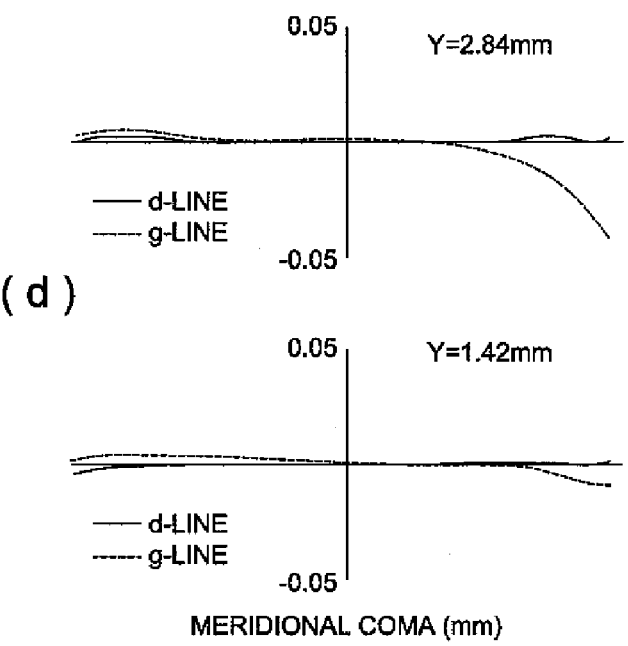

FIG. 31 is a cross-sectional view of the image pickup lens shown in Example 14. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 14, all lenses are formed with plastic materials.

FIGS. 32(a)-32(d) are diagrams of aberrations (spherical aberration, astigmatism, distortion and meridional coma, respectively) of the image pickup lens shown in Example 13.

EXAMPLE 15

Lens data of an image pickup lens in Example 15 is shown in the following Table 15.

TABLE 15

Example 15
f = 3.41 mm fB = 0.29 mm F = 2.88 2Y = 4.48 mm
ENTP = 0 mm EXTP = −2.11 mm H1 = −1.45 mm H2 = −3.13 mm

| Surface No. | R (mm) | D (mm) | Nd | vd | Effective radius (mm) |
|---|---|---|---|---|---|
| 1 (stop) | ∞ | 0.000 | | | 0.59 |
| 2* | 1.346 | 0.577 | 1.5305 | 55.7 | 0.63 |
| 3* | 33.174 | 0.050 | | | 0.69 |
| 4* | 4.831 | 0.350 | 1.6320 | 23.4 | 0.72 |
| 5* | 1.870 | 0.454 | | | 0.74 |
| 6* | −4.830 | 0.552 | 1.5305 | 55.7 | 0.92 |
| 7* | −1.781 | 0.431 | | | 1.19 |
| 8* | 2.231 | 0.448 | 1.5305 | 55.7 | 1.68 |
| 9* | 1.024 | 0.600 | | | 1.90 |
| 10 | ∞ | 0.100 | 1.5163 | 64.1 | 2.23 |
| 11 | ∞ | | | | 2.26 |

Aspheric surface coefficient $2^{nd}$ surface

K = −1.40576E−01
A4 = 3.11424E−03
A6 = 2.59219E−02
A8 = −1.15754E−02
A10 = 3.96794E−02

$3^{rd}$ surface

K = −2.98820E+01
A4 = 3.38572E−02
A6 = 1.58745E−01
A8 = −8.27025E−03
A10 = 6.42671E−02

$4^{th}$ surface

K = −7.82217E+00
A4 = −6.03188E−03
A6 = 1.72522E−01
A8 = 6.78036E−02
A10 = −9.14885E−02

$5^{th}$ surface

K = −5.70687E−01
A4 = 3.19669E−02
A6 = 3.49013E−02
A8 = 1.08012E−01
A10 = 4.85856E−02

$6^{th}$ surface

K = 1.97888E+01
A4 = 9.68469E−02
A6 = −1.35180E−01
A8 = 1.37422E−01
A10 = −6.35003E−02

$7^{th}$ surface

K = −3.06571E+00
A4 = 3.35323E−02
A6 = −2.61538E−02
A8 = 3.71421E−02
A10 = 1.94090E−02
A12 = −1.93848E−02

$8^{th}$ surface

K = −3.00000E+01
A4 = −2.57584E−01
A6 = 1.34386E−01
A8 = −3.01661E−02
A10 = 3.92204E−03
A12 = −3.38526E−04

TABLE 15-continued

Example 15
f = 3.41 mm fB = 0.29 mm F = 2.88 2Y = 4.48 mm
ENTP = 0 mm EXTP = −2.11 mm H1 = −1.45 mm H2 = −3.13 mm $9^{th}$ surface K = −7.12076E+00
A4 = −1.43701E−01
A6 = 4.92795E−02
A8 = −1.24559E−02
A10 = 1.63256E−03
A12 = −7.23404E−05

Data of each single lens

| Lens No. | Front surface No. | Focal length (mm) |
|---|---|---|
| 1 | 2 | 2.628 |
| 2 | 4 | −5.060 |
| 3 | 6 | 5.002 |
| 4 | 8 | −4.092 |

Figure 33:
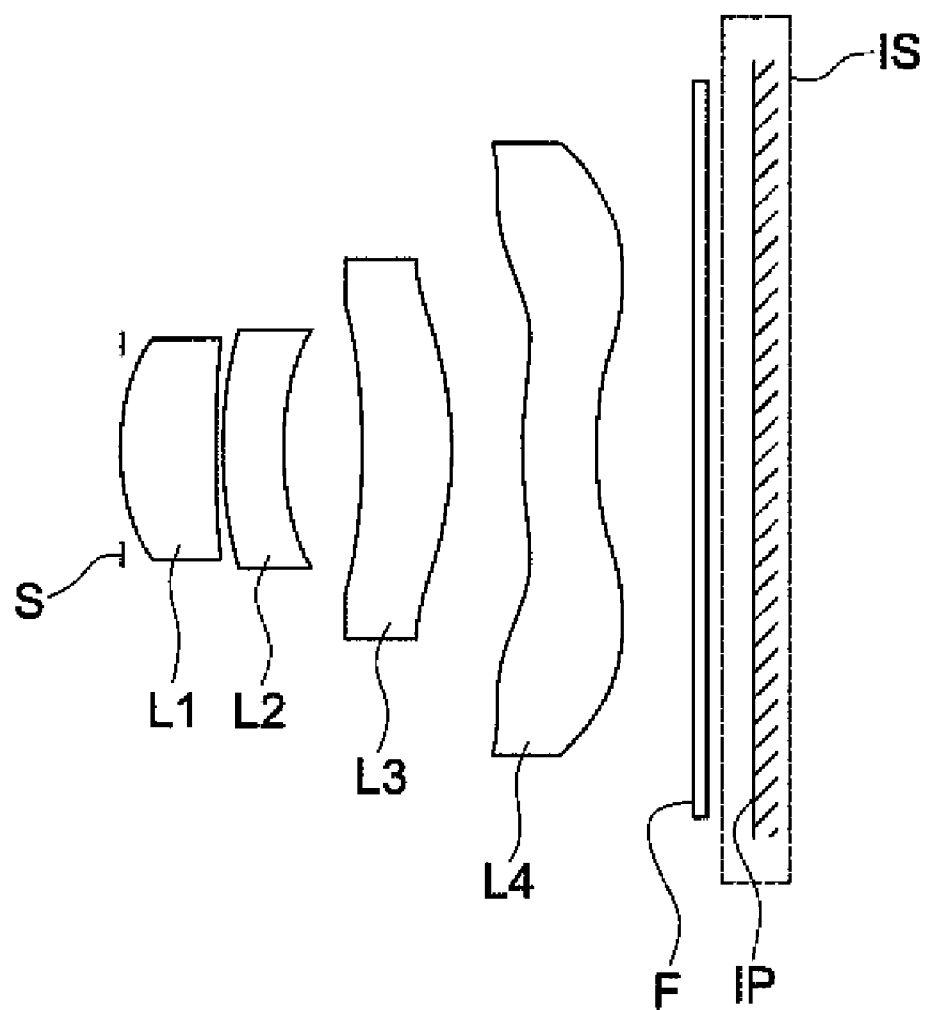
FIG. 33 is a sectional view in the direction of optical axis of the image pickup lens in Example 15.

FIG. 33 is a cross-sectional view of the image pickup lens shown in Example 15. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 15, all lenses are formed with plastic materials.

FIGS. 34(a)-34(d) are diagrams of aberrations (spherical aberration, astigmatism, distortion and meridional coma, respectively) of the image pickup lens shown in Example 15.

EXAMPLE 16

Lens data of an image pickup lens in Example 16 is shown in the following Table 16.

TABLE 16

Example 16
f = 5.59 mm fB = 0.31 mm F = 2.06 2Y = 7.12 mm
ENTP = 0 mm EXTP = −4.52 mm H1 = −0.89 mm H2 = −5.28 mm

| Surface No. | R (mm) | D (mm) | Nd | vd | Effective radius (mm) |
|---|---|---|---|---|---|
| 1 (stop) | ∞ | 0.000 | | | 1.36 |
| 2* | 5.013 | 1.682 | 1.58910 | 61.1 | 1.42 |
| 3* | −3.803 | 0.059 | | | 1.74 |
| 4* | 5.776 | 0.727 | 1.78470 | 26.3 | 1.81 |
| 5* | 2.255 | 0.796 | | | 1.76 |
| 6* | −20.803 | 2.209 | 1.53050 | 55.7 | 1.84 |
| 7* | −2.080 | 0.280 | | | 2.43 |
| 8* | 4.289 | 0.807 | 1.53050 | 55.7 | 3.07 |
| 9* | 1.416 | 1.000 | | | 3.32 |
| 10 | ∞ | 0.145 | 1.51630 | 64.1 | 3.44 |
| 11 | ∞ | | | | 3.47 |

Aspheric surface coefficient $2^{nd}$ surface

K = −1.56962E+01
A4 = 8.70084E−03
A6 = −6.06257E−03
A8 = 1.02547E−03
A10 = −2.52792E−04

$3^{rd}$ surface

K = −9.14744E+00
A4 = −1.73443E−02
A6 = 1.42694E−03

TABLE 16-continued

Example 16
f = 5.59 mm fB = 0.31 mm F = 2.06 2Y = 7.12 mm
ENTP = 0 mm EXTP = −4.52 mm H1 = −0.89 mm H2 = −5.28 mm A8 = −4.40464E−04
A10 = −8.99030E−06
4$^{th}$ surface K = −2.32448E+00
A4 = −1.84601E−02
A6 = 5.12846E−03
A8 = −7.23612E−04
A10 = 6.38472E−05
5$^{th}$ surface K = −3.28527E+00
A4 = −3.44233E−03
A6 = 4.69805E−03
A8 = −8.20006E−04
A10 = 8.16849E−05
6$^{th}$ surface K = 2.84835E+01
A4 = 9.09231E−04
A6 = −4.58729E−03
A8 = 2.09311E−03
A10 = −2.52628E−04
7$^{th}$ surface K = −1.58784E+00
A4 = 1.19636E−03
A6 = 5.04717E−04
A8 = −5.86183E−04
A10 = 2.06283E−04
A12 = −1.71318E−05
8$^{th}$ surface K = −2.56150E+01
A4 = −5.12895E−02
A6 = 1.08607E−02
A8 = −1.00092E−03
A10 = 4.72232E−05
A12 = −9.42026E−07
9$^{th}$ surface K = −3.81552E+00
A4 = −3.08506E−02
A6 = 5.72495E−03
A8 = −6.73766E−04
A10 = 4.33641E−05
A12 = −1.10541E−06

Data of each single lens

| Lens No. | Front surface No. | Focal length (mm) |
|---|---|---|
| 1 | 2 | 3.950 |
| 2 | 4 | −5.186 |
| 3 | 6 | 4.185 |
| 4 | 8 | −4.414 |

Figure 35:
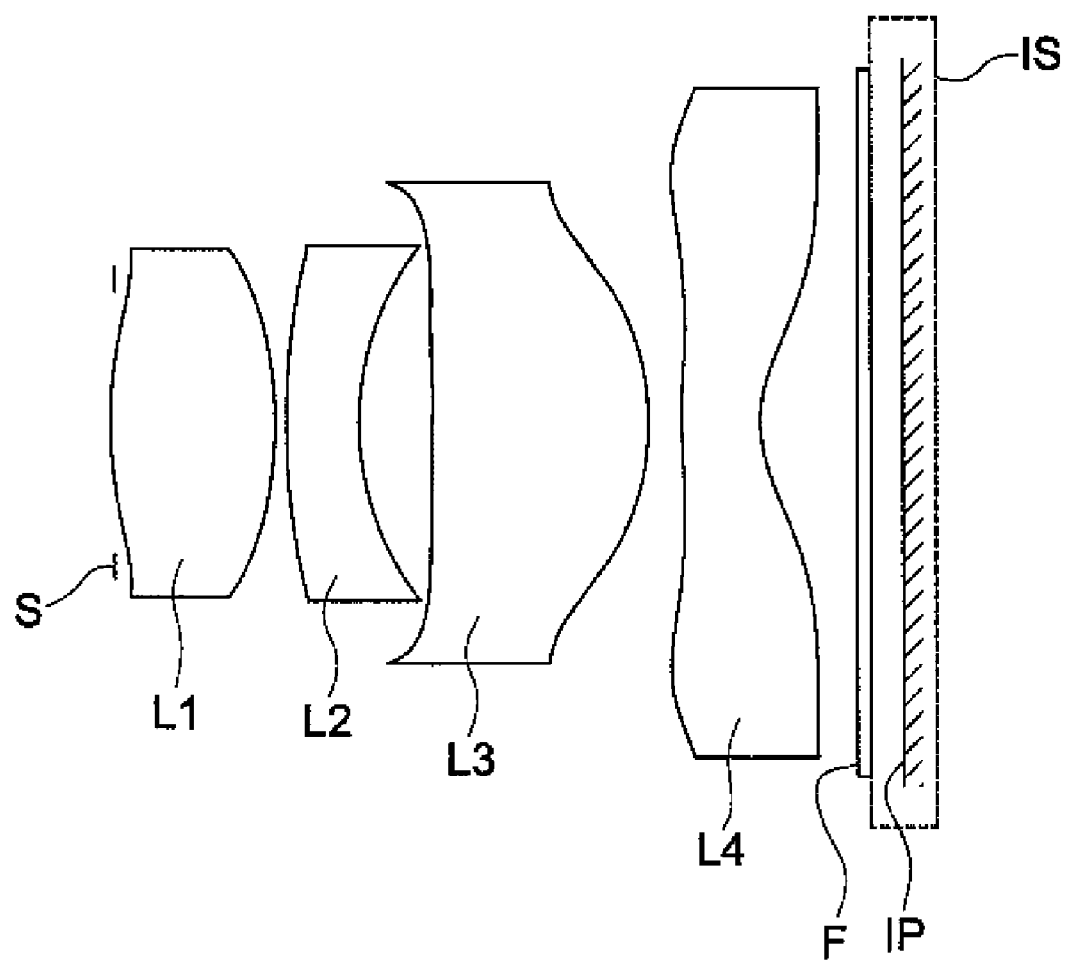
FIG. 35 is a sectional view in the direction of optical axis of the image pickup lens in Example 16.
Figure 36:
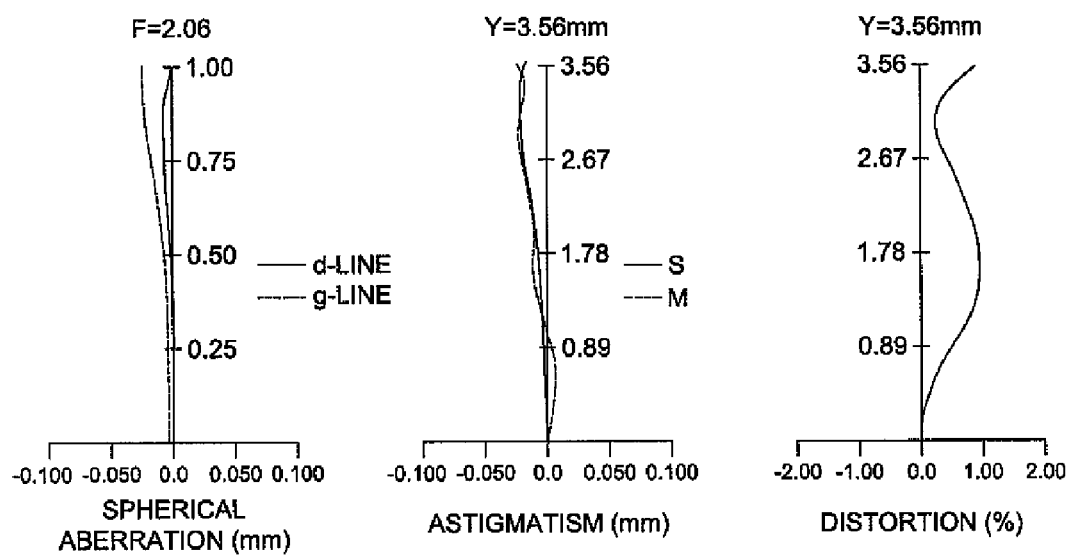
FIGS. 36(a) through 36(d) show aberration diagrams in Example 16 including spherical aberration, astigmatism, distortion, and meridional coma, respectively.
Figure 36:
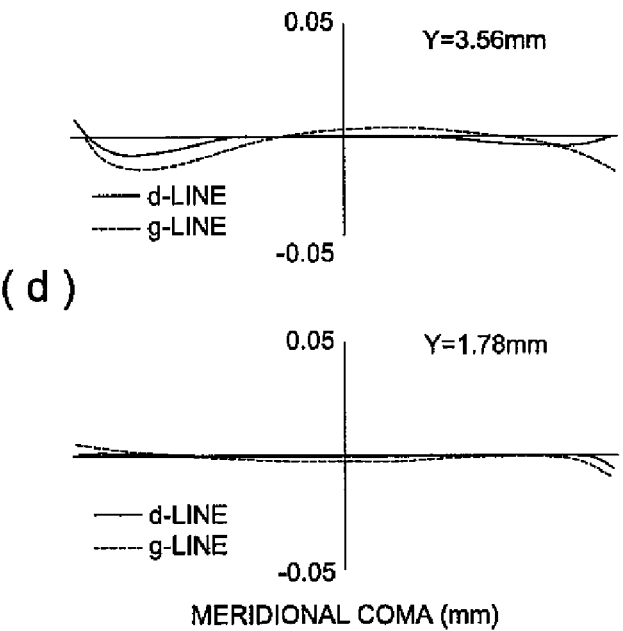

FIG. 35 is a cross-sectional view of the image pickup lens shown in Example 15. The image pickup lens includes, in order from the object side along the optical axis, aperture stop S; first lens L1; second lens L2; third lens L3; fourth lens L4; parallel flat plate F assuming an optical lowpass filter, an IR blocking filter and a seal glass of solid state image sensor IS; and image pickup surface IP of solid-state image sensor IS. In the Example 16, each of the first lens and the second lens is a glass mold lens, and the third lens and the fourth lens are formed by a plastic material.

FIGS. 36(a)-36(d) are diagrams of aberrations (spherical aberration, astigmatism, distortion and meridional coma, respectively) of an image pickup lens shown in Example 16.

Table 17 shows values of Examples corresponding to the conditional expressions.

TABLE 17

| | Conditional expressions | | | | | | |
|---|---|---|---|---|---|---|---|
| | (1) f123/D6 | (2) r4/f | (3) ν2 | (4) Pair12/P | (5) Pair23/P | (6) n2 | (7) L/2Y |
| Example 1 | 5.59 | 0.38 | 23.4 | 1.61 | −2.88 | 1.632 | 0.91 |
| Example 2 | 6.51 | 0.42 | 23.4 | 1.36 | −2.60 | 1.632 | 0.91 |
| Example 3 | 7.33 | 0.45 | 23.4 | 1.54 | −2.53 | 1.632 | 0.90 |
| Example 4 | 3.05 | 0.30 | 23.4 | 1.64 | −2.87 | 1.632 | 0.85 |
| Example 5 | 5.10 | 0.35 | 30.0 | 1.48 | −2.62 | 1.583 | 0.91 |
| Example 6 | 5.79 | 0.34 | 37.0 | 2.11 | −3.74 | 1.815 | 0.91 |
| Example 7 | 3.83 | 0.32 | 23.4 | 1.74 | −2.80 | 1.632 | 0.90 |
| Example 8 | 6.09 | 0.73 | 23.4 | 1.16 | −2.11 | 1.632 | 0.82 |
| Example 9 | 10.67 | 0.47 | 23.4 | 1.08 | −1.90 | 1.632 | 0.97 |
| Example 10 | 16.52 | 0.40 | 23.4 | 1.36 | −2.51 | 1.632 | 0.91 |
| Example 11 | 9.36 | 0.44 | 30.0 | 0.55 | −1.83 | 1.583 | 0.89 |
| Example 12 | 4.40 | 0.38 | 23.4 | 0.89 | −1.92 | 1.632 | 0.85 |
| Example 13 | 4.16 | 0.47 | 30.0 | 0.43 | −1.45 | 1.583 | 0.85 |
| Example 14 | 4.11 | 0.42 | 23.4 | 0.63 | −1.90 | 1.632 | 0.85 |
| Example 15 | 6.81 | 0.55 | 23.4 | 0.39 | −1.59 | 1.632 | 0.85 |
| Example 16 | 15.97 | 0.40 | 26.3 | 1.62 | −2.13 | 1.785 | 1.12 |

Plastic materials tend to have a refractive index which largely changes due to temperature change, and an image point of the total system of the image pickup lens is sometimes fluctuated due to a change of the environmental temperature when all of the first lens through the fourth lens are formed as plastic lenses as in Examples 1-5 and 7-15. In an image pickup apparatus which has a specification such that fluctuations of image point position cannot be ignored, the problem about temperatures can be lighten by the following structure: the positive first lens and the negative second lens both having relatively large refractive power are provided as lenses formed of glass material (for example, glass mold lenses) and the third lens and the fourth lens are provided as plastic lenses, as in, for example, Examples 6 and 16, and the third lens and the fourth lens have a refractive power distribution so as to offset fluctuations of their image point positions due to a temperature change each other to a certain extent. When using a glass mold lens, it is preferable to use glass material whose glass transition point (Tg) is 400° C. or lower, for preventing molding dies from being wasted as far as possible.

Further, in recent years, it has been known that temperature changes of plastic materials can be made small by blending inorganic microparticles in a plastic material. The detailed explanation is described below. When microparticles are blended in a transparent plastic material, the plastic materials has been hardly used as optical materials because transmittance of the transparent plastic materials is lowered due to scattering of light, as generally known. However, it is possible not to cause the scattering substantially by reducing the size of microparticles to be smaller than a wavelength of a transmitting light flux. A plastic material has a refractive index decreasing when its temperature rises, while, inorganic particles have a refractive index increasing when its temperature rises. It is therefore possible that a change in refractive index hardly occurs by employing a plastic material and inorganic particles whose temperature dependencies work to cancel each other. Specifically, by dispersing inorganic particles whose largest side is 20 nm or less into a plastic material representing a base material, it is possible to realize a plastic material having a refractive index whose temperature dependency is extremely low. For example, by dispersing microparticles of niobium oxide ($Nb_2O_5$) into acrylic resin, the material can provide reduced change in the refractive index caused by temperature changes. In the above examples, by employing plastic materials in which the aforesaid inorganic particles are dispersed, for positive lens (L1) whose refractive power is relatively large or for all lenses (L1-L4), the fluctuation of image point position caused by temperature changes in the total system of image pickup lens can be controlled to be small.

Incidentally, each of the above Examples is not necessarily designed such that an incident angle of a principal ray of the light flux that enters an image pickup surface of a solid-state image pickup element is sufficiently small at a peripheral portion of the image pickup surface. However, in the recent technology, it has become possible to reduce shading by a revision of an arrangement of a color filter of a solid-state image pickup element and an onchip-microlens-array. Specifically, it a pitch of the arrangement of the color filter and the onchip-microlens-array is designed to be slightly smaller compared with a pixel pitch of the image pickup surface of the imaging device, a light flux of oblique incidence can be guided efficiently, because the color filter and the onchip-microlens-array are shifted greater toward an optical axis of an image pickup lens at the position which is closer to a peripheral portion of the image pickup surface. Owing to this, shading generated on the solid-state imaging device can be controlled to be small. The present Examples provide design examples in which the above design requirement about the incident angle of the principal ray is lighten and the design requirement for downsizing is stronger.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An image pickup lens for forming an image of an object on a photoelectrical converter of a solid-state image pickup element, the image pickup lens comprising, in order from an object side thereof:
   an aperture stop;
   a first lens having a positive power and comprising a convex surface facing the object side;
   a second lens having a negative power and comprising a concave surface facing an image side of the image pickup lens;
   a third lens in a meniscus shape having a positive power and comprising a convex surface facing the image side; and
   a fourth lens in a meniscus shape having a negative power and comprising a convex surface facing the object side,
   wherein the image pickup lens satisfies following expressions:

$2.0 < f123/D6 < 17.0$, and $0.2 < r4/f < 0.75$, where f123 is a composite focal length of the first lens, the second lens, and the third lens,
   D6 is a length of an air space between the third lens and the fourth lens along an optical axis of the image pickup lens,
   r4 is a curvature radius of the surface of the second lens facing the image side, and
   f is a focal length of a total system of the image pickup lens, and
   wherein the second lens is in a meniscus shape comprising a convex surface facing the object side.

2. The image pickup lens of claim 1, satisfying following expressions:

$3.0 < f123/D6 < 17.0$, and $0.25 < r4/f < 0.75$,

3. The image pickup lens of claim 1,
   wherein the surface of the second lens facing the image side is in an aspheric shape on which a center portion has a negative refractive power and the negative refractive power becomes smaller at a position being farther from the center portion to a periphery.

4. The image pickup lens of claim 1, satisfying a following expression:

$10 < v2 < 31$, where v2 is an Abbe number of the second lens.

5. The image pickup lens of claim 1, satisfying a following expression:

$1.0 < Pair12/P < 3.0$, where P is a refractive power of a total system of the image pickup lens, and
   Pair12 is a refractive power of an air lens formed from a surface of the first lens facing an image side and a surface of the second lens facing the object side, and is defined by a following expression:

$$Pair12 = \frac{1-n_1}{R_2} + \frac{n_2-1}{R_3} - D_2 \cdot \frac{(1-n_1)\cdot(n_2-1)}{R_2 \cdot R_3},$$

where n1 is a refractive index of the first lens for d line,
   n2 is a refractive index of the second lens for d line,
   R2 is a curvature radius of the surface of the first lens facing the image side,
   R3 is a curvature radius of the surface of the second lens facing the object side, and
   D2 is a length of an air space between the first lens and the second lens along the optical axis.

6. The image pickup lens of claim 5, satisfying a following expression:

$1.0 < Pair12/P < 2.5$.

7. The image pickup lens of claim 1, satisfying a following expression:

$-4.5 < Pair23/P < -2.0$, where P is a refractive power of a total system of the image pickup lens, and
   Pair23 is a refractive power of an air lens formed from the surface of the second lens facing an image side and a surface of the third lens facing the object side, and is defined by a following expression:

$$Pair23 = \frac{1-n_2}{R_4} + \frac{n_3-1}{R_5} - D_4 \cdot \frac{(1-n_2)\cdot(n_3-1)}{R_4 \cdot R_5},$$

where n2 is a refractive index of the second lens for d line,
   n3 is a refractive index of the third lens for d line,
   R4 is a curvature radius of the surface of the second lens facing the image side,
   R5 is a curvature radius of the surface of the third lens facing the object side, and
   D4 is a length of an air space between the second lens and the third lens along the optical axis.

8. The image pickup lens of claim 7, satisfying a following expression:

−4.0<Pair23/P<−2.5.

9. The image pickup lens of claim 1,
wherein a surface of the fourth lens facing the image side is in an aspheric shape on which a center portion has a negative refractive power, and the negative refractive power becomes smaller at a position being farther from the center portion to a periphery, and
the surface of the fourth lens facing the image side includes an inflection point.

10. The image pickup lens of claim 1, satisfying a following expression:

1.58<n2<2.10, where n2 is a refractive index of the second lens for d line.

11. The image pickup lens of claim 1,
wherein the first lens is a bi-convex lens in which a curvature radius of a surface facing the image side is smaller than that of a surface facing the object side.

12. An image pickup lens for forming an image of an object on a photoelectrical converter of a solid-state image pickup element, the image pickup lens comprising, in order from an object side thereof:
an aperture stop;
a first lens having a positive power and comprising a convex surface facing the object side;
a second lens having a negative power and comprising a concave surface facing an image side of the image pickup lens;
a third lens in a meniscus shape having a positive power and comprising a convex surface facing the image side; and
a fourth lens in a meniscus shape having a negative power and comprising a convex surface facing the object side,
wherein the image pickup lens satisfies following expressions:

2.0<f123/D6<17.0, and 0.2<r4/f<0.75, where f123 is a composite focal length of the first lens, the second lens, and the third lens,
D6 is a length of an air space between the third lens and the fourth lens along an optical axis of the image pickup lens,
r4 is a curvature radius of the surface of the second lens facing the image side, and
f is a focal length of a total system of the image pickup lens, and
wherein the first lens and the second lens are formed of a glass material.

13. The image pickup lens of claim 12, satisfying following expressions:

3.0<f123/D6<17.0, and 0.25<r4/f<0.75.

14. The image pickup lens of claim 12, satisfying a following expression:

1.0<Pair12/P<3.0, where P is a refractive power of a total system of the image pickup lens, and
Pair12 is a refractive power of an air lens formed from a surface of the first lens facing an image side and a surface of the second lens facing the object side, and is defined by a following expression:

$$\mathrm{Pair}12 = \frac{1-n_1}{R_2} + \frac{n_2-1}{R_3} - D_2 \cdot \frac{(1-n_1) \cdot (n_2-1)}{R_2 \cdot R_3},$$

where n1 is a refractive index of the first lens for d line,
n2 is a refractive index of the second lens for d line,
R2 is a curvature radius of the surface of the first lens facing the image side,
R3 is a curvature radius of the surface of the second lens facing the object side, and
D2 is a length of an air space between the first lens and the second lens along the optical axis.

15. The image pickup lens of claim 14, satisfying a following expression:

1.0<Pair12/P<2.5.

16. The image pickup lens of claim 12, satisfying a following expression:

−4.5<Pair23/P<−2.0, where P is a refractive power of a total system of the image pickup lens, and
Pair23 is a refractive power of an air lens formed from the surface of the second lens facing an image side and a surface of the third lens facing the object side, and is defined by a following expression:

$$\mathrm{Pair}23 = \frac{1-n_2}{R_4} + \frac{n_3-1}{R_5} - D_4 \cdot \frac{(1-n_2) \cdot (n_3-1)}{R_4 \cdot R_5},$$

where n2 is a refractive index of the second lens for d line,
n3 is a refractive index of the third lens for d line,
R4 is a curvature radius of the surface of the second lens facing the image side,
R5 is a curvature radius of the surface of the third lens facing the object side, and
D4 is a length of an air space between the second lens and the third lens along the optical axis.

17. The image pickup lens of claim 16, satisfying a following expression:

−4.0<Pair23/P<−2.5.

18. The image pickup lens of claim 12,
wherein the first lens is a bi-convex lens in which a curvature radius of a surface facing the image side is smaller than that of a surface facing the object side, and
the second lens is in a meniscus shape comprising a convex surface facing the object side.

19. An image pickup lens for forming an image of an object on a photoelectrical converter of a solid-state image pickup element, the image pickup lens comprising, in order from an object side thereof:
an aperture stop;
a first lens having a positive power and comprising a convex surface facing the object side;
a second lens having a negative power and comprising a concave surface facing an image side of the image pickup lens;
a third lens in a meniscus shape having a positive power and comprising a convex surface facing the image side; and
a fourth lens in a meniscus shape having a negative power and comprising a convex surface facing the object side, wherein the image pickup lens satisfies following expressions:

$$2.0 < f123/D6 < 17.0, \text{ and}$$

$$0.2 < r4/f < 0.75,$$

where f123 is a composite focal length of the first lens, the second lens, and the third lens, D6 is a length of an air space between the third lens and the fourth lens along an optical axis of the image pickup lens, r4 is a curvature radius of the surface of the second lens facing the image side, and f is a focal length of a total system of the image pickup lens, and wherein each of the first to fourth lenses is formed of a plastic material.

20. The image pickup lens of claim 19, satisfying following expressions:

$$3.0 < f123/D6 < 17.0, \text{ and}$$

$$0.25 < r4/f < 0.75.$$

21. The image pickup lens of claim 19, satisfying a following expression:

$$1.0 < \text{Pair12}/P < 3.0,$$

where P is a refractive power of a total system of the image pickup lens, and

Pair12 is a refractive power of an air lens formed from a surface of the first lens facing an image side and a surface of the second lens facing the object side, and is defined by a following expression:

$$\text{Pair12} = \frac{1-n_1}{R_2} + \frac{n_2-1}{R_3} - D_2 \cdot \frac{(1-n_1) \cdot (n_2-1)}{R_2 \cdot R_3},$$

where n1 is a refractive index of the first lens for d line,
n2 is a refractive index of the second lens for d line,
R2 is a curvature radius of the surface of the first lens facing the image side,
R3 is a curvature radius of the surface of the second lens facing the object side, and
D2 is a length of an air space between the first lens and the second lens along the optical axis.

22. The image pickup lens of claim 21, satisfying a following expression:

$$1.0 < \text{Pair12}/P < 2.5.$$

23. The image pickup lens of claim 19, satisfying a following expression:

$$-4.5 < \text{Pair23}/P < -2.0,$$

where P is a refractive power of a total system of the image pickup lens, and

Pair23 is a refractive power of an air lens formed from the surface of the second lens facing an image side and a surface of the third lens facing the object side, and is defined by a following expression:

$$\text{Pair23} = \frac{1-n_2}{R_4} + \frac{n_3-1}{R_5} - D_4 \cdot \frac{(1-n_2) \cdot (n_3-1)}{R_4 \cdot R_5},$$

where n2 is a refractive index of the second lens for d line,
n3 is a refractive index of the third lens for d line,
R4 is a curvature radius of the surface of the second lens facing the image side,
R5 is a curvature radius of the surface of the third lens facing the object side, and
D4 is a length of an air space between the second lens and the third lens along the optical axis.

24. The image pickup lens of claim 23, satisfying a following expression:

$$-4.0 < \text{Pair23}/P < -2.5.$$

25. The image pickup lens of claim 19,
wherein the first lens is a bi-convex lens in which a curvature radius of a surface facing the image side is smaller than that of a surface facing the object side, and
the second lens is in a meniscus shape comprising a convex surface facing the object side.

* * * * *